(12) United States Patent  
Nakamura et al.

(10) Patent No.: US 6,731,400 B1  
(45) Date of Patent: May 4, 2004

(54) COLOR IMAGE PROCESSING APPARATUS WHICH PERFORMS DIFFERENT IMAGE PROCESSINGS DEPENDING ON REGION OF COLOR IMAGE

(75) Inventors: Toshiaki Nakamura, Hitachinaka (JP); Manabu Joh, Hitachi (JP); Tatsuki Inuzuka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 08/960,322

(22) Filed: Oct. 29, 1997

(30) Foreign Application Priority Data

Nov. 1, 1996 (JP) .............................. 8-291701  
Nov. 12, 1996 (JP) .............................. 8-300236  
Dec. 24, 1996 (JP) .............................. 8-343397

(51) Int. Cl.⁷ .............................................. G06K 15/00
(52) U.S. Cl. ........................ 358/1.9; 358/2.1; 358/521
(58) Field of Search .......................... 358/1.1, 1.2, 1.9, 358/2.1, 1.13, 1.15, 1.16, 1.18, 298, 426, 427, 429, 444, 448, 455, 456, 457, 458, 462, 466, 500, 515, 521, 524, 532, 533; 382/166, 176, 180, 195, 199, 237, 243, 251, 266, 269, 274, 303; 345/202, 523

(56) References Cited

U.S. PATENT DOCUMENTS

| | | | |
|---|---|---|---|
| 5,138,338 A | * | 8/1992 | Mochizuki et al. .......... 347/237 |
| 5,231,677 A | * | 7/1993 | Mita et al. ................... 382/266 |
| 5,258,849 A | * | 11/1993 | Tai et al. ..................... 358/298 |
| 5,274,461 A | * | 12/1993 | Mitsuhashi ................. 358/296 |
| 5,287,209 A | * | 2/1994 | Hiratsuka et al. ............ 358/1.9 |
| 5,325,211 A | * | 6/1994 | Eschbach .................... 358/466 |
| 5,465,164 A | * | 11/1995 | Sugiura et al. .............. 358/448 |
| 5,602,976 A | * | 2/1997 | Cooper et al. .............. 358/1.17 |
| 5,642,439 A | * | 6/1997 | Sato et al. ................... 382/254 |
| 5,719,613 A | * | 2/1998 | Fukui et al. ................. 347/132 |
| 5,917,955 A | * | 6/1999 | Kojima ........................ 382/266 |
| 5,933,577 A | * | 8/1999 | Naitoh et al. ................. 358/1.9 |

FOREIGN PATENT DOCUMENTS

| | | | |
|---|---|---|---|
| JP | 59-161977 | * | 9/1984 |
| JP | 3-76377 | * | 4/1991 |
| JP | 4-90680 | * | 3/1992 |
| JP | 5-50909 | * | 7/1993 |
| JP | 6-7688 | * | 1/1994 |

* cited by examiner

Primary Examiner—Gabriel Garcia  
(74) Attorney, Agent, or Firm—Antonelli, Terry, Stout & Kraus, LLP

(57) ABSTRACT

A data processing part in a printer controller performs multivalued dither processing whereby image data is processed for images of characters and thin lines with a high definition, and for pictures with a high color gradation, and the image quality deterioration at the boundary region between an edge region and a non-edge region can be avoided. The data processing part performs discrimination of an edge region, a non-edge region, and a boundary region between the edge and non-edge regions. Furthermore, the data processing part performs multivalued dither processing by using a prepared dot distribution type dither matrix for the edge region, a prepared dot concentration type dither matrix for the non-edge region and a prepared dot distribution and concentration mixing type dither matrix for the boundary region. Furthermore, the amount of image data to be processed is reduced by dividing an image frame into a plurality of pixel blocks and expressing an image of each pixel block with a few of approximate color data and approximate color arrangement data.

17 Claims, 40 Drawing Sheets

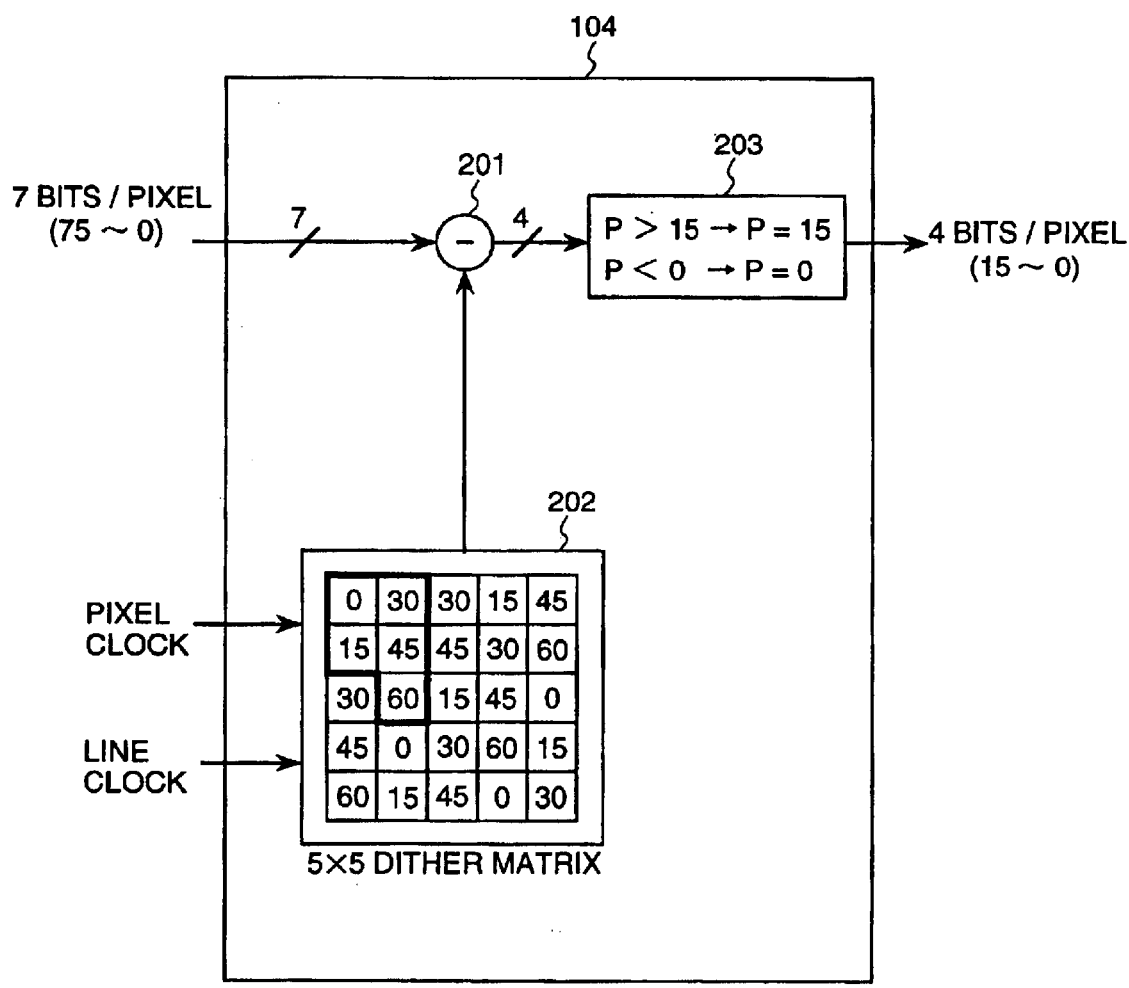

| 0 | 30 | 60 | 15 | 45 |
|---|----|----|----|----|
| 15 | 45 | 0 | 30 | 60 |
| 30 | 60 | 15 | 45 | 0 |
| 45 | 0 | 30 | 60 | 15 |
| 60 | 15 | 45 | 0 | 30 |

| 60 | 30 | 0 | 45 | 15 |
|----|----|---|----|----|
| 0 | 45 | 15 | 60 | 30 |
| 15 | 60 | 30 | 0 | 45 |
| 30 | 0 | 45 | 15 | 60 |
| 45 | 15 | 60 | 30 | 0 |

| 60 | 15 | 45 | 0 | 30 |
|----|----|----|---|----|
| 0 | 30 | 60 | 15 | 45 |
| 15 | 45 | 0 | 30 | 60 |
| 30 | 60 | 15 | 45 | 0 |
| 45 | 0 | 30 | 60 | 15 |

| 15 | 45 | 0 | 30 | 60 |
|----|----|---|----|----|
| 30 | 60 | 15 | 45 | 0 |
| 45 | 0 | 30 | 60 | 15 |
| 60 | 15 | 45 | 0 | 30 |
| 0 | 30 | 60 | 15 | 45 |

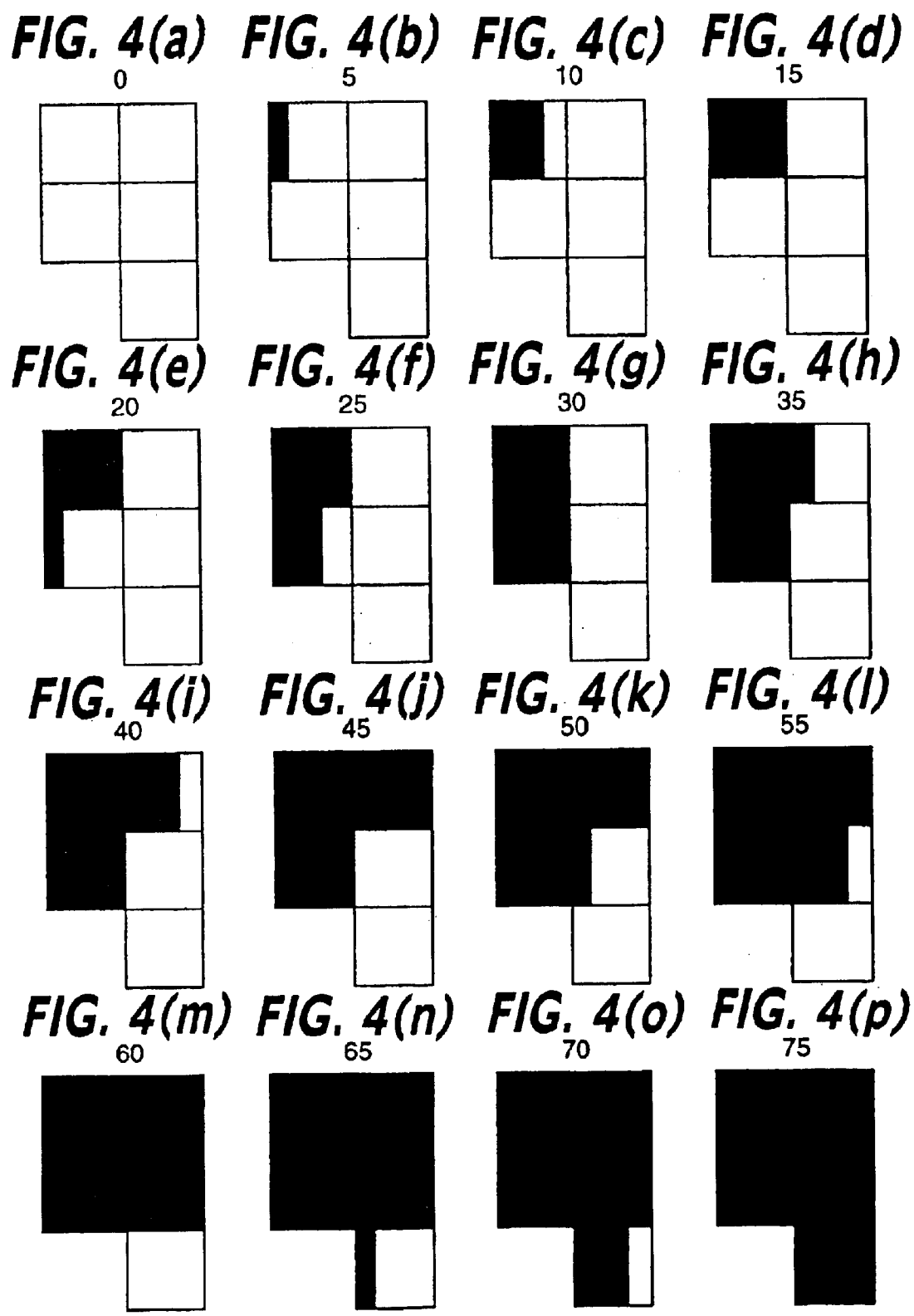

COUNTER VALUE FOR MAIN DIRECTION SCANNING

COUNTER VALUE FOR SUBORDINATE DIRECTION SCANNING

|   | 0 | 1 | 2 | 3 |
|---|---|---|---|---|
| 0 | 0 | 8 | 2 | 10 |
| 1 | 12 | 4 | 14 | 6 |
| 2 | 3 | 11 | 1 | 9 |
| 3 | 15 | 7 | 13 | 5 |

|   | 0 | 1 | 2 | 3 | 4 |
|---|---|---|---|---|---|
| 0 | 39 | 0 | 26 | 13 | 52 |
| 1 | 65 | 91 | 117 | 104 | 78 |
| 2 | 13 | 52 | 39 | 0 | 26 |
| 3 | 104 | 78 | 65 | 91 | 117 |
| 4 | 0 | 26 | 13 | 52 | 39 |
| 5 | 91 | 117 | 104 | 78 | 65 |
| 6 | 52 | 39 | 0 | 26 | 13 |
| 7 | 78 | 65 | 91 | 117 | 104 |
| 8 | 26 | 13 | 52 | 39 | 0 |
| 9 | 117 | 104 | 78 | 65 | 91 |

|   | 0 | 1 | 2 | 3 | 4 |
|---|---|---|---|---|---|
| 0 | 0 | 26 | 104 | 39 | 65 |
| 1 | 13 | 52 | 117 | 78 | 91 |
| 2 | 39 | 65 | 0 | 26 | 104 |
| 3 | 78 | 91 | 13 | 52 | 117 |
| 4 | 26 | 104 | 39 | 65 | 0 |
| 5 | 52 | 117 | 78 | 91 | 13 |
| 6 | 65 | 0 | 26 | 104 | 39 |
| 7 | 91 | 13 | 52 | 117 | 78 |
| 8 | 104 | 39 | 65 | 0 | 26 |
| 9 | 117 | 78 | 91 | 13 | 52 |

1705

EDGE PIXEL PROCESSING

PIXEL NEIGHBORING EDGE PROCESSING

NON-EDGE REGION PIXEL PROCESSING

NON-EDGE REGION

REGION NEIGHBORING EDGE REGION

EDGE REGION

REGION NEIGHBORING EDGE REGION

NON-EDGE REGION

Y

M

C

K

DATA ARRANGEMENT FOR EACH COLOR IN MEMORY

DATA ARRANGEMENT FOR EACH PIXEL IN MEMORY

FIG.37

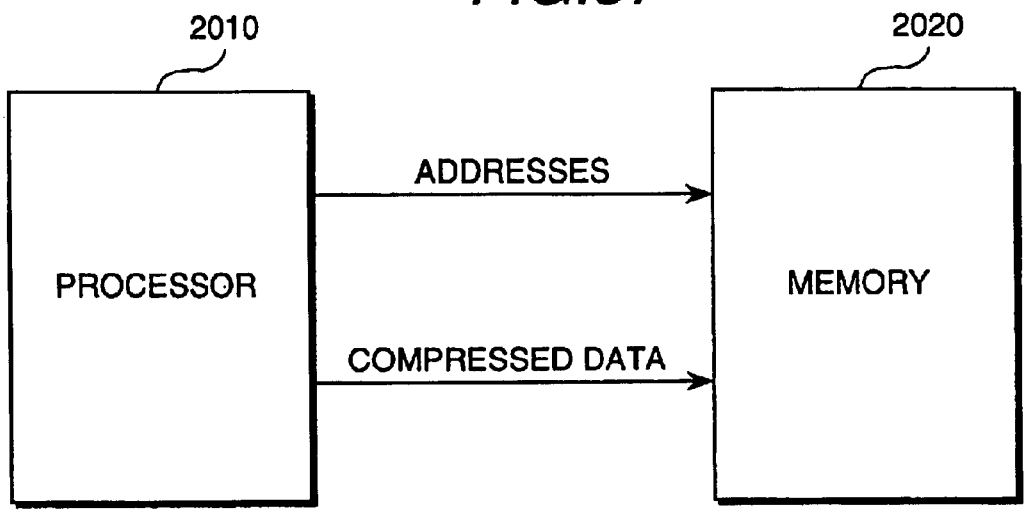

EXAMPLE OF GENERATED COMPRESSED DATA
- APPROXIMATE COLOR SIGNALS IN BLOCK
- COLOR SELECTION SIGNALS IN BLOCK

COMPRESSED DATA BLOCK

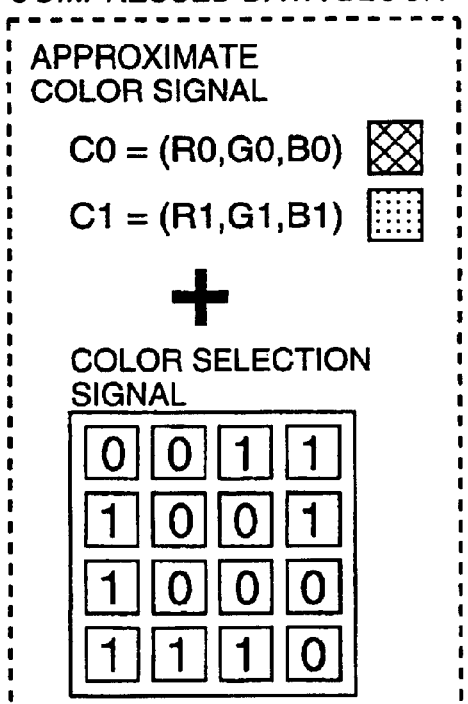

ADDRESS MAP OF COMPRESSED DATA IN MEMORY

| . . . |
|---|
| THE n TH BLOCK<br>• APPROXIMATE COLOR SIGNALS<br>• COLOR SELECTION SIGNALS |
| THE n+1 TH BLOCK<br>• APPROXIMATE COLOR SIGNALS<br>• COLOR SELECTION SIGNALS |
| THE n+2 TH BLOCK<br>• APPROXIMATE COLOR SIGNALS<br>• COLOR SELECTION SIGNALS |
| THE n+3 TH BLOCK<br>• APPROXIMATE COLOR SIGNALS<br>• COLOR SELECTION SIGNALS |
| THE n+4 TH BLOCK<br>• APPROXIMATE COLOR SIGNALS<br>• COLOR SELECTION SIGNALS |
| . . . |

THE nTH FRAME

THE (n+1) TH FRAME

SOLID LINE : WRITING MOVING COMPONENT DATA

DOTTED LINE : WRITING BACKGROUND DATA

FIG.42A
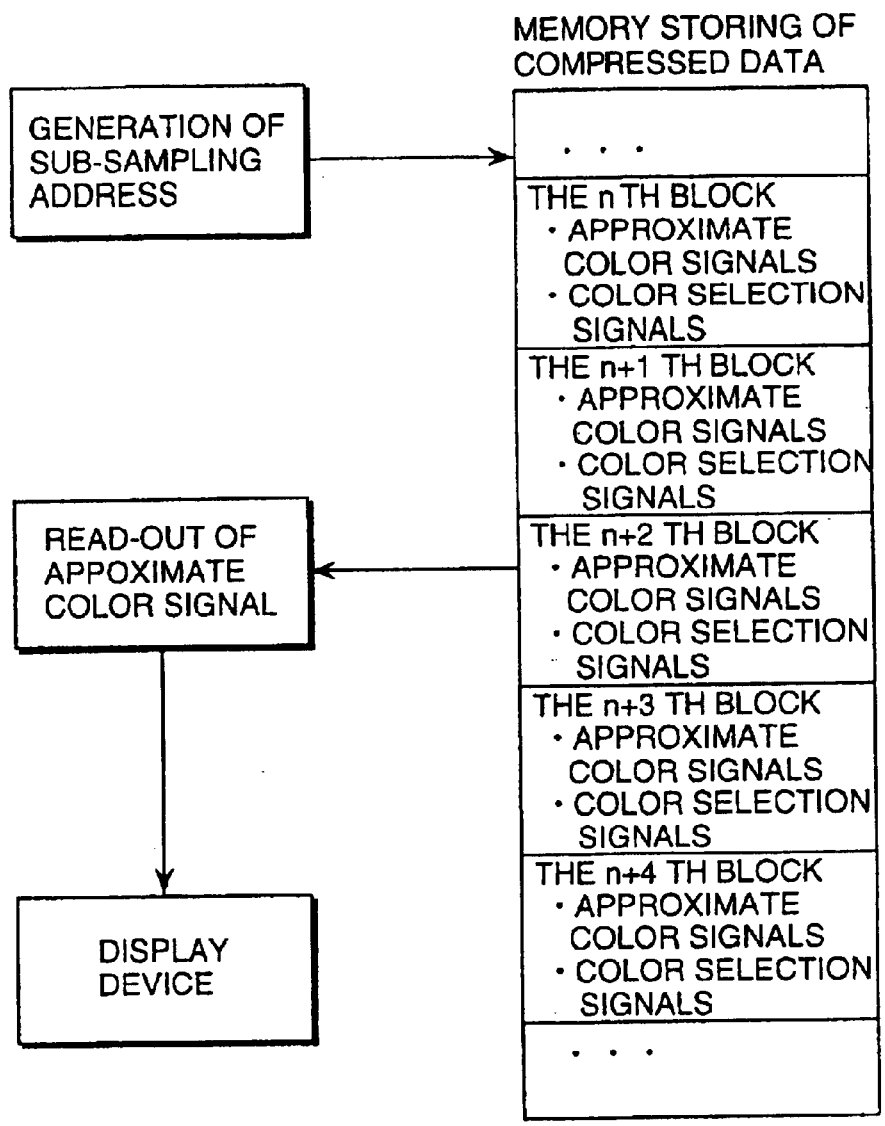
FIG.42B
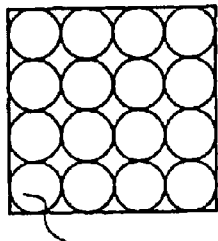
THE n-TH BLOCK
OF IMAGE DATA
(16 PIXELS)
AREA REDUCTION RATIO OF 1/16
DISPLAY OF THE n-TH BLOCK BY USING ONE PIXEL OF APPROXIMATE COLOR SIGNAL
PIXEL

COLOR IMAGE PROCESSING APPARATUS WHICH PERFORMS DIFFERENT IMAGE PROCESSINGS DEPENDING ON REGION OF COLOR IMAGE

BACKGROUND OF THE INVENTION

The present invention relates to a printer controller, especially to a printer controller for obtaining a high quality image.

As a technique for printing a full color image by using the four basic colors of C (Cyanic), Y (Yellow), M (Magenta) and K (Black), a technique called multivalued dither processing is known. In multivalued dither processing, the difference between the color density of each pixel in a pixel matrix and the value of a corresponding element in a dither matrix is expressed by a multiple-value number, and in accordance with the multiple-value number, an area ratio of each basic color in a print unit area corresponding to the pixel is determined. Finally, each basic color is printed in the unit area at each determined area ratio.

An example of the above-mentioned multivalued dither processing is disclosed in JP-B-50909/1993.

In the processing technique disclosed in JP-B-50909/1993, by using a dither matrix in which dither values of elements monotonously increase in the main scanning direction, a dot concentration type dither pattern is implemented, and the color gradation in the multivalued dither processing is stabilized.

Furthermore, as a method of printing a full color image by using a color laser printer, a method in which an area to be printed for a pixel is changed corresponding to a color density by combining a dither processing method and a pulse width modulation method, a so-called multi-level gradation printing method using a dither method, is known. For example, in an image processing apparatus which is disclosed in JP-A-1611977/1984, by preparing various sizes of dither matrixes and pulse width modulation means which can perform modulation of a plurality of pulse widths and pulse periods, and by changing a combination of one of the dither matrixes and one of the PNM means for each image page of papers according to the kind of information provided on the paper, that is, a paper only including characters, a paper only including pictures, a paper including characters and pictures, etc., the number of color gradations for each pixel is changed, and an optimal printing is implemented according to the kind of information provided on the paper.

Generally, since a color image is expressed by three kinds of color signals of multiple levels, namely, bit map data, a great amount of image data is employed to express even one image. For example, as a method which can efficiently store or transmit such a great amount of data, a data compression processing method, which is a so-called JPEG (Joint Photographic Expert Group) method is known (International Standards IPU-TT. 81 Recommendation).

However, in the above-mentioned method, since the data compression factor changes according to the contents of a picture, it is not possible to estimate the memory capacity necessary to store the compressed data of one page in advance. Therefore, since it is necessary to provide sufficient memory capacity by assuming the lowest data compression factor, the production cost of a printing system to which the above-mentioned method is applied is increased. Furthermore, since the data compression factor changes, the signal processing also becomes complicated.

On the other hand, the present inventors have devised a code processing method for color image information, as disclosed in JP-B-7688/1994, in which the data compression factor is kept constant. That is, in the code processing method for information of the three basic colors to express a color image, each block is composed of a plurality of pixels, and the pixels in each block are classified into two groups by using an average gradation level of the block as a threshold value for each basic color. Furthermore, an average color gradation level of each group for each basic color is obtained as an approximate color. In each block, the difference between the color density of each pixel and the approximate color of each of the two groups is obtained, and the approximate color of a group, which indicates a smaller difference, is assigned to the pixel.

Code processing in which image information of each block is expressed by the two approximate colors of groups and the assignment of the approximate coolers to each pixel, is executed. In the above-mentioned code processing, since the length of the data for expressing the image information for each block is constant, the compression factor of image data is fixed.

If the above-mentioned code processing method and a multivalued (e-level) dither processing are employed in a printer system in which, after the image data of one page is first stored in a memory, printing of the image data is started, since the difference between the color density of each pixel and the value of each element in a dither matrix is expressed by m bits necessary to express n-levels in the n-level dither processing, it is necessary to store data including information expressing total pixels of one page, each pixel also being expressed by color data of m bits for each of four colors (C, M, Y, K).

Furthermore, if the multivalued dither processing is executed in a host computer, and the processed image data is transferred to a memory in a printer, it is necessary to transmit pixel data of each page expressed by color data of m bits for each of four colors.

Therefore in accordance with the above-mentioned conventional multivalued dither processing method, if the bit number of each of the data processed by the method is increased, the number of gradation for expressing each pixel color is also increased, but this requires a large memory capacity and a long data transmission time. On the other hand, if the bit number of each of the data is decreased, the memory capacity and the data transmission time can be reduced, but the number of gradations for expressing each pixel color is decreased, which deteriorates the quality of the image.

Furthermore, in the above-mentioned method, wherein the data processing method is changed in units of a page, it has been proven that the quality of the pictures and characters in a page of data including both pictures and characters is lower than that in a page including only pictures or only characters. It is further troublesome when a user switches a combination of one of various dither matrixes and the pulse width gradation number in the purse width modulation for each page.

In a method disclosed in JP-A-76377/1991, edge discrimination processing is performed for each input image, and different two-level processings are executed for an edge region and for a region neighboring the edge region, respectively.

Moreover, in a method disclosed in JP-A-90680/1993, edge discrimination processing is performed for each input pixel. If a pixel is discriminated as an edge pixel, and the color density of the pixel is higher than those of neighboring pixels, a more highly stressed color density is assigned to the pixel. On the other hand, if the color density of the pixel is lower then those of neighboring pixels, a lower color density is assigned to the pixel. If a pixel is not discriminated as an edge pixel, a not-stressed color density is assigned to the pixel, and a two-level data processing is performed on data for the pixel.

Meanwhile, in the methods disclosed in JP-A-76377/1991 and JP-A-90680/1993, although a two-level data processing is performed, a multiple-level data processing is not performed.

Generally, since the amount of image data to be processed is massive, an efficient data compressing method is important to process image data efficiently and to reduce the production cost of a printer system. In a conventional image printing method, it is premised that image data processing is executed for each image frame t page), and that image data of a partial region in the frame can not be rewritten. In such a method, even if data of only one pixel is to be rewritten, all compressed data (image data) for one frame is read out from the memory, the compressed data is expanded, data of the single pixel is rewritten, the data is compressed, and all the data is again stored in the memory. As mentioned above, since all image data for one image frame should be read out of a memory even if data of only one pixel is to be rewritten, it takes a long time to process image data, and it is necessary to provide a transitory memory having a capacity sufficient to hold all the read data of one image frame, which increases the whole memory capacity of a printing apparatus.

SUMMARY OF THE INVENTION

The first object of the present invention is to provide an image formation apparatus which can form images of high quality by processing data of the same bit number as that processed by a conventional image formation apparatus.

The second object of the present invention is to provide an image processing method, an image processing apparatus and an image outputting apparatus, by which images of high quality are efficiently formed and output.

The third object of the present invention is to provide a data processing apparatus which can process image data in a unit of one pixel.

To attain the first object, the present invention provides, for example, an image formation apparatus for forming an image, the color gradation of each unit area in the image to be formed, which corresponds to pixels of an original image, being performed by changing the amount of coloration applied to the unit area, based on image data expressing a color gradation of the pixel of the original image, the image formation apparatus comprising:

image data conversion means for converting image data for each pixel in an original image to image formation signals which determine an amount of coloration applied to a unit area corresponding to the position of the pixel so that the width of color gradation for a low color density region is narrower than that for a high color density region; and image displaying means for coloring each unit area based on the image formation signals.

As mentioned above, in this image formation apparatus, the number of levels of color gradation is set larger in a low color density region. Since the larger number of levels of color gradation for a low color density region can be realized without increasing the bit number of a pixel, the generation of isolated dots in a low color density region in which reduction of the bit number in a pixel strongly affects the deterioration of the image qualify, can be suppressed without increasing the bit number of a pixel.

To attain the second object, the present invention provides a color image processing apparatus, comprising:

a discrimination pert for discriminating a first region composed of an edge region in an original image, a second region neighboring the first region, and a third region other than the first and second regions; and a processing part for processing image data of the original image by executing multivalued dither processing for the first region with a dot distribution type multivalued dither matrix, for the third region with a dot concentration type multivalued dither matrix, and for the second region with a dot distribution and concentration mixing type multivalued dither matrix, the dither matrixes being provided in the image processing system.

Furthermore, in this image processing apparatus, the discrimination part includes an edge discrimination means for discriminating whether or not each of the pixels in the image is one of the pixels belonging to the edge region, a region neighboring edge region discrimination means for discriminating whether or not each of pixels in the image is one of the pixels neighboring the edge region based on discrimination results of the edge discrimination means, and a determination means for determining to which region each pixel belongs, based on discrimination results of the edge discrimination means and the region neighboring edge region discrimination means. For example, the edge discrimination means discriminates whether or not each pixel is one of the pixels belonging to the edge (contour line) in the image by using a color information value of each pixel and color information values of pixels circumscribing the pixel. The region neighboring edge region discrimination means determines whether or not at least one pixel belonging to the edge region is included in pixels circumscribing each pixel discriminated as not belonging to the edge region, at the upper and lower sides, and the left and right sides, and the four diagonal positions. The determination means determines to which one of the first and the second and the third regions each pixel belongs, by using discrimination results of the two discrimination means.

Furthermore, in the above-mentioned processing part, the first processing means executes multivalued dither processing for each pixel in the first region, discriminated as belonging to the edge, using the dot distribution type multivalued dither matrix by which high definition printing can be implemented. The second processing means executes multivalued dither processing for each pixel in the second region, discriminated as belonging to the region neighboring the edge, using the mixture type multivalued dither matrix by which the print quality between high definition and a very many-level gradation can be implemented. Moreover, the third processing means executes multivalued dither processing for each pixel in the third region, discriminated as belonging to a non-edge region, with the dot concentration type multivalued dither matrix by which very many-level gradation printing can be realized.

Furthermore, in an image outputting apparatus, it is effective to perform pulse width modulation processing for all data for which the multivalued dither processing has been executed.

To attain the third object, the present invention provides a data processing apparatus, when used to read out image data, which comprises:

a memory for storing data compressed with a fixed data compression factor;

data processing means, when at least one of image data for each pixel selected to be processed is read out of the memory for outputting an address corresponding to the at least one of the image data;

address conversion means for converting the address output from the data processing means to an address used for memory access to the memory; and data expansion means for reading a plurality of compressed data from the memory, including compressed data corresponding to the address of the at least one of the image data, based on the address converted by the address conversion means, further expanding the plurality of read-out compressed image data, and outputting expanded image data corresponding to the address of the at least one of the image data, from among the plurality of the expanded image data, to the data processing means.

The present invention further provides a data processing apparatus, when used to write in image data, which comprises:

a memory for storing data compressed with a fixed data compression factor;

data processing means, when at least one of image data for each pixel selected to be processed is written into the memory, for outputting the at least one of image data and an address corresponding to the at least one of the image data;

address conversion means for converting the address output from the data processing means to an address used for memory access to the memory; and data expansion means for reading a plurality of compressed image data from the memory, including compressed image data corresponding to the address of the at least one of the image data, based on the address converted by the address conversion means, and expanding the plurality of the read-out compressed image data; and data compression means for compressing the plurality of the expanded image data and the at least one of the image data output from the data processing means with a fixed data compression factor, and storing the plurality of the compressed image data into their original area of the memory, based on the converted address for memory access.

The present invention further provides a data processing apparatus, when used to read out and write in image data, which comprises:

a memory for storing data compressed with a fixed data compression factor;

data processing means, when at least one of image data for each pixel selected to be processed is read out of the memory, for outputting an address corresponding to the at least one of the image data, and when at least one of image data for each pixel selected to be processed is written into the memory, for outputting the at least one of the image data and an address corresponding to the at least one of the image data;

address conversion means for converting the address output from the data processing means to an address used for memory access to the memory;

data expansion means for reading a plurality of compressed image data from the memory, including compressed data corresponding to the address of the at least one of the image data, based on the address converted by the address conversion means, and expanding the plurality of the read-out compressed image data; and data compression means, when the at least one of the data for each pixel selected to be processed is written into the memory, for compressing the plurality of the expanded image data and the at least one of the image data output from the data processing means with a fixed data compression factor, and storing the plurality of the compressed image data into their original area of the memory, based on the converted address for memory access.

The present invention further provides a data processing apparatus, when used to read out and write in image data, which comprises:

a memory for storing reversible data compressed with a first data compression factor and irreversible data compressed with a second data compression factor;

data processing means, when data related with image data for a pixel selected to be processed is read out of the memory, for outputting addresses corresponding to the data related to the image data, and when data related to the image data for a pixel selected to be processed is written into the memory, for outputting the data related to the image data and addresses corresponding to the data related to the image data;

address conversion means for converting the addresses output from the data processing means to addresses used for memory access to the memory;

data expansion means for reading a plurality of compressed data from the memory, including compressed data corresponding to the converted addresses of the data related to the image data, based on the addresses converted by the address conversion means, and expanding the plurality of read-out compressed data;

data selection means for determining the type of data to be processed, by monitoring the addresses output from the data processing means, and selecting a destination to which the data output from the data processing means is to be sent, in accordance with the results of the determination performed by the data selection means;

first data compression means for compressing the data expanded by the data expansion means of the irreversible data which are selected by the data selection means, at the second data compression factor, and storing the data processed by the first data compression means into their original area in the memory, based on the addresses converted for memory access; and second data compression means for compressing the data expanded by the data expansion means of the reversible data selected by the data selection means, at the first data compression factor, and storing the data processed by the second data compression means into their original area in the memory, based on the addresses converted for memory access.

To the above-mentioned data processing apparatus, the below-mentioned features can be added.

(1) The data processing means executes data read-out processing with priority to other processing.

(2) The apparatus further includes a buffer memory for temporarily storing the data and the addresses output from the data processing means when a group of data is written into the memory, and when the data processing means reads out the data and searches the data in the buffer memory, if the data exists in the buffer memory, the data processing means reads the data out of the buffer memory.

(3) The apparatus further includes another address generation means for generating an address of data processed independently of data processing executed by the data processing means, and an address selection means for selecting one of the addressee output from another address generation means and the data processing means and for sending the selected one to the address conversion means.

The present invention further provides a data processing apparatus using a buffer memory, the data processing apparatus comprising:

a memory for storing data compressed with a fixed data compression factor;

data processing means, when at least one of image data for each pixel selected to be processed is read out of the memory, for outputting an address corresponding to the at least one of the image data;

a buffer memory for temporally storing the address output from the data processing means;

address conversion means for converting the address read out of the buffer memory to an address used for access to the memory; and data expansion means for reading a plurality of compressed data from the memory, including compressed data corresponding to the address of the at least one of the image data, based on the address converted by the address conversion means, further expanding the plurality of the read-out compressed image data, and outputting an expanded data corresponding to the address of the at least one of the image data, from among the plurality of the expanded image data, to the data processing means.

The present invention further provides a data processing apparatus using a buffer memory, the data processing apparatus comprising:

a memory for storing data compressed with a fixed data compression factor;

data processing means, when at least one of image data for each pixel selected to be processed is written into the memory, for outputting the at least one of the image data and an address corresponding to the at least one of the image data;

a buffer memory for temporarily storing the address output from the data processing means;

address conversion means for reading out the address stored in the buffer memory and converting the address to an address used for access to the memory; and data expansion means for reading a plurality of compressed image data from the memory, including compressed data corresponding to the address of the at least one of the image data, based on the address converted by the address conversion means, and expanding the plurality of the read-out compressed image data; and data compression means for compressing the plurality of the expanded image data and the at least one of the image data output from the data processing means at the fixed data compression factor, and storing the plurality of the compressed image data into their original area of the memory, based on the converted address for memory access.

To the above-mentioned data processing apparatus, the below-mentioned features can be added.

(1) The data processing apparatus further includes a reduced image signal generation means for determining addresses necessary for forming a contracted image in accordance with a designated image reduction ratio, and for generating signals forming the contracted image by using compressed data read out of the memory, based on the determined addresses.

(2) The memory is divided into a plurality of blocks, and each block includes compressed data composed of approximate color data and approximate color arrangement data. The data processing apparatus includes an enlargement/contraction processing means for reading approximate color arrangement data of a designated block from the memory and performing enlargement/contraction processing for the approximate color arrangement data, based on a selected enlargement/contraction ratio, and an enlarged/contracted image signal generation means for reading approximate color signal data of the designated block from the memory and for generating signals forming the enlarged/contracted image and expanding pertinent compressed data by using the approximate color signal data and the approximate color arrangement data processed by the enlargement/contraction processing means.

In the above mentioned data processing apparatus, when at least one of image data for each pixel selected to be processed (selected pixel data) is read out or written into the memory, memory access is executed, based on an address in the memory, corresponding to the selected pixel data, and a plurality of compressed image data including compressed image data corresponding to the address of the at least one of the image data is read out of the memory. The plurality of compressed image data are expanded, and the expanded image data is compressed with a fixed data compression factor, and the compressed data is stored into the original area in the memory, according to addresses based on the address of the at least one of the image data. Therefore, it is possible to prevent deterioration of the image quality even if image data is processed in a unit of one pixel, and to avoid an increase in the capacity of the memory. That is, in accordance with the above-mentioned data processing means, a memory access similar to that using a bit map memory is possible, and the memory can be efficiently used by storing compressed data. Furthermore, the compression factor can be set to a predetermined value independent of the kinds of images contained in a frame of data.

BRIEF DESCRIPTION OF THE DRAWINGS

FIG. 2 is a schematic block diagram of the 16-level dither processing part shown in FIG. 1.

FIGS. 3(a) to 3(d) are diagrams of the dither matrixes used for the 16-level dither processing part.

FIGS. 4(a) to 4(p) are diagrams of outputs from the 16-level dither processing part.

FIGS. 7(a) to 7(d) are diagrams of outputs from the bit selection table shown in FIG. 6.

FIGS. 20A–20C are diagrams for explaining operations of the multivalued dither matrixes used in the embodiment of FIG. 14.

FIG. 37 is a functional diagram for explaining data write-in processing and data read-out processing in the image data compression method.

FIGS. 42A and 42B are diagrams for explaining a reduced image generation method.

DETAILED DESCRIPTION OF THE EMBODIMENTS

Hereinafter, details of the present invention will be explained with reference to the various embodiments shown in FIGS. 1–43.

Figure 43:
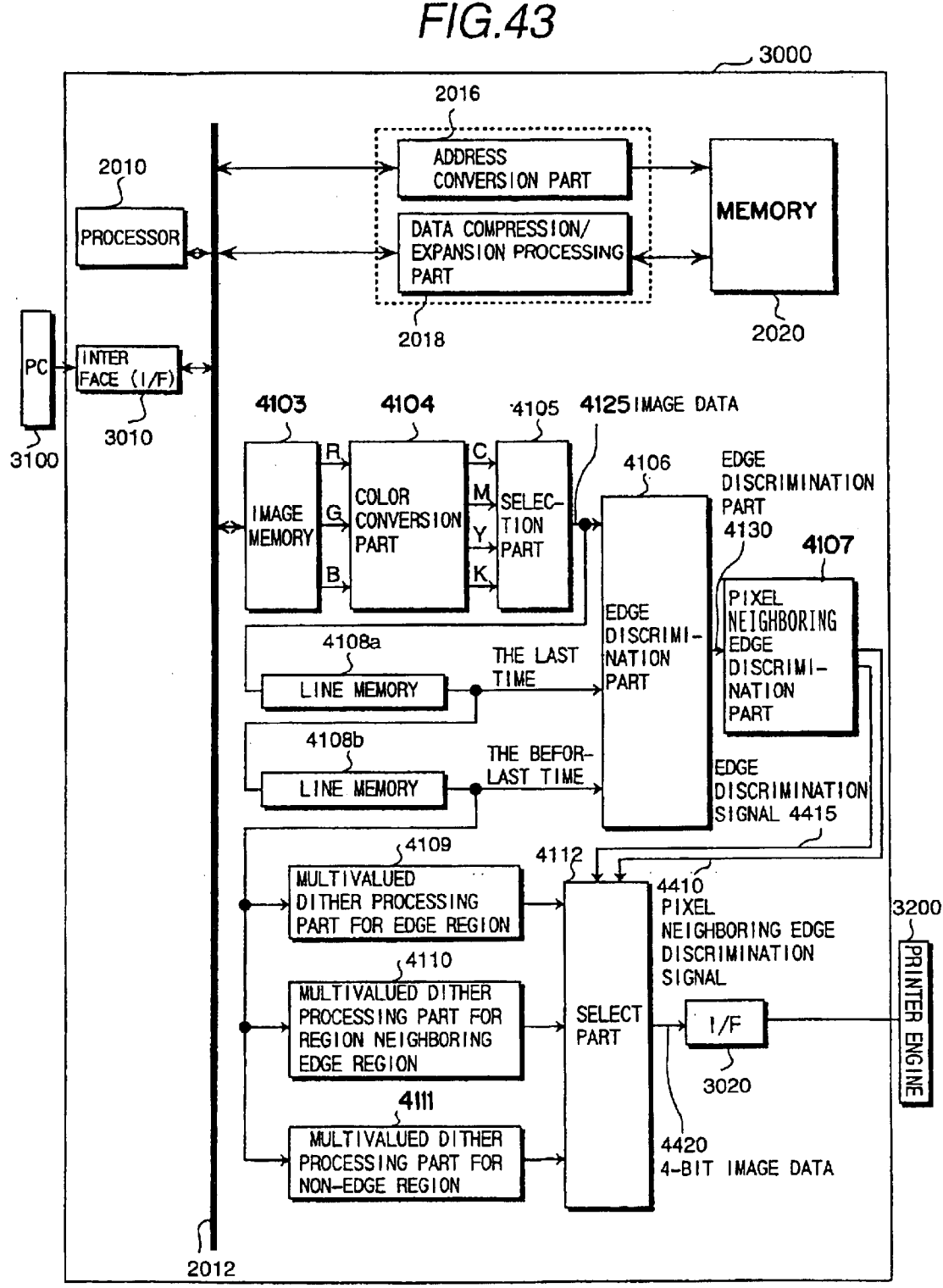
FIG. 43 is an overall schematic block diagram of the printer controller according to the present invention.

In FIG. 43, an overall schematic block diagram of a printer controller 3000 representing an embodiment according to the present invention is shown.

The printer controller 3000 is connected to a personal computer 3100, and it outputs color data of 4 bits/pixel to a printer engine 3200 based on data sent from the personal computer 3100. The printer engine 3200 converts each of the color data of 4 bits/pixel sent from the printer controller 3000 to pulses, the width of each pulse corresponding to the value of each color data, and it forms a color image having the color density gradation on printing paper by depositing coloring matter for a color corresponding to each color data as a printing dot on the printing paper, the size of the printing dot for the color data being changed according to the width of a purse generated for each color data.

The printer controller 3000 includes an interface 3010 and a CPU 2010 for receiving data sent from the personal computer 3100, a bus 2012 composed of a plurality of signal wires for sending addresses and a plurality of signal wires for sending data, an address conversion part 2016 for converting an address of the CPU 2010 to addresses in a memory 2020 and vice versa, and a data compression/expansion processing part 2108 for compressing or expanding data.

In data compression/expansion processing, when image data of each pixel selected to be processed (referred to as the selected pixel data) is output together with its address, the address sent from the CPU 2010 is converted to an address for access to the memory 2020, and the memory 2020 is searched for the compressed data, based on the converted address for memory access. All compressed data in a block where the compressed data corresponding to the converted address of the selected pixel data is included is read out of the memory 2020, and the read compressed data is expanded by the compression/expansion part 2018. From among the expanded data, the expanded data corresponding to the selected pixel data is transferred to the CPU 2010. When the image data processed by the CPU 2010 is written in the memory, the data output from the CPU 2010 and the address of the data are identified, and the processed image data is compressed with a fixed data compression factor, and the compressed image data is stored into its original position in the memory 2020.

The printer controller 3000 further includes a color conversion part 4104 for converting color data expressed by the three colors "R, G, B" to color data expressed by the four colors "C, M, Y, K" of coloring material used for printing images on printing paper. The printer controller 3000 further includes a selection part 4105 for sequentially selecting color data for the colors "C, M, Y, K" according to the data amount for one frame, an edge pixel discrimination part 4106 for discriminating pixels in an edge region, a pixel neighboring edge discrimination part 4107 for discriminating pixels in a region neighboring edge region, a multivalued dither processing part 4109 for an edge region (referred to as the first region), a multivalued dither processing part 4110 for a region neighboring an edge region (referred to as the second region), a multivalued dither processing part 4111 for pixels belonging to a region other than the first and second regions (referred to as the third region), a selection part 4112 for selecting one of three groups of outputs from the three dither processing parts, and an interface 3020 to the printer engine 3200.

The above three multivalued dither processing parts discriminate the first, second, and third regions of an image. Multivalued dither processing using a prepared dot distribution type multivalued dither matrix is performed for pixels in the first region, and multivalued dither processing using a prepared dot concentration type multivalued dither matrix is performed for pixels in the third region. Furthermore, multivalued dither processing using a prepared mixture of dot distribution and concentration type (referred to as mixture type) multivalued dither matrix is performed to pixels in the second region.

In the following, each of the parts which make up the printer controller 3000 will be explained. Hereupon, it is also possible to operate each part as an independent unit.

Figure 1:
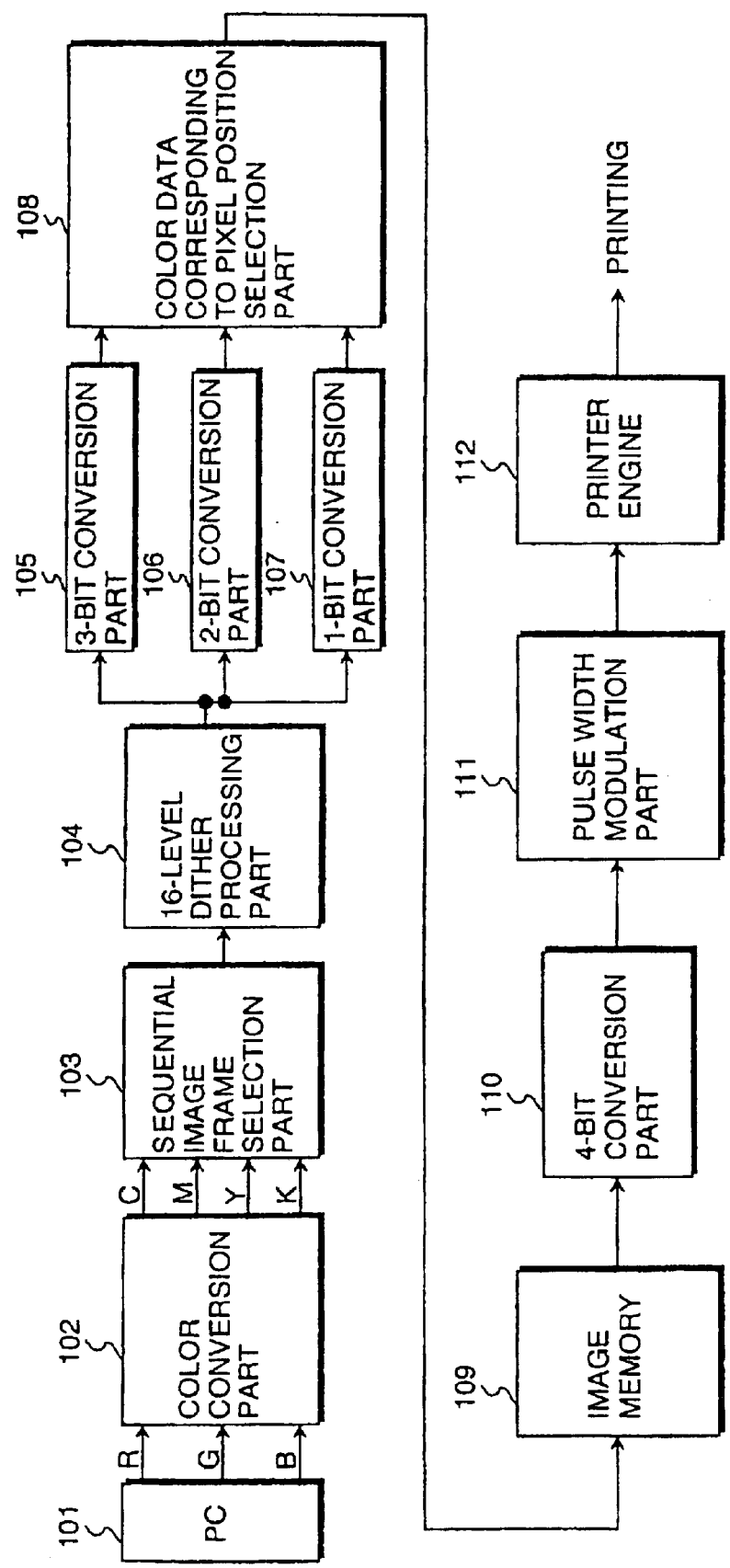
FIG. 1 is a schematic block diagram of a color laser printer system representing an embodiment according to the present invention.

FIG. 1 shows a schematic block diagram of a color laser printer system according to the present invention, which performs a multivalued dither processing. A 16-level dither processing part 104, a 3-bit conversion part 105, a 2-bit conversion part 106, an 1-bit conversion part 107, a color data corresponding to pixel position selection part 108, an image memory 109, and a 4-bit conversion part 110, partially correspond to a processing means composed of the multivalued dither processing parts 4109, 4110 and 4111 shown in FIG. 43. In FIG. 1, PC 101 indicates a host computer, and the host computer PC 101 outputs color data of 8 bite/pixel expressed by the three colors "R, G, B" for each pixel of a full color image.

A color conversion pert 102 converts color information expressed by the three colors "R, G, B" to color data of 7 bits/pixel expressed by the four colors "C, M, Y, K" of coloring material used for printing images on printing paper Furthermore, the value of each color in the color data ranges from 0 to 75.

The color conversion part 102 is implemented, for example, by means of a conversion table composed of a semiconductor memory in which the converted pixel data of 28 bits for the four colors "C, Y, M, K" is stored at addresses which correspond to the value of the 24 bit original pixel data for the colors "R, G, B". In the above-mentioned conversion table, by inputting the value of the 24 bit pixel data for the colors "R, G, B" to the conversion table, the 28 bit conversed pixel data for the colors "C, Y, M, K" can be immediately obtained.

A sequential image frame selection part 103 sequentially selects and outputs color data for the colors "C, Y, M, K" in the data amount of one frame, and this selection part can be implemented by using a selector.

The 16-level dither part 104 performs multivalued dither processing of a lump of color data for each color "C, Y, M, K", and converts color data of 7 bits/pixel to color data of 4 bits/pixel.

The 3-bit conversion part 105 converts color data of 4 bits/pixel output from the 16-level dither part 104 to color data of 3 bits/pixel. The 2-bit conversion part 106 converts color data of 4 bits/pixel output from the 16-level dither part 104 to color data of 2 bits/pixel. Furthermore, the 1-bit conversion part 107 converts color data of 4 bits/pixel output from the 16-level dither part 104 to color data of 1 bit/pixel.

The color data corresponding to pixel position selection part 108 selects one of the three color data output from the 3-bit conversion part, the 2-bit conversion part and the 1-bit conversion part, corresponding to the position at which the color data of the selected pixel is to be primed, and sends the selected data to the image memory 109.

The image memory 109 stores color data of "C, M, Y, K" for one image data page to be printed.

The 4-bit conversion part 110 converts each of the color data of 1 bit/pixel, 2 bits/pixel, and 3 bits/pixel, output from the image memory 109, to color data of 4 bits/pixel.

The pulse width modulation part 111 converts each color data of 4 bits/pixel to a pulse whose width is proportional to the value of the color data.

The printer engine 112 forms a color image having the color density gradation on printing paper by depositing coloring matter for a color specified by each color data as a printing dot, the size of the printing dot being changed corresponding to the width of a pulse sent from the pulse width modulation part 111 for each color data.

In the following, the details of each part mentioned above will be explained.

At first, the 16-level dither processing part 104 will be explained in detail.

In FIG. 2, a schematic block diagram of the 16-level dither processing part 104 is shown.

As seen in this figure, a subtraction part 201 subtracts the value of each element in a dither matrix 202 for each color "C, M, Y, K" from the value of each color in each color data. The subtraction part 201 can be implemented by using a subtracter composed of logic circuits.

The dither matrix 202, which is prepared for each color "C, M, Y, K", is composed of 25 elements (5 elements in the main scanning direction×5 elements in the subordinate scanning direction), and it outputs the value of an element corresponding to the position of each pixel, for each color. Moveover, the dither matrix 202 is composed of a counter cyclically counting 0 to 4 by using a clock signal having a cycle period equal to a period of inputting each color data of one pixel, and the contents of which are reset at the start of each line scanning, another counter cyclically counting 0 to 4 by using a clock signal having a cycle period equal to a period of inputting color data of one scanning line, the contents of which are reset at the start of each page scanning, and a register file for storing values of matrix elements in advance and for outputting the value of an element corresponding to an address assigned by two outputs of the two counters.

FIGS. 3(a) to 3(d) show an example of the contents of the dither matrix 202 for each color. Five elements enclosed by heavy lines are set to one block, and the dither matrix 202 is formed by combining 5 blocks. As shown in FIGS. 3(a) to 3(d), the respective arrangements of 5 blocks in the dither matrixes for four colors are different from each other. This is done to prevent deterioration of the image quality, since overlapping dots for colors can be avoided by changing the screen angle in dot printing for each color.

Referring again to FIG. 2, an overflow/underflow control part 203 outputs the value 15 if the output value of the subtraction part 201 exceeds 15 as a decimal number, and it outputs the value 0 if the output value of the subtraction part 201 is 0 or less.

In the above-mentioned composition of the 16-level dither matrix 104, the value of an element corresponding to the position of a pixel in the dither matrix 202 for each color is subtracted from the value of a color in each color data of 7 bits/pixel of the pixel, which ranges from 0 to 75. Furthermore, it outputs 15 if the subtraction result indicates a 15 or more value and outputs 0 if the subtraction result indicates a 0 or less value.

An example of the results obtained in the 16-level dither processing is shown in FIGS. 4(a) to 4(p).

The dither processing results are for color data of pixels corresponding to one block of five elements enclosed by heavy lines in the dither matrix for yellow. In the drawing, one square represents one pixel. The number shown over each block indicates the value of each of the color data corresponding to the five pixels which are input to the 16-level dither processing part 104 shown in FIG. 2. In this case, the color data for the five pixels have the same value. A white square indicates that the value of color data of 4 bits/pixel obtained by the dither processing of color data of 7 bits/pixel for a pixel corresponding to a white square is 0. A black square indicates that the value of color data of 4 bits/pixel obtained by the dither processing of color data of 7 bits/pixel for a pixel corresponding to a black square is 15. Furthermore, squares of which ⅓ and ⅔ of the respective areas are black, show that the values of color data of 4 bits/pixel obtained by the dither processing of color data of 7 bits/pixel for pixels corresponding to the squares are 5 and 10, respectively. As shown in FIGS. 4(a) to 4(p), if the 16-level dither processing is performed by using the dither matrix for yellow shown in FIG. 3, as the value of the color data for the block increases, squares are colored in the order of a left-upper square, a left-lower square, a right-upper square, and so forth.

Furthermore, although only a color gradation of 16 levels can be expressed by using color data of 4 bits/pixel if dither processing is not performed, it is possible to express a color gradation of 76 levels by using color data of 4 bits/pixel by regarding a block of five pixels neighboring each other as one pixel, if dither processing is not performed.

In the following, the 3-bit conversion part, the 2-bit conversion part, and the 1-bit conversion part, will be explained.

Figure 5:
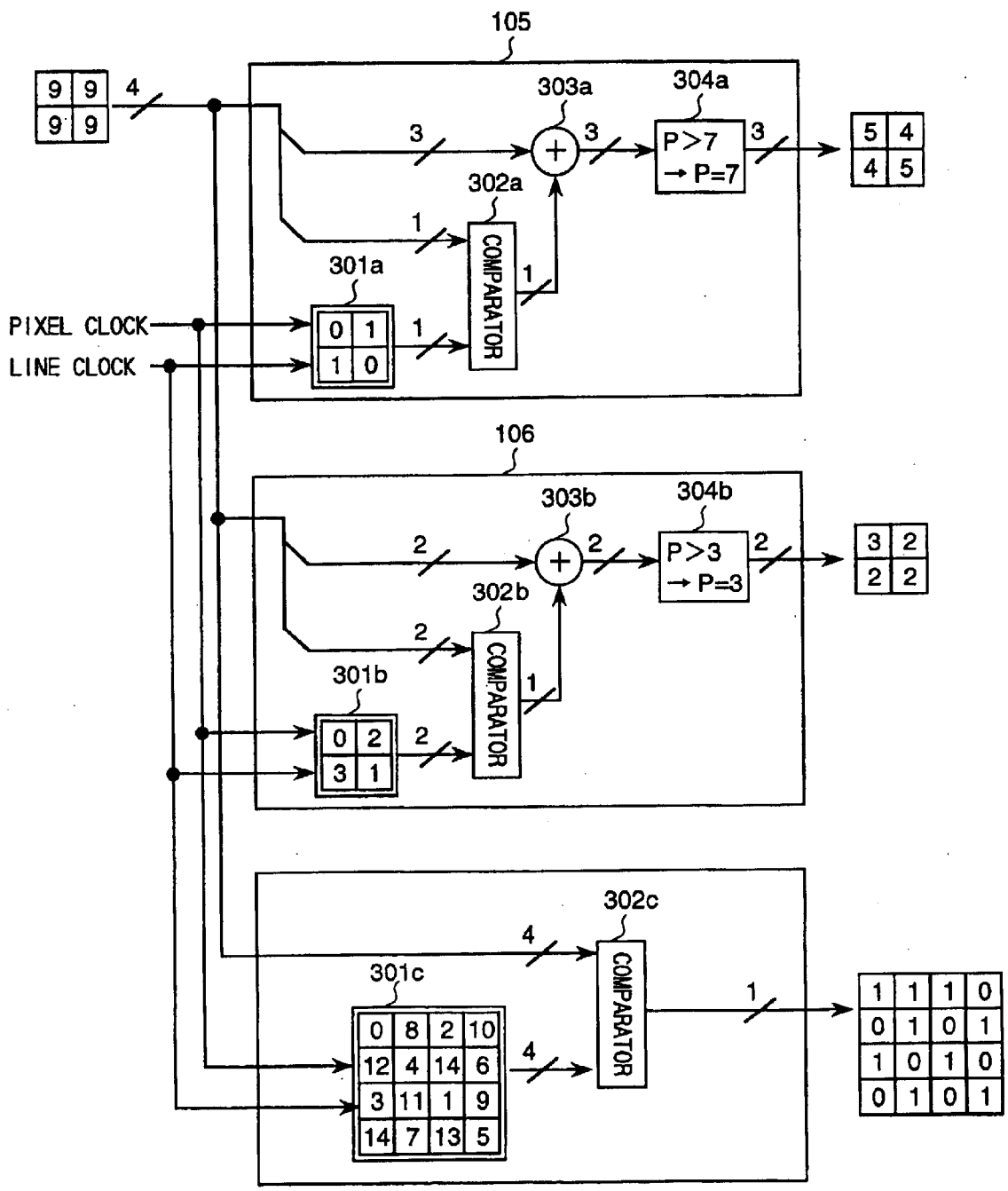
FIG. 5 is a schematic diagram of the 3/2/1 bit conversion parts shown in FIG. 1.

A schematic block diagram of the 3/2/1 bit conversion parts is shown in FIG. 5.

In this figure, each of the dither matrixes 301a and 301b is composed of 4 elements (2 elements in the main scanning direction×2 elements in the subordinate scanning direction), and it outputs the value of an element corresponding to the position of each pixel, for each color. Moreover, the dither matrix 301c is composed of 16 elements (4 elements in the main scanning direction×4 elements in the subordinate scan-ning direction), and it outputs the value of an element corresponding to the position of each pixel, for each color. These dither matrixes can be provided in a similar way to that for the dither matrix 202 in the above-mentioned 16-level dither processing part 104.

A comparison part 302a outputs 1 if the value of the lowest bit in each of the input color data is larger than the value of an element of the dither matrix 301a, corresponding to the color data; otherwise, it outputs 0. A comparison part 302b outputs 1 if the value of the lower 2 bits in each of the input color data is larger than the value of an element of the dither matrix 301b, corresponding to the color data; otherwise, it outputs 0. Moreover, a comparison part 302c outputs 1 if the value of each of the input color data is larger than the value of an element of the dither matrix 301c, corresponding to the color data; otherwise, it outputs 0. Each of these comparison parts can be implemented by using a comparator composed of logic circuits.

An addition part 303a adds the value output from the comparator 302a to the value of the upper 3 bits in each of the input data. This addition part 303a can be provided in the form of an adder of 3 bits composed of logic circuits. An addition part 303b adds the value output from the comparator 302b to the value of the upper 2 bits in each of the input data. This addition part 303b can be an adder of 2 bits composed of logic circuits.

Furthermore, an overflow control part 304a outputs the decimal number 7 if the value output from the addition part 303a exceeds 7, otherwise, it outputs the value as it is. This control part can be implemented by using a logic circuit which outputs the fixed value 7 if a carry-out signal of an adder used in the addition part 303a is 1. An overflow control part 304b outputs the decimal number 3 if the value output from the addition part 303b exceeds 3, otherwise, it outputs the value of the data as it is. This control pert can be implemented by using a logic circuit which outputs the fixed value 3 if a carry-out signal of an adder used in the addition part 303b is 1.

Each bit conversion part operates as follows. The 3-bit conversion part 105 converts color data of 4 bits/pixel to color data of 3 bits/pixel.

If the 3-bit conversion part simply outputs the upper 3 bits of color data of 4 bits/pixel, the 16-level color gradation expressed by 4-bit data is changed to an 8-level color gradation expressed by 3-bit data. For example, if all color data of 4 pixels (2 pixels in the main scanning direction×2 pixels in the subordinate scanning direction) have the value 9, all the values of color data for the 4 pixels are converted to "4". The conversion results are the same as those for color data all having the value 8. Hereupon, in this embodiment, by comparing the value of the lowest bit in each of the input color data with the value of an element of the dither matrix 301a, corresponding to the color data, and adding the result obtained by the comparison processing to the upper 3 bits of the color data of 4 bits/pixel, it is possible to express the color gradation pastern of color data all having the value of 9 different from that or color data all having the value of 8. That is, in the example shown in FIG. 5, if all the input color data have the same value of 9, the values "5" and "4" are output in the area of the 2×2 color data matrix in a zigzag manner, and the average of the values of four color data is 4.5. Since the average is 4.0 for color data all having the value of 8, the color gradation of the area can be differently expressed between the above-mentioned two cases.

Similarly, the 2-bit conversion part 106 converts color data of 4 bits/pixel to color data of 2 bits/pixel, by comparing the value of the lower 2 bits in each of input color data with the value of an element of the dither matrix 301b, corresponding to the color data, and adding the 1 bit data of the result data in the comparison to the upper 2 bits of the color data of 4 bits/pixel. Therefore, if all the input color data have the same value of 9, the values "2" and "3" are output in the area of the 2×2 color data matrix, and the average of the values of four color data is 2.25. Since the average is 4.0 for color data all having the value of 8, the color gradation of the area can be differently expressed between the above-mentioned two cases. Moreover, the 1-bit conversion part 107 compares the value of each of the input color data with the value of an element of the dither matrix 301c, corresponding to the color data, and outputs the 1-bit data of the result data in the comparison. Therefore, if all the input color data have the same value of 9, nine color data of the value "1" and seven color data of the value "0" are output in the area of the 4×4 color data matrix, and the average of the values of four color data is 0.56. On the other hand, if all the input color data have the same value of 8, since the values "1" and "0" are alternatively output in the data matrix, the average is 0.5 for color data all having the value of 8. Consequently, the color gradation of the area also can be differently expressed between the above-mentioned two cases.

In the following, the color data corresponding to pixel position selection part 108 will be explained.

Figure 6:
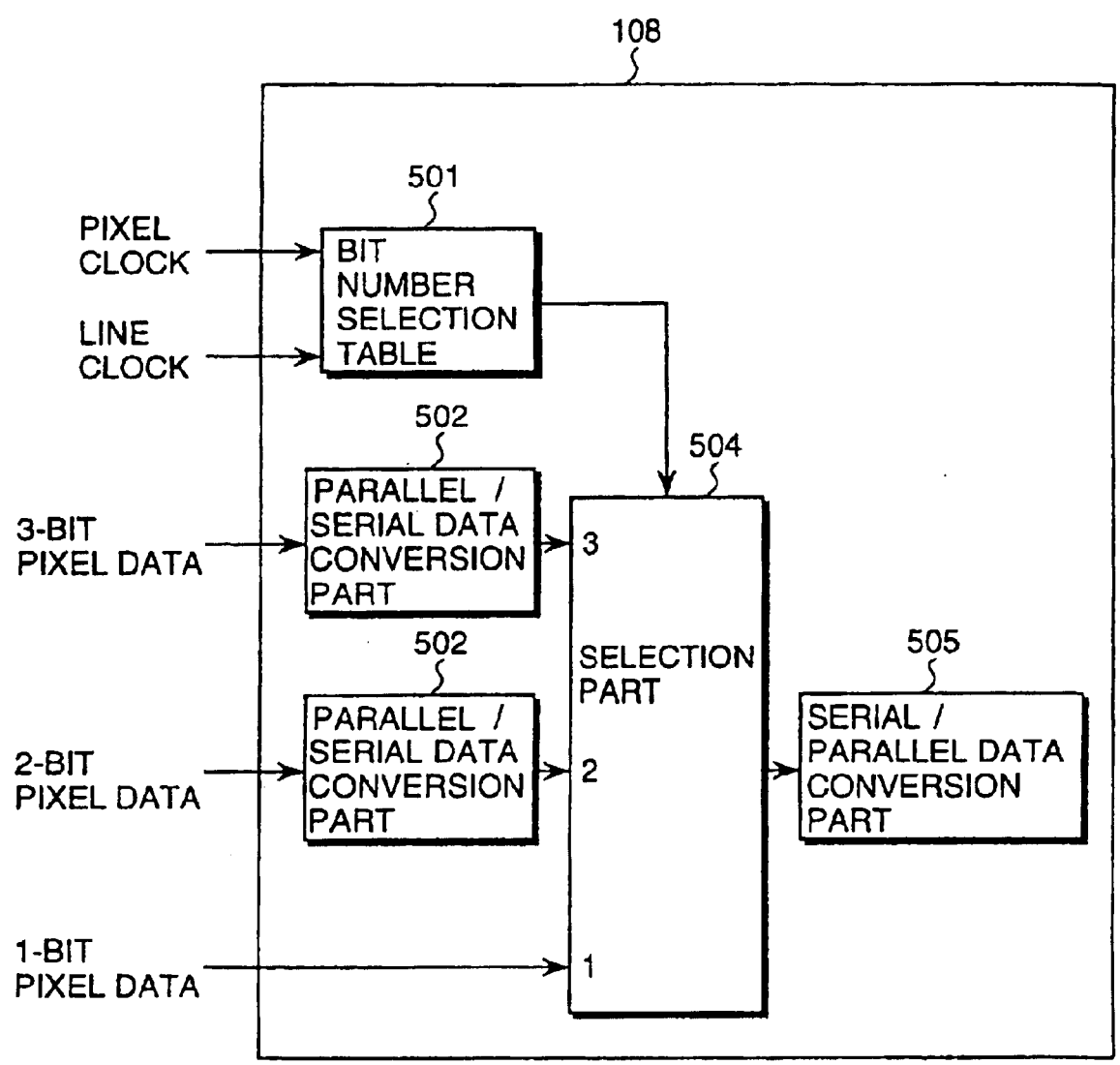
FIG. 6 is a schematic block diagram of the color data selection part corresponding to the pixel position selection part shown in FIG. 1.

In FIG. 6, a schematic block diagram of the color data corresponding to pixel position selection part 108 is shown.

In this figure, a bit number selection table 501 outputs the bit number of color data corresponding to the position of each of 25 pixels in a 5×5 matrix (5 pixels in the main scanning direction ×5 pixels in the subordinate scanning direction). This selection table can be formed by using the same logic circuits as those used in the dither matrix 202 of the 16-level dither processing part 104.

In FIG. 7, the relation between the bit number, which is output from the bit number selection table 501, and the position of each pixel in the matrix is shown.

As shown in FIG. 7 and FIG. 3, the matrixes 501a–501d correspond to the dither matrixes 202a–202d for the 16-level dither processing, and the value of an element in the matrix for a color, the element corresponding to an element in the dither matrix for the color, is smaller if the corresponding element in the dither matrix has a larger value.

In FIG. 6, a parallel to serial data conversion part 502 converts parallel data of 3 bits output from the 3-bit conversion part shown in FIG. 1 to serial bit data. This conversion part can be implemented by using a serial to parallel data converter composed of logic circuits. Moreover, a parallel to serial data conversion part 503 converts parallel data of 2 bits output from the 2-bit conversion part shown in FIG. 1 to serial bit data. This conversion part also can be implemented by using a serial to parallel data converter composed of logic circuits.

A color data selection part 504 selects one of the data output from the 3-bit conversion part 105, the 2-bit conversion part 106 and the 2-bit conversion part 107, corresponding to the value of bit number data output from the bit selection table 501. This selection part can be implemented by using a selector composed of logic circuits.

A serial to parallel data conversion part 504 converts serial bit data output from the color data selection part 504 to parallel data of a plurality of bits (for example, 32 bits). This conversion part can be implemented by using a parallel to serial data converter composed of logic circuits.

As mentioned above, in the color data corresponding to pixel position selection part 108, the bit number selection table 501 outputs bit number data corresponding to a pixel to be processed to control the color data selection in the selection part 504. In accordance with the bit number data, the selection part 504 selects one of 3-bit color data converted to serial bit data, 2-bit color data converted to serial bit data, and 1-bit color data. Each serial data output from the selection part 504 is converted to parallel data by the serial/parallel data conversion part 505, and every time data of 32 bits has been accumulated, the data of 32 bits are output to the image memory 109 as one unit of color data.

In the result, for each color, color data of 3 bits output from the 3-bit conversion part 105 is selected is color data of the pixels, corresponding to the positions at which elements of the dither matrixes 202a–202d, shown in FIG. 3 for the 16-level dither processing, have the values of 0 and 15; color data of 2 bits output from the 2-bit conversion part 106 is selected if color data of pixels, corresponding to the positions at which elements of the dither matrixes, have the value 30; and color data of 1 bit output from the 1-bit conversion part 107 is selected if color data of pixels, corresponding to the positions at which elements of the dither matrixes, have the values 45 and 60. Each selected data is converted to parallel data of 32 bits and is written into the image memory 109.

Furthermore, when color data of 32 bits has been accumulated by an amount corresponding to one page in the image memory 109, each color data is read out of the image memory 109 in the order of data writing and is sent to the 4-bit conversion part 110 shown in FIG. 1.

In the following, the 4-bit conversion part 110 shown in FIG. 1 will be explained.

Figure 8:
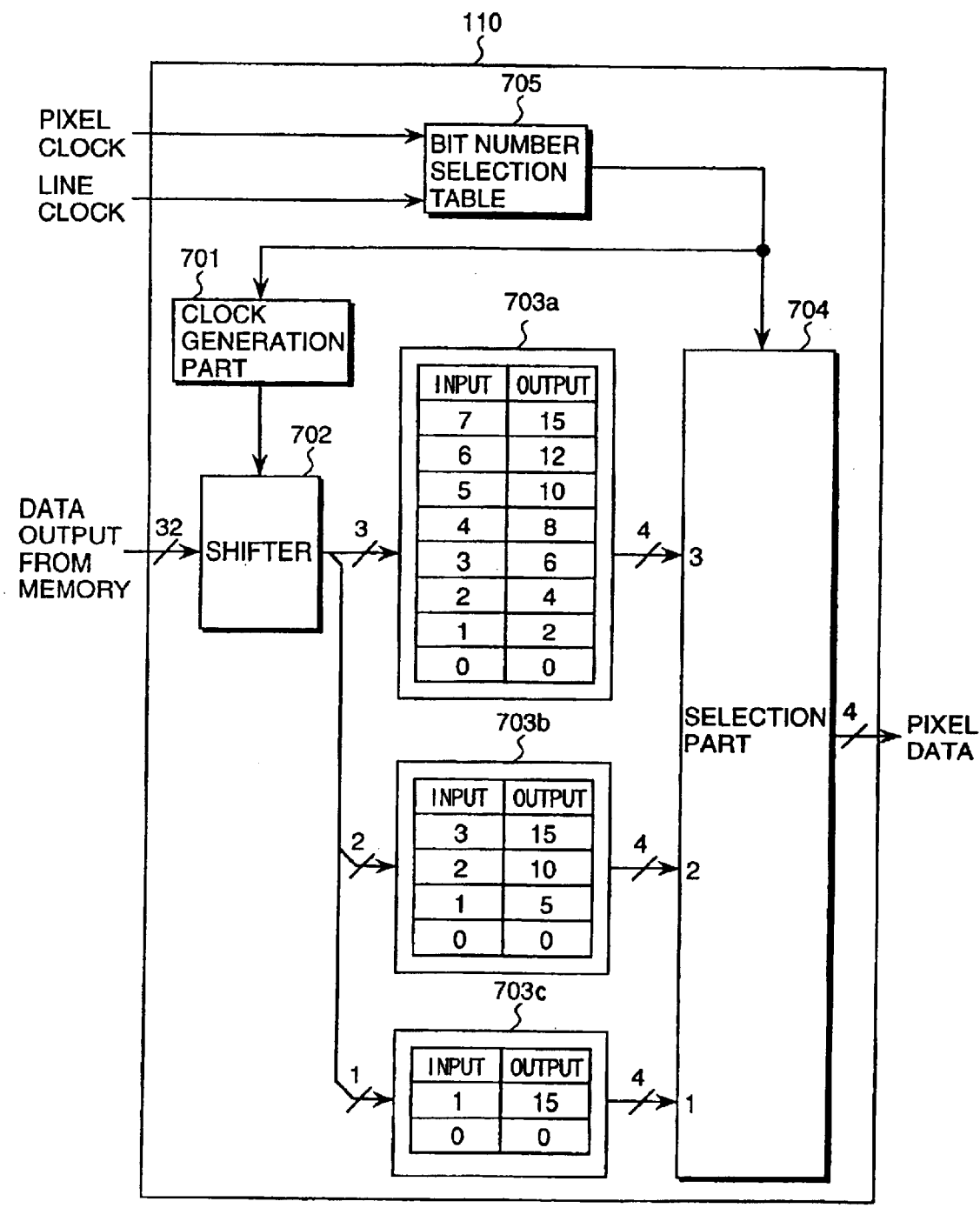
FIG. 8 is a schematic block diagram of the 4 bit conversion part shown in FIG. 1.

In FIG. 8, a schematic block diagram of the 4-bit conversion part 110 is shown.

A bit number selection table 705 operates similarly to the bit number selection table 501 of the color data corresponding to pixel position selection part 108 shown in FIG. 3, and it outputs the bit number of color data corresponding to a pixel to be processed in the 4-bit conversion part. That is, if color data of 3 bits output from the 3-bit conversion part 105 is to be processed, the bit number selection table 705 outputs "1", if color data of 2 bits output from the 2-bit conversion part 106 is to be processed, the bit number selection table 705 outputs "2", and if color data of 1-bit output from the 1-bit conversion table 107 is to be processed, the bit number selection part 705 outputs "1".

A clock generation part 701 generates clock pulses co be input to a shifter 702 during a period of processing one pixel, corresponding to the value output from the bit number selection table 705. If the value output from the bit number selection table 705 is "3", the clock generation part 701 generates 3 pulses for 3 clock periods during a period of processing one pixel. If the value output from the bit number selection table 705 is "2", the clock generation part 701 generates 2 pulses for 2 clock periods during a period of processing one pixel. Moreover, if the value output from the bit number selection table 705 is "1", the clock generation part 701 generates one pulse for one clock period during a period of processing one pixel. This generator can be formed by combining a counter of a logic circuit and a selector selecting one of the outputs from the counter.

A shifter 702 stores input parallel data of 32 bits read out of the image memory 109, and outputs the contents of the upper 3 bits in the stored input data. Furthermore, the shifter 702 shifts bits of the stored input data in the direction of the lower bits to the upper bits by the number of clock pulses, according to the clock signal generated by the clock generation part 701. This shifter can be composed of a shift register of a logic circuit.

A 3-bit to 4-bit conversion part 703a converts input data of 3 bits output from the shifter 702 to color data of 4 bits, and outputs the converted data of 4 bits. This conversion part can be implemented by using a register file in which the value of input data of 3 bits is input to an address of the value, and color data of 4 bits, which is stored at the address, is output. A 2-bit to 4-bit conversion part 703b converts input data of 3 bits output from the shifter 702 to color data of 4 bits, and outputs the converted data of 4 bits. This conversion part can be implemented by using a register file in which the value of input data of 2 bits is input to an address of the value, and color data of 4 bits, stored at the address, is output. Moreover, a 1-bit to 4-bit conversion part 703c converts input data of 3 bits output from the shifter 702 to a color data of 4 bits, and outputs the converted data of 4 bits. This conversion part can be implemented by using a register file in which the value of input data of 1 bit is input to an address of the value, and color data of 4 bits, stored at the address, is output.

A selection part 704 selects and outputs one of the data output from the 3-bit to 4-bit conversion part 703a, the 2-bit to 4-bit conversion part 703b, and the 1-bit to 4-bit conversion part 703c. This selection part can be composed of a selector of a logic circuit.

As mentioned above, the 4-bit conversion part 110 converts the stored and read-out image data, of which the bit number (3 bits, 2 bits or 1 bit) is different depending on the position of the pixel, to image data of 4 bits. In the conversion processing, at first, one color data of 32 bits is latched into the shifter 702 from the image memory 109. Next, the bit number selection table 705 outputs the bit number of color data to be processed. Then, for example, if the value output from the bit number selection table 705 is "3", color data which is obtained by converting the data of the upper 3 bits in the shifter 702 to data of 4-bits using the 3-bit to 4-bit conversion part 703a is selected and output by the selection part 704. After the data is output by the selection part 704, pulses for 3 clock periods are output from the clock generation part 701, the image data in the shifter 702 is shifted by 3 bits in the upper direction, and the next pixel data is located at the highest position in the shifter 702. On the other hand, if an output signal from the bit number selection table 705 is "2", color data which is obtained by converting the data of the upper 2 bits in the shifter 702 to color data of 4 bits using the 2-bit to 4-bit conversion part 703b is selected and output by the selection part 704. After the data outputting, pulses for 2 clock periods are output from the clock generation part 701, and the image data in the shifter 702 is shifted by 2 bits in the upper direction. That is, each pixel data is converted to data of 4 bits in order, in accordance with the bit number data output from the bit number data selection table 705, and the converted data of 4 bits is selected by the selection part 704. Furthermore, the selected data is sent to the pulse width modulation part 111 shown in FIG. 1.

Although all color data sent to the pulse width modulation part 111 is data of 4 bits, the range of the value in each color data is different corresponding to the kind of data. That is, the range of the value in color data converted from color data of 3 bits is widest, and that in color data converted from color data of 1 bit is narrowest. In other words, the color data conversed from data of 3 bits can express the largest number of color gradations, and the color data converted from data of 1 bit will express the least number of color gradations.

In the following, the pulse width modulation part 111 will be explained.

Figure 9A:
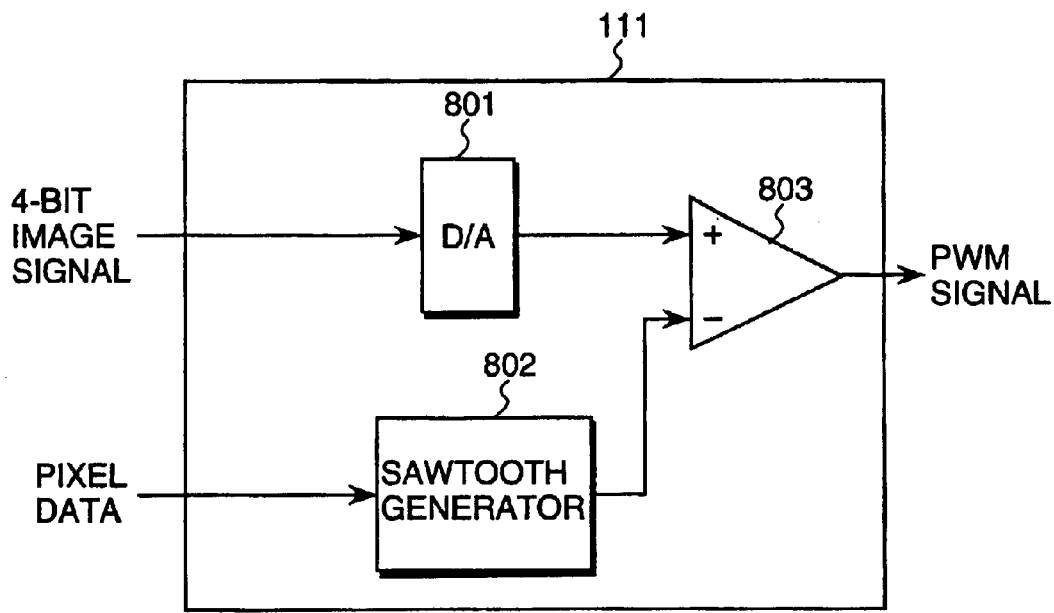
FIGS. 9A and 9B are a schematic block diagram and a diagram of operations of the pulse width modulation part shown in FIG. 1, respectively.
Figure 9B:
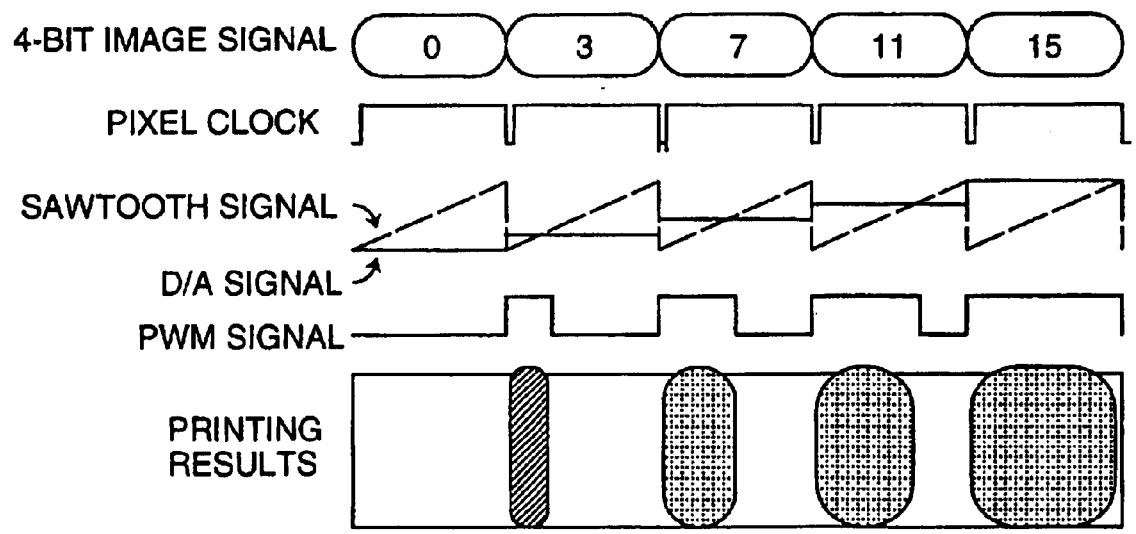

FIG. 9A is a schematic block diagram of the pulse width modulation part 111. A D/A converter 801 converts a digital signal of 4 bits to an analog signal and outputs it. This converter can be implemented by using a general D/A converter.

A sawtooth generator 802 generates a sawtooth wave of which the voltage increases proportionally to the time lapse while the value of the clock pulse for processing one pixel is "1", the voltage being reset to the ground level while the value of the clock pulse for processing one pixel is "0" This generator can be formed by combining a capacitor, resistors and an operation amplifier.

A comparison part 803 outputs "1" if the voltage output from the sawtooth generator 802 is lower than the level of an analog signal output from the D/A converter 801, otherwise, it outputs "0". This comparison part can be implemented by using an analog comparator.

That is, at first, each image data of 4 bits is converted to an analog signal by the D/A converter 801. The comparison part 803 compares the voltage of the sawtooth wave with the level of an analog signal output from the D/A converter 801, and outputs the value 1 only when the level of an analog signal output from the D/A converter 801 is higher than the voltage of the sawtooth wave. As a result, as shown by the PWM output signals in FIG. 9B, the width of a pulse output from the comparison part 803 is proportional to the value of an image data, in other words, the larger the value of the image data is, the larger will be the width of a pulse obtained. The PWM output pulse signal is sent to the printer engine 112 shown in FIG. 1.

The printer engine 112 performs coloring in the designated color on an area of printing paper corresponding to the position of a pixel of which each color data is converted to a PWM output signal, during the period of the pulse width.

In FIG. 10, the comparison between the manner of printing a unit block using a conventional method and that of the present invention is shown.

Figure 10A:
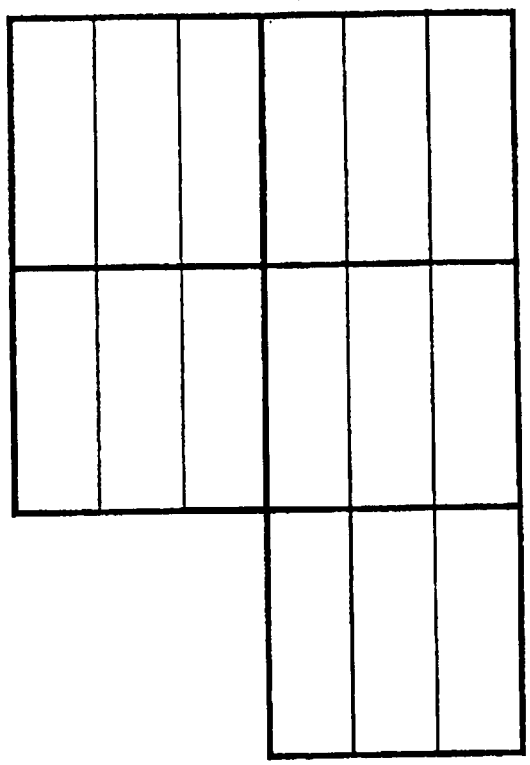
FIGS. 10(a) and 10(b) are diagrams showing a comparison between a printing unit block in a conventional method and that of the present invention, respectively.
Figure 10B:
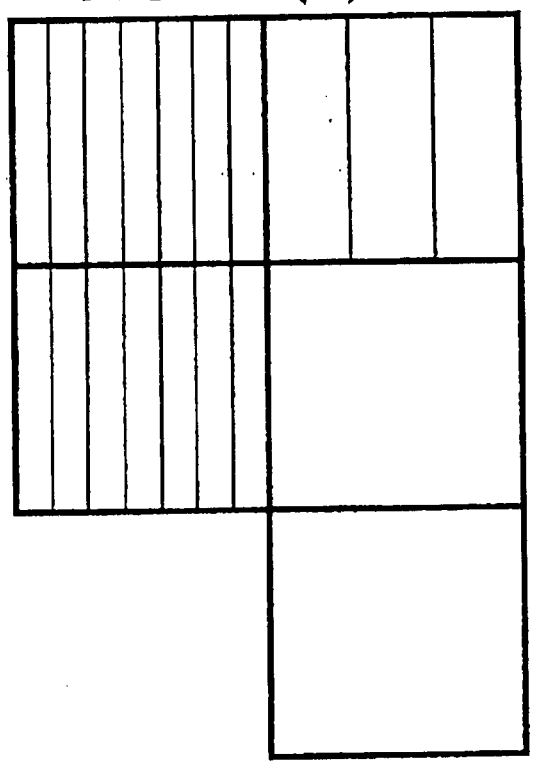

FIG. 10(a) shows a printing of a unit block using a conventional method, for example, using color data of 2 bits, and FIG. 10(b) shows the method according to the present invention.

In these illustrations, each square enclosed by heavy lines indicates a print area for one pixel, and each of the rectangular shapes divided by thin lines indicates a unit printing area of a print area. Moreover, the five squares in each of the illustrations also indicate the print area corresponding to a block enclosed by heavy lines, in which five pixels neighboring each other are expressed in each of the dither matrixes 202a–202d shown in FIG. 2.

In the conventional printing manner shown by FIG. 10(a), each color data of 2 bits/pixel is converted to a PWM pulse and printed independently of the position of a pixel, 4 levels of color gradation 0/3, 1/3, 2/3 and 3/3, are implemented for all five pixels.

On the other hand, in the printing manner of the present invention shown by FIG. 10(b), since color data of 3 bits/pixel are converted to PWM pulses and printed for the respective pixels (the left-upper pixel and the left-lower pixel in the block), the values of elements in each matrix shown in FIG. 3, corresponding to the pixels, being small, 8 levels of color gradation 0/7 to 7/7, are implemented for the two pixels. For the right-upper pixel, since each color data of 2 bits/pixel is converted to a PWM pulse and printed for the pixel, 4 levels color gradation 0/3 to 3/3, are implemented for the pixel. Moreover, for the right-lower two pixels, since color data of 1 bit/pixel is converted to PWM pulses and printed for the respective pixels, 2 levels color gradation 0/2 and 1/2, are implemented for the pixels.

Hereupon, the low value of each color data for a pixel indicates a low color density. Although print areas to pixels having the higher color density, for which element values in each dither matrix shown in FIG. 3 are small, are almost fully colored, print areas to pixels having a low color density, for which element values in each dither matrix shown in FIG. 3 are also small, are not fully, but only partially, colored. Therefore, in a low color density region, by how small the printing area unit to color a pixel in the region is, largely and directly affects the color gradation quality. Increasing the number of levels of color gradation mainly for the low color density region is very effective to improve the quality of the image efficiently by using a smaller amount of image data. This is because, although even if the bit number of color data is simply decreased for all pixels, it does not deteriorate the quality of the image in a high color density region so much, but largely deteriorates that in the low color density region, since isolated printing points, so-called "isolated dots", appear as shown in FIG. 11(a), generation of such isolated dots can be suppressed with a smaller amount of image data in comparison with simply increasing the amount of image data for all pixels by increasing the number of levels of color gradation only for the low color density region, as shown in the above-mentioned embodiment.

Figure 11A:
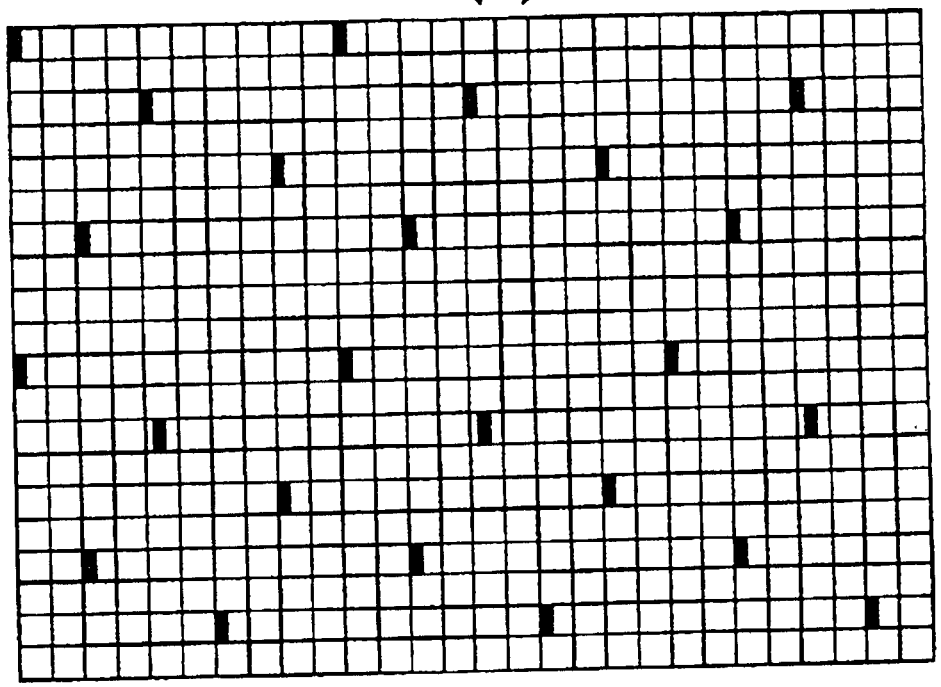
FIGS. 11(a) and 11(b) are diagrams showing the comparison between an isolated dot appearing pattern in a conventional method and that of the present invention, respectively.
Figure 11B:
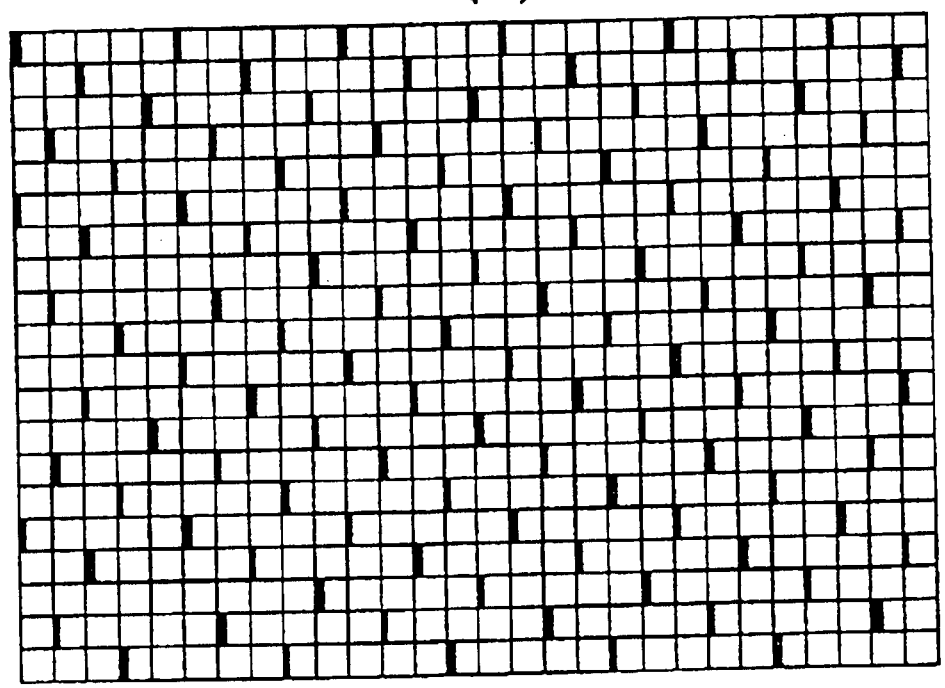

For example, although 10 bits are used for five pixels in both of FIG. 11(a) and FIG. 11(b), that is, two bits are used for one pixel on the average in both, the quality of the image equivalent to that in the image processing of color data of 3 bits can be attained in the embodiment by increasing the bit number of color data in a low color density region, in which isolated dots are likely to be prominent, and decreasing the bit number of color data in a high color density region, in which isolated dots are not prominent.

Figure 12:
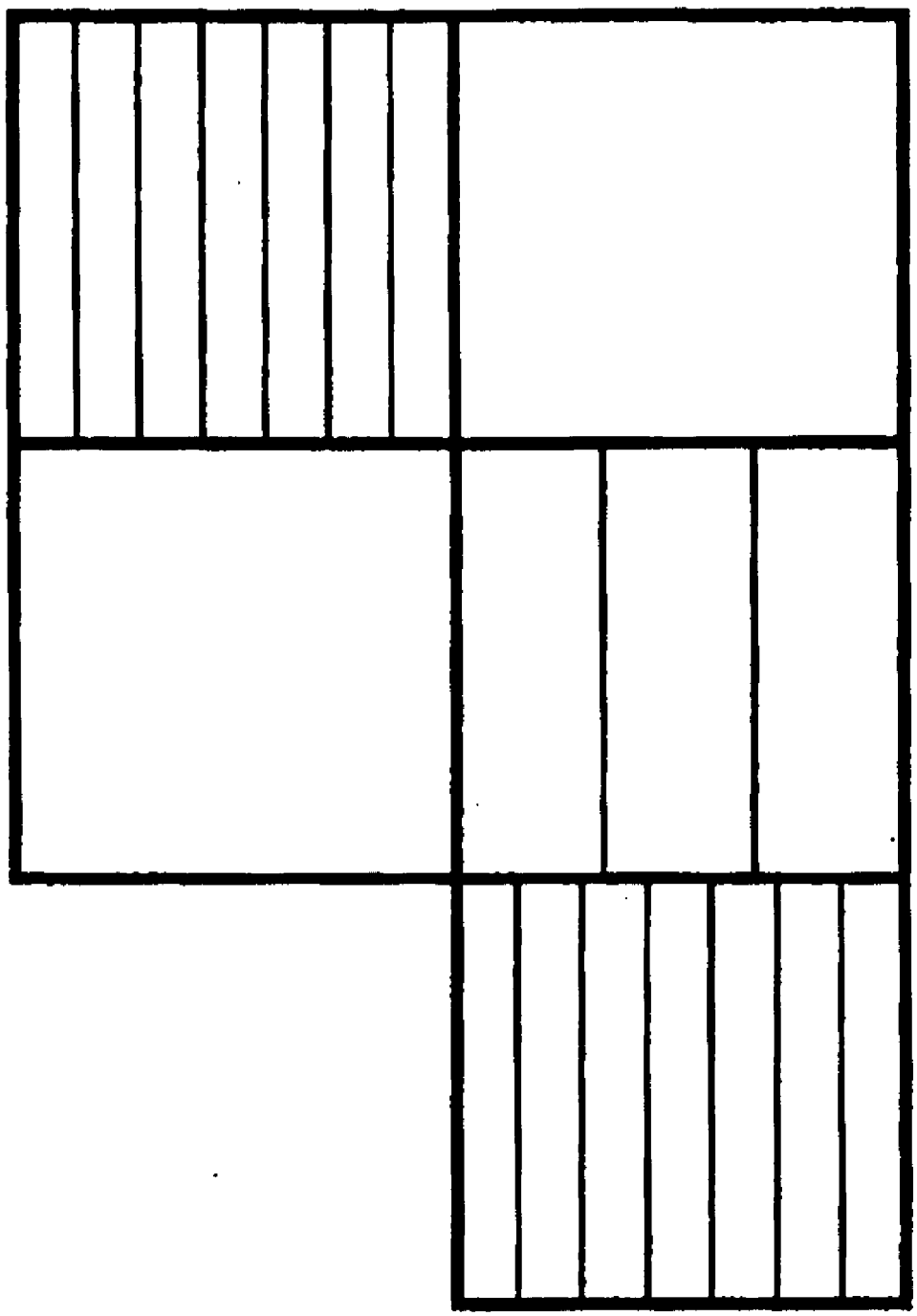
FIG. 12 is a diagram showing an example of a printing pattern in a printing unit block when a dot distribution type multivalued dither matrix is used.

The above-mentioned effects can be obtained using not only each dither matrix shown in FIG. 3, a so-called dot concentration type multivalued dither matrix in which the size of a dot is increased as the value of a corresponding color data increases, but also a dot distribution type multivalued dither matrix in which the size of a dot is distributed in order, as the value of a corresponding color data increases. In FIG. 12, a method of printing a unit block including five pixels is shown, similar to the manner of printing the blocks shown in FIG. 10(b). The left-upper square and the right-lower square are areas in which only a part of each area is colored if the color density of a pixel corresponding to the area is low.

Figure 13A:
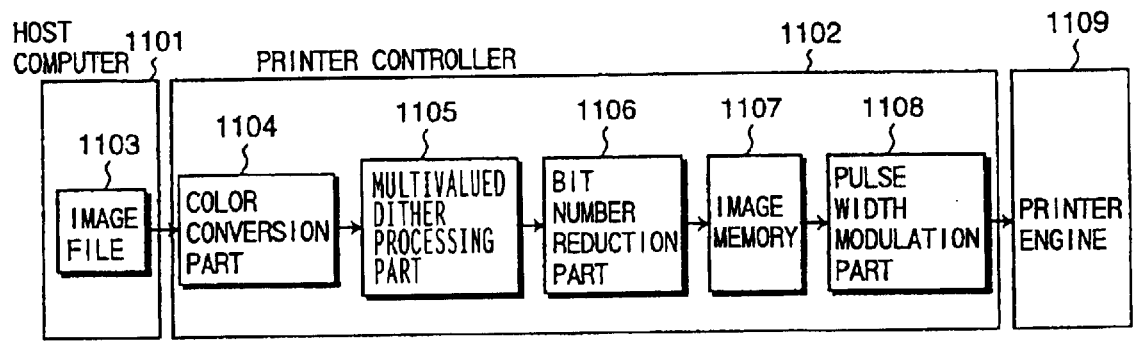
FIGS. 13A–13C are diagrams which show respective examples of the component arrangement in a printer system.
Figure 13B:
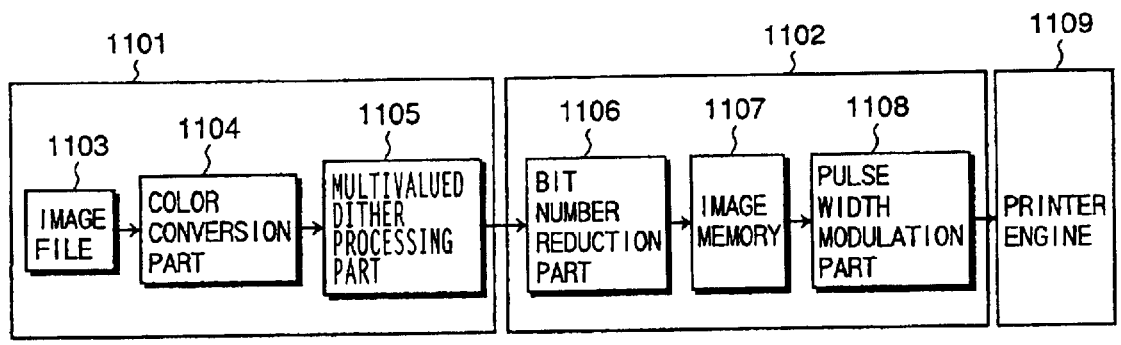
Figure 13C:
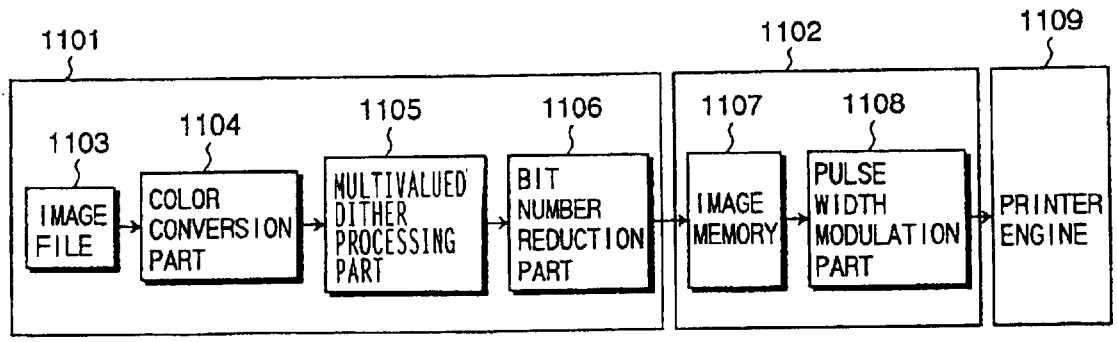

FIGS. 13A–13C show examples of the arrangement of parts composing the printer system.

In these figures, the host computer 1101 is a general computer for producing image data to be printed. A printer controller 1102 converts the image data input from the host computer 1101 to analog signals sent to a printer engine 1109. An image file 1103 is connected to the host computer 1101, and operates as a data storage device, such as a hard disc apparatus, to store the image data produced by the host computer 1101. A color conversion part 1104 converts color data "R, G, B" to color data "C, M, Y, K", and it corresponds to the color conversion part 102 shown in FIG. 1. A multivalued dither processing part 1105 executes dither processing for color data of each pixel, which, for example, converts image data of 8 bits/pixel to data of 4 bits/pixel, and it corresponds to the 16-level dither processing part 104 shown in FIG. 2. A bit number reduction part 1106 performs reduction in the bit number of color data, the reduced bit number being different depending on the position of a pixel corresponding to the color data, and it corresponds to the bit conversion parts 105, 106 and 107 shown in FIG. 1. The image memory 1103 accumulates image data in the amount of one page (image frame) and corresponds to the image memory 109 shown in FIG. 1. A pulse width modulation part 1108 converts color data for each color to a pulse width corresponding to the value of the color data, and corresponds to the pulse width modulation part 111 shown in FIG. 1. A printer engine 1109 prints image information on printing paper, and corresponds to the printer engine 112 shown in FIG. 1.

FIG. 13A shows an arrangement of the parts, in which the host computer 1101 produces image data, and the printer controller 1102 executes all processes after the image data is generated. FIG. 13B shows an arrangement of the parts, in which the host computer 1101 executes processes, including the multivalued dither processing, and sends the processed image data to the printer controller 1102. Moreover, FIG. 13C shows an arrangement of the parts, in which the host computer 1101 executes the processes up to the bit reduction processing, and sends the reduced image data to the printer controller 4102.

In the above-mentioned arrangements, the printer controller 1102 and the printer engine 1109 are generally incorporated into one printer apparatus.

In the following, another embodiment will be explained, in which the printer controller 3000 shown in FIG. 43 discriminates an edge region (tine first region) of an image, a region neighboring an edge region (the second region), and a non-edge region (the third region) which is defined as a region other than the edge region and the region neighboring an edge region, respectively, and multivalued dither processing in which a dither matrix particular to each region is used.

Figure 14:
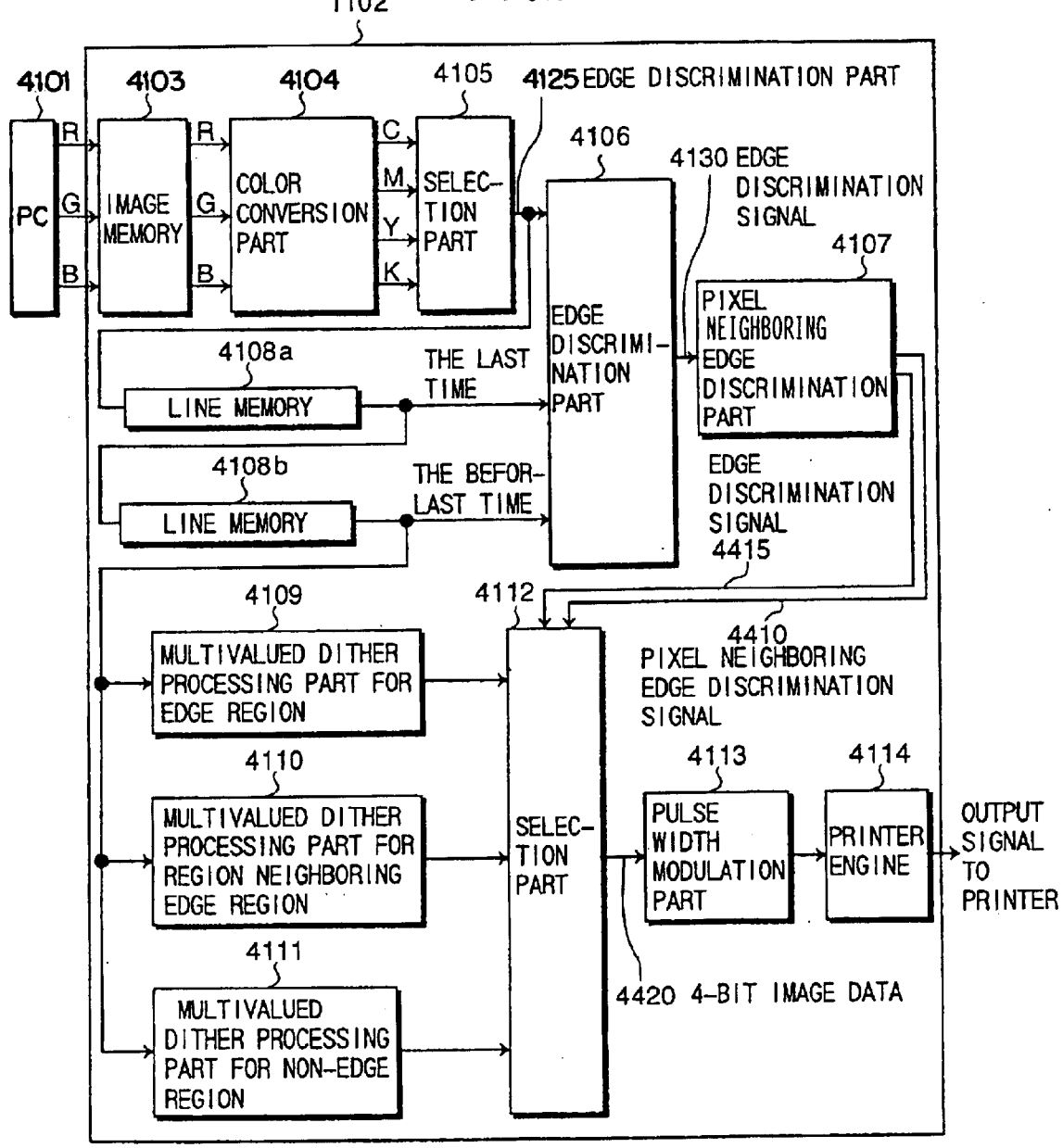
FIG. 14 is a schematic block diagram of a printer controller representing another embodiment according to the present invention.

FIG. 14 shows a schematic block diagram of a color laser printer system according to this embodiment.

Figure 15:
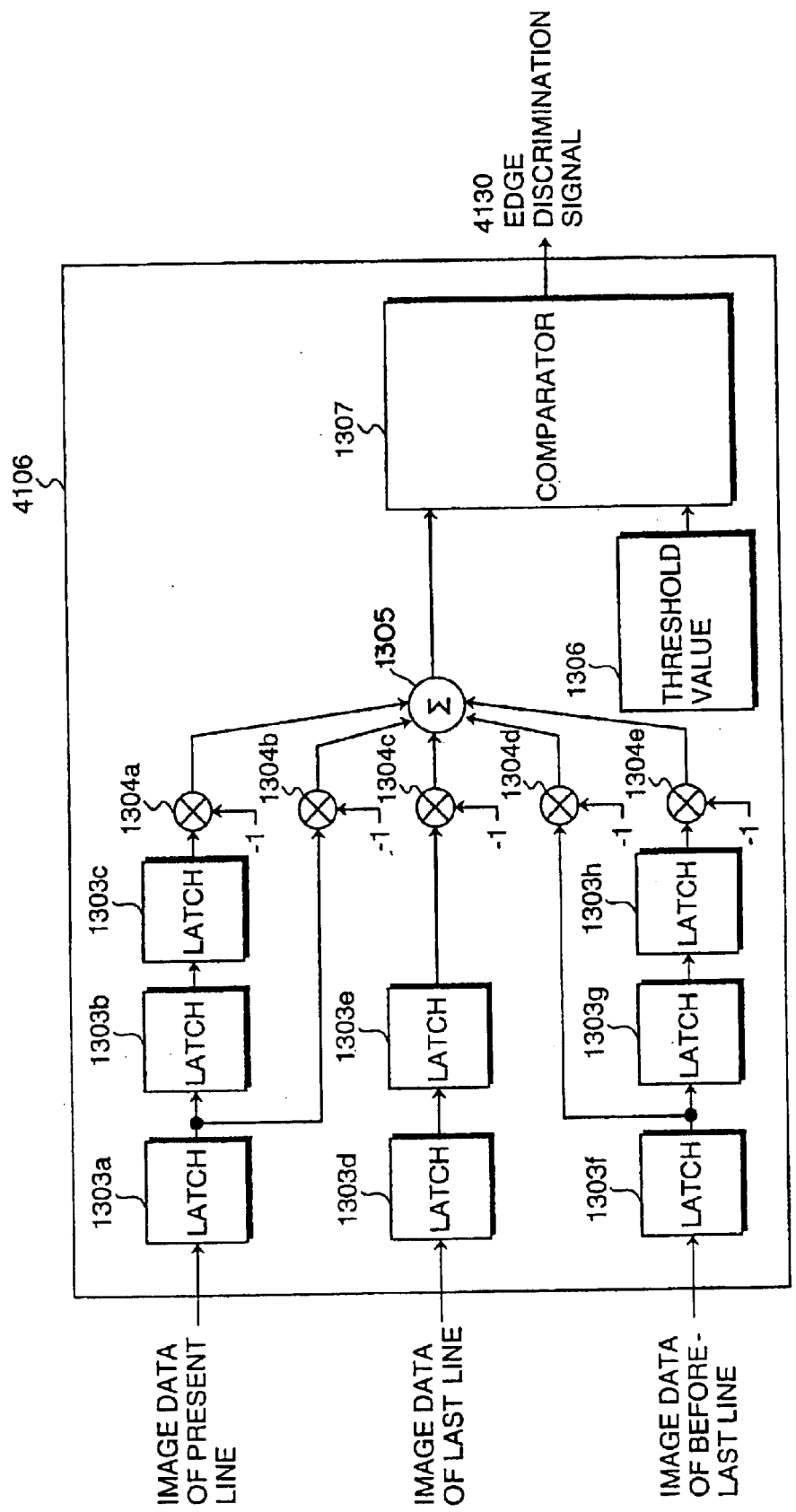
FIG. 15 is a schematic block diagram of the edge discrimination part shown in FIG. 14.
Figure 16:
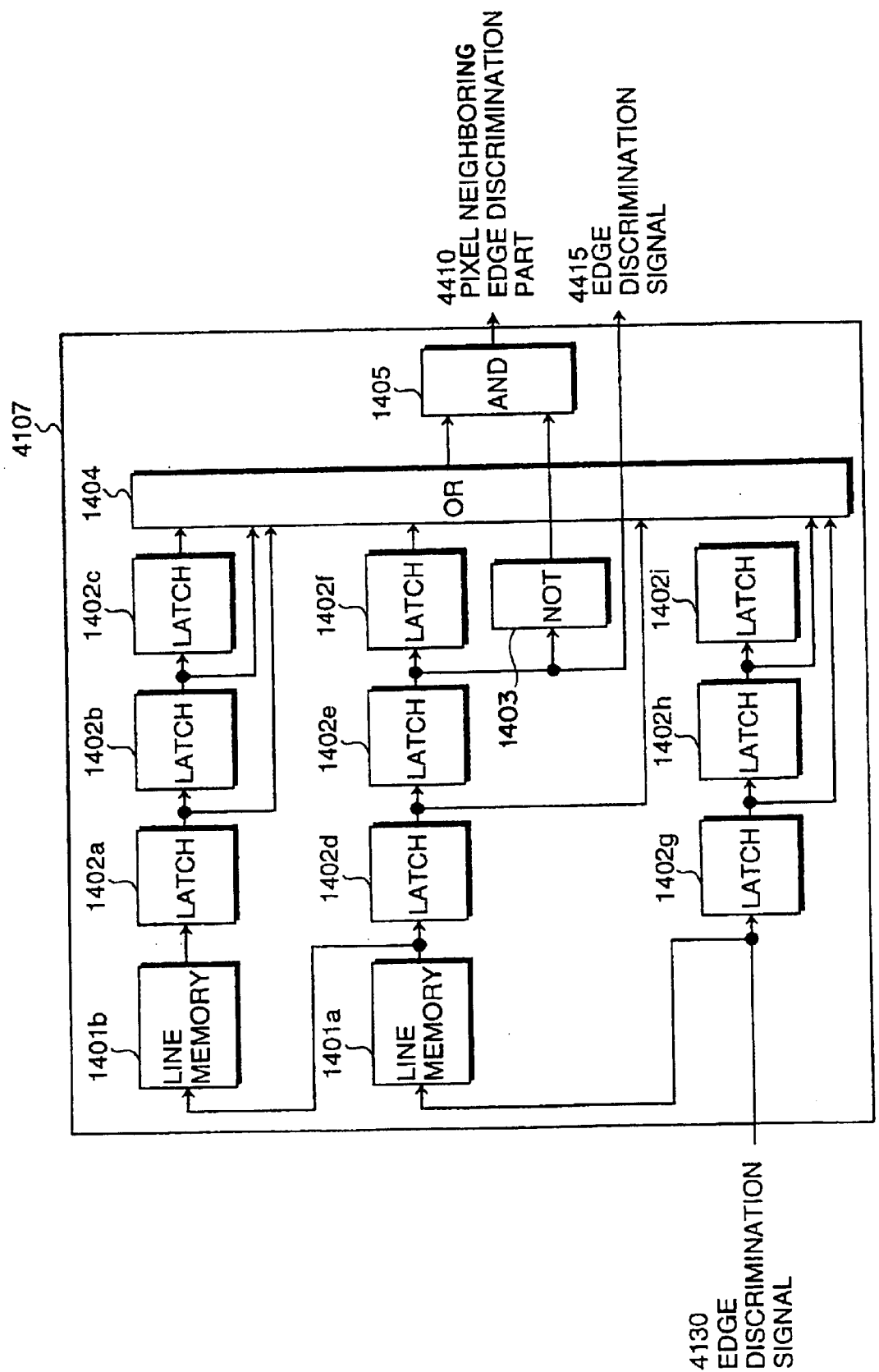
FIG. 16 is a schematic block diagram of the pixel neighboring edge discrimination part shown in FIG. 14.

In this figure, a PC 1101 is a host computer, and outputs color information for each pixel as color data "R, G, B". A color laser printer prints image information, received from the PC 1101, on printing paper. An image memory 4103 stores color information for pixels in a data amount of one page. A color conversion part 4104 converts color information of each pixel, expressed by three kinds of color data for colors R, G and B, to four kinds of color data representing the respective components in colors C, M, Y and K of color material used for printing a color image. The color conversion part 4104 is implemented, for example, by providing a conversion table composed of a semiconductor memory in which the converted pixel data for each of the colors "C, Y, M, K" is stored at an address corresponding to the value the original pixel data for each of colors of "R, G, B". Therefore, the converted pixel data for each of the colors "C, Y, M, K" can be obtained by inputting the value of the original pixel data, for each of the colors "R, G, B", into the conversion table. A selection part 4105 selects and outputs color data for each color "C, M, Y, K" in the data amount of one page in the order of C, M, Y and K, and this selection part can be implemented by using a selector formed of a logic circuit. An edge discrimination part 4106 takes in image data of a pixel (object pixel) for each color, and determines whether or not the pixel corresponding to the taken-in image data belongs to an edge region of the image. The edge discrimination part 4106 further outputs an edge discrimination signal 4130 indicating the result of the edge discrimination. A detailed schematic block diagram of the edge discrimination parts 4106 is shown in FIG. 15. A pixel neighboring edge discrimination part 4107 determines the object pixel as a pixel neighboring edge if the edge discrimination part 4106 does not identify the object pixel as an edge pixel and the discrimination part 4107 determines that at least one of eight pixels neighboring the object pixel at the upper and lower sides, the left and right sides, and the four diagonal positions, is an edge pixel, otherwise, it is identified as not being a pixel neighboring edge. The pixel neighboring edge discrimination part 4107 further outputs a pixel neighboring edge discrimination signal 4410 indicating the result of the pixel neighboring edge discrimination processing. A schematic block diagram of the pixel neighboring edge dissemination part 4107 is shown in FIG. 16. Line memories 1401*a* and 1401*b* have a function to delay input image data for each color in the data amount of one scanning line in the main scanning direction by one period and two periods of the scanning, respectively, and to store the delayed data. Each of these line memories can be realize by using a semiconductor memory.

Figure 17:
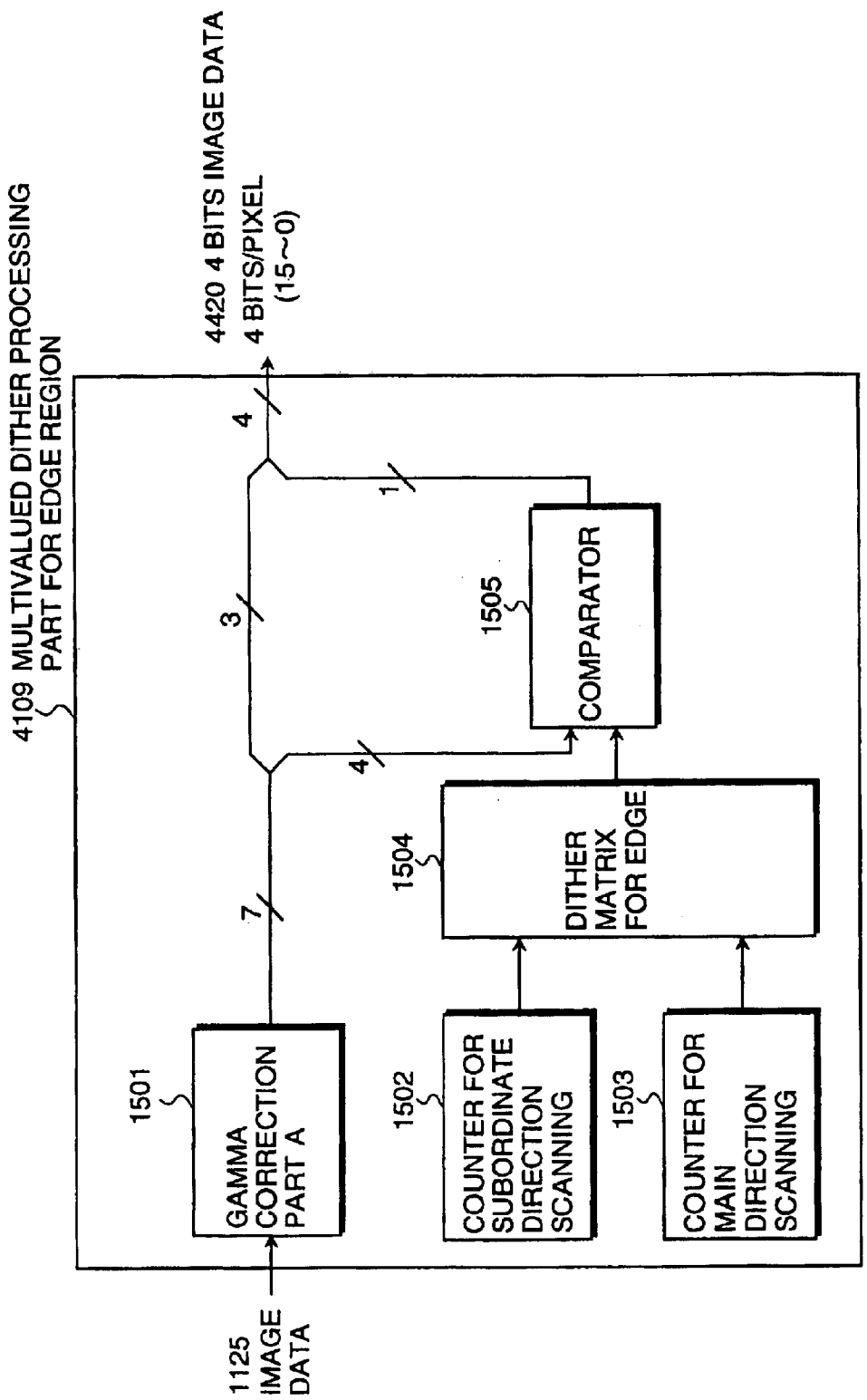
FIG. 17 is a schematic block diagram of the multivalued dither processing part for an edge region shown in FIG. 14.
Figure 18:
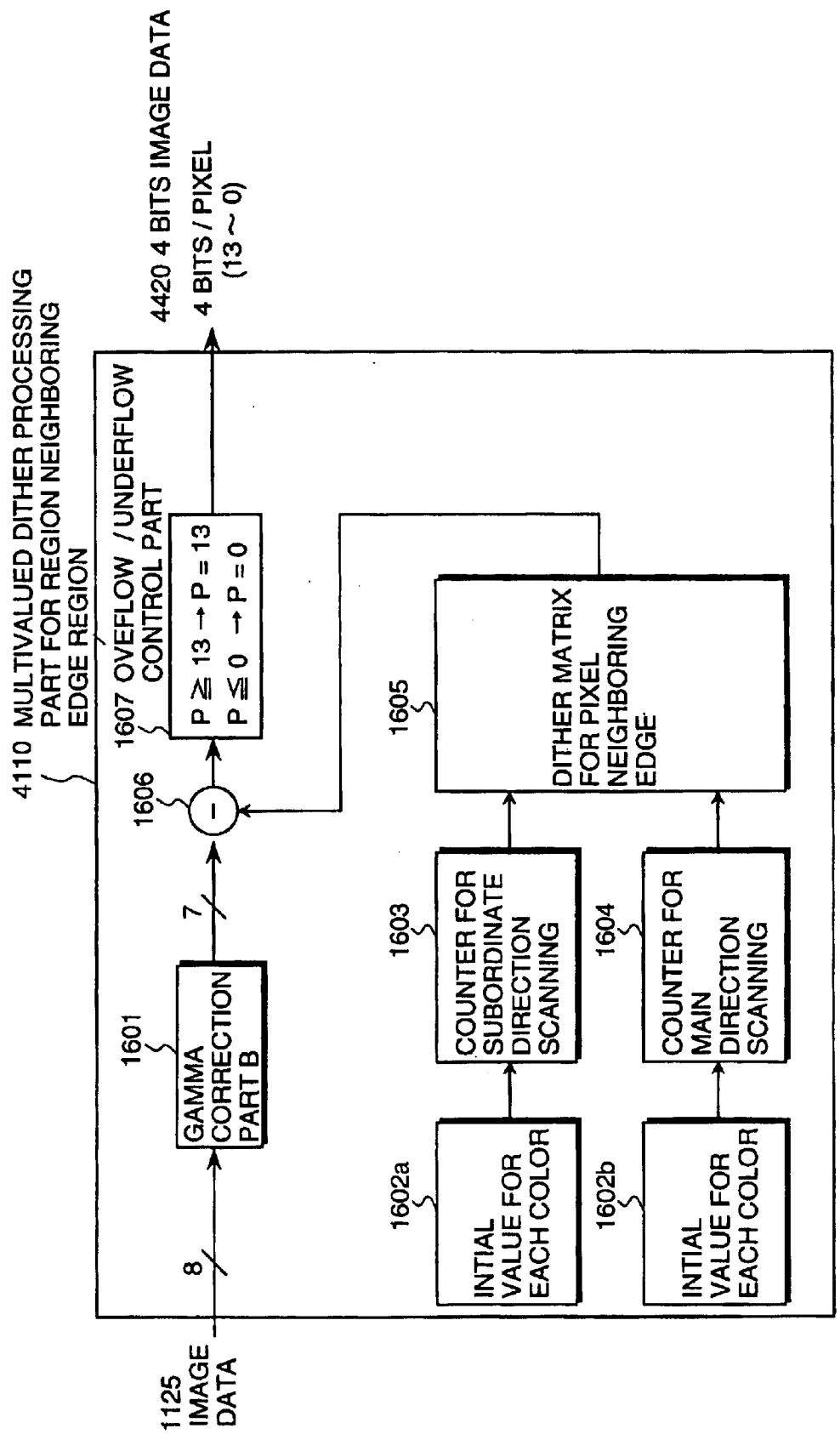
FIG. 18 is a schematic block diagram of the multivalued dither processing part for a region neighboring an edge region.
Figure 19:
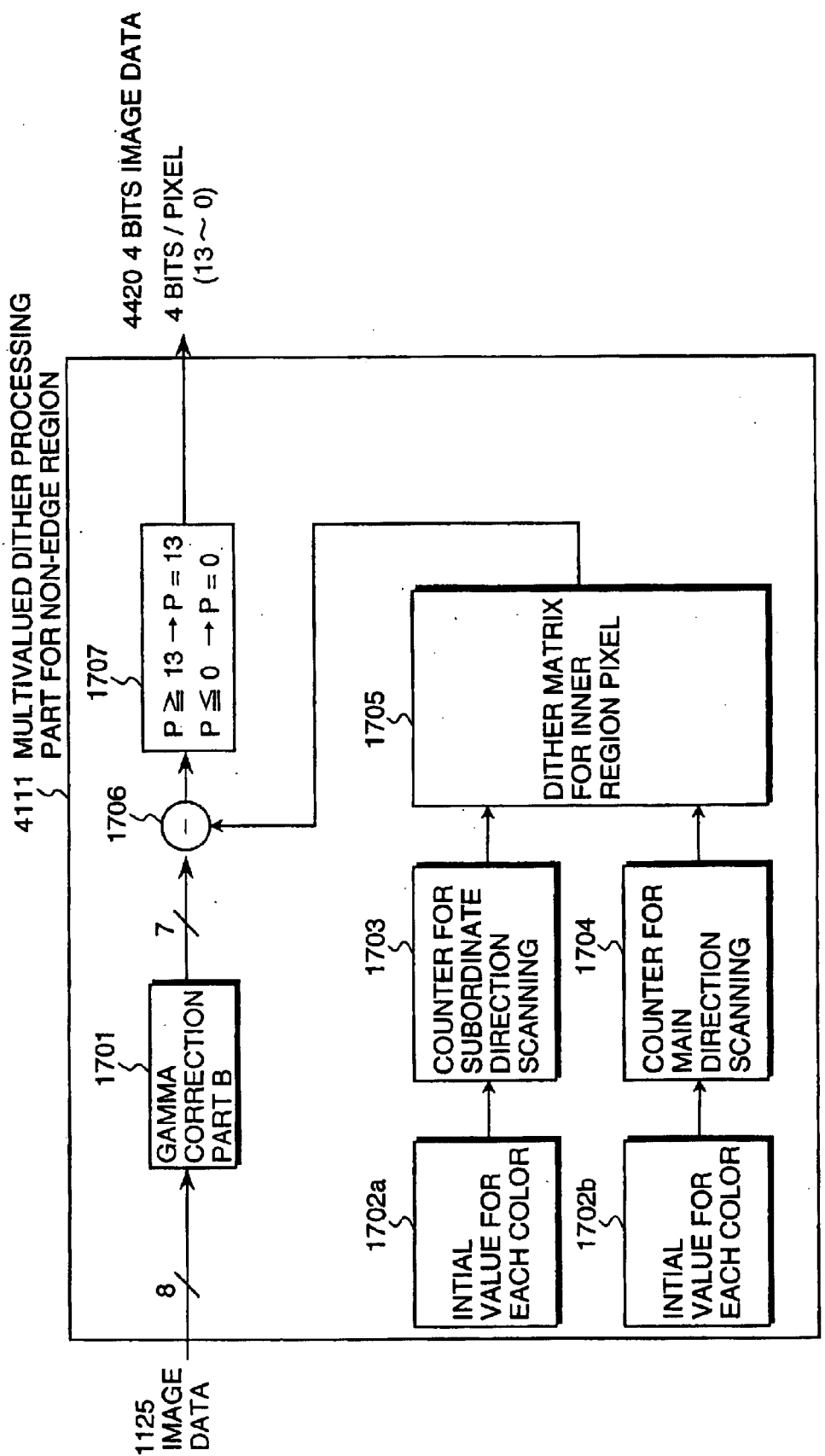
FIG. 19 is a schematic block diagram of the multivalued dither processing part for an inner region shown in FIG. 14.

A multivalued dither processing part for an edge region 4109 processes edge pixels by using a prepared dot distribution type multivalued dither matrix, which is used for printing a high-definition image. A schematic block diagram of the multivalued dither processing part 4109 is shown in FIG. 17. A multivalued dither processing part for a region neighboring an edge region 4110 processes pixels in the region neighboring an edge region by using a prepared mixture of dot distribution and a concentration type multivalued dither matrix, which is used for printing an image of intermediate quality of high-definition and highly fine-gradation. A schematic block diagram of the multivalued dither processing part 4110 is shown in FIG. 18. Moreover, a multivalued dither processing part for a non-edge region 4111 processes edge pixels by using a prepared dot concentration type multivalued dither matrix, which is used for printing a highly fine-gradation image. A schematic block diagram of the multivalued dither processing part 4111 is shown in FIG. 19. As mentioned above, an overall multivalued dither processing part is composed of the multivalued dither processing part 4109 (the first region), the multivalued dither processing part 4110 for a region neighboring an edge region (the second region), and the multivalued dither processing part 4111 for a non-edge region (the third region), and pixels in the first, second and third regions are processed by using the dot distribution type multivalued dither matrix, the mixture of a dot distribution and a concentration type, and the dither matrix dot concentration type multivalued dither matrix, respectively. A selection part 4112 selects and outputs one of the output signals from the three dither processing parts according to the pixel neighboring edge discrimination signal 4410 sent from the pixel neighboring edge discrimination part 4107 and the edge discrimination signal 4130 sent from the edge discrimination part 4106. The selection part 4112 can be implemented by using a selector of a logic circuit. The edge discrimination part 1106, pixel neighboring edge discrimination 4107 and selection part 4112 compose a pixel region discrimination part by which the respective first, second and third regions are discriminated. A pulse width modulation part 4113 converts image data of each pixel to a pulse whose width is proportional to the value of the image data. A schematic block diagram thereof was already described with reference to FIG. 9A. A printer engine 4114 deposits color material for a color indicated by the image data on printing paper, according to the pulse width. This printer engine can be implemented by using a printing mechanism of a laser printer, and it expresses the color density by changing the size of each printing dot in accordance with the width of a pulse output from the pulse width modulation part 4113. That is, the color density is expressed by changing the amount of color material to be deposited on a printing area in each pixel, according to the width of a pulse sent from the PWM part 4113.

In the following, operations of the printer system of the embodiment shown in FIG. 14 will be explained.

The PC 1101 transfers color information of pixels, which includes color data for the three color components R, G and B, to be printed by the printer engine 4114, to the image memory 1103, in the amount of one page. The color data of a pixel, for each of the three color components R, G and B, is taken out of the image memory 1103 one by one, and it is input to the color conversion part 1104. The color conversion part 1104 converts the color data for the three color components to color data for the four color components C, M, Y and K. A selection part 4105 designates one of the colors C, M, Y and K, and outputs image data of the pixels, for the designated color, to the edge discrimination part 4106 in the amount of one page, and the above-mentioned data output operation is repeated for the remaining colors. The image data for each color can be expressed, for example, by 8-bit data. Furthermore, color data output from the selection part 4105 is sent to the edge discrimination part 4106, and it is determined whether or not the object pixel corresponding to the color data belongs to the edge region. The color data is further sent to the pixel neighboring an edge discrimination part 4107, and it is determined by also using the result of the edge discrimination part 4106 to which region, neighboring an edge region or a non-edge region, the object pixel corresponding to the color data belongs. The selection part 4112 selects and outputs one of the processed data output from the multivalued dither processing part 4109 for an edge region, the multivalued dither processing part 4110 for a region neighboring an edge region, and the multivalued dither processing part 4111 for a non-edge region, according to signals output from the edge discrimination part 4106 and the pixel neighboring an edge dissemination part 4107. The pulse width modulation part 4113 converts the color data of the selected data to a pulse whose width is proportional to the value of the color data, and sends the pulse to the printer engine 4114. The printer engine 4114 deposits color material for a color of the color data on an printing area for the object pixel by changing the amount of the color material which is deposited in accordance with the pulse width. The above-mentioned printing processing is repeated for the respective four color components by using color data in the amount of one page for each color component. In the printing processing, selecting color data in the amount of one page for each color component is performed by the selection part 4105.

In the operations of the printer system, shown in FIG. 14, after the color data processing has been performed the multivalued dither processing part 4109 for an edge region, the multivalued dither processing part 4110 for a region neighboring an edge region, and the multivalued dither processing part 4111 for a non-edge region, the selection part 4112 selects and outputs one of the results processed by the three processing parts. However, it is possible that after the selection part 4112 determines to which one of the three regions the object pixel belongs, by using the pixel neighboring edge discrimination signal 4410 and the edge discrimination signal 4415, the selection part 4112 instructs one of the dither processing parts, corresponding to the determined region, to process the color data of the object pixel.

In the following, processing in each block of the printer system shown in FIG. 14 will be described.

A schematic block diagram of the edge discrimination part is shown in FIG. 15. In this figure, each of the latches 1303a–1303h stores color data for each color of one pixel, and a group of latches 1303a–1303c and a group of latches 1303f–1303h form two shift registers, respectively, each of which stores color data of three pixels in the main scanning direction. Moreover, a group of latches 1303d and 1303e compose a shift register which stores color data of two pixels in the main scanning direction. Each of the latches can be implemented by using a flip-flop as a logic element. In the latch 1303e, color data of the object pixel is held. Each of multipliers 1304a–1304e multiplies color data output from each latch by a constant value predetermined for each multiplier in advance. The multipliers 1304a–1304e can be implemented by using adders composed of logical circuits. An adder 1305 sums values output from the multipliers 1304a–1304e. A threshold value setting part 1306 sets a reference value used for determining whether or not the object pixel is a pixel in an edge region. The threshold value setting part 1306 into which the reference value is stored in advance can be implemented by using a register. A comparator 1307 compares the value output from the adder 1305 with the reference value output from the threshold setting part 1306, and outputs "1" if the value output from the adder 1305 is larger than the reference value output from the threshold setting part 1306, otherwise, it outputs "0".

The edge discrimination part 4106 operates as follows. In the latches 1303a, 1303c, 1303f and 1303h, color data of 4 pixels neighboring the object pixel at the 4 diagonal positions are stored. The color data of the 5 pixels including the object pixel are processed by a digital filter composed of the multipliers 1304a–1304e and the adder 1305. This digital filter is a general Laplacean filter used for obtaining the differentiation value between the color density value of the central pixel and the color density values of pixels surrounding the central pixel. The value of the color data for each pixel neighboring the object pixel is multiplied by "–1", and the value of the color data for the object pixel is multiplied by "4". Therefore, the larger the difference between the values of the color data for the pixels neighboring the object pixel and the value of the color data for the object pixel becomes, the larger is the value which the digital filter outputs. Generally, if the object pixel (central pixel) is a pixel in an edge, the value output from the digital filter indicates a large value. The comparator 1307 compares the value output from the digital filter with the threshold value output from the threshold setting value part 1306, and if the value output from the digital filter is larger than the threshold value, the comparator 1307 identifies the object pixel as a pixel of an edge and outputs "1" as the edge discrimination signal. Otherwise, the comparator 1307 determines that the object pixel is not a pixel of an edge and outputs "0" as the edge discrimination signal.

FIG. 16 is a schematic block diagram of a pixel neighboring an edge discrimination part 4107. In this figure, each of the line memories 1401a and 1401b stores edge discrimination signals of pixels in the amount of one main scanning line, and it can be implemented by using a semiconductor memory. Each of the latches 1402a—1402i stores an edge discrimination signal for one pixel, and a group of latches 1402a–1402c and a group of latches 1402d–1402f form two shift register, respectively, each of which stores edge discrimination signals for three pixels in the main scanning direction. Each of the latches 1402a–1402i can be implemented by using a flip-flop as a logic element. A NOT circuit 1403 outputs an inverted value of a signal input to the circuit. That is, if the value of a signal input to the circuit is "1", the circuit outputs "0".

The NOT circuit 1403 can be implemented by using an inverter. An OR circuit 1404 outputs the result of disjunction for eight input signals. The OR circuit 1404 can be implemented by using an OR logic element. An AND circuit 1405 outputs the result of conjunction for two input signals. The AND circuit 1405 can be implemented by using an AND logic element.

The pixel neighboring an edge discrimination part 4107 operates as follows. In the latches 1402a–1402i, nine edge discrimination signals (3 signals in the main scanning directions ×3 signals in the subordinate scanning direction) are stored. A edge discrimination signal for the object pixel is stored in the central latch 1402e. The OR circuit 1404 has a function to determine whether or not a pixel to be discriminated as a pixel of an edge region exists in the eight pixels surrounding the object pixel. If an output signal of the OR circuit 1404 is "1", it means that at least one pixel of the eight pixels is discriminated as a pixel of an edge region, and if an output signal of the OR circuit 1404 is "0", it means that no pixel of the eight pixels is discriminated as a pixel of an edge region. In the AND circuit 1405, the object pixel is discriminated as a pixel neighboring an edge if the object pixel is not a pixel of an edge region, that is, the output signal of the NOT circuit 1403 is "1", and at least one pixel of the eight pixels surrounding the object pixel is a pixel of an edge region, that is, the output signal of the OR circuit is "1". Furthermore, the AND circuit 1405 outputs "1" as a pixel neighboring an edge discrimination signal 1410, otherwise, it outputs "0" as a pixel neighboring an edge discrimination signal 1410. The result in the edge discrimination stored in the latch 1402 is output as an edge discrimination signal 1415.

A schematic block diagram of the multivalued dither processing part 4109 for an edge region is shown in FIG. 17. In this embodiment, the color density of a printing area is expressed by the coloring area modulation implemented in the multivalued dither processing wherein a plurality of pixels compose each printing area. As a dither matrix used for the dither processing for an edge region, a dot distribution type, for example, a Bayer dither pattern, is used so that pixels having the value 1 output by a dither matrix are not concentrated on one place in 16 pixels, but are uniformly distributed in 16 pixels. Consequently, an area of 16 pixels is uniformly colored. Moreover, the multivalued dither processing part 4109 converts color data of 8 bits/pixel to color data of 4 bits/pixel, and outputs the converted color data of 4 bits.

A gamma correction part A 1501 corrects the difference between the color tone of a pixel expressed by color data for each component of colors C, M, Y and K and the color tone of color material used in printing the pixel, corresponding to the component colors. The gamma correction part A 1501 is implemented by using a correction table composed of a semiconductor memory in which at an address expressed by the value of each color data to be input, color data corrected to the color is stored. In accordance with the correction table, by inputting the value of color data for each color into the correction table, corrected color data, which is obtained by performing gamma correction on the input color data, is provided. A counter 1502 for the subordinate scanning direction is a counter of 2 bits, and counts up its value at the start of processing image data in the data amount for one scanning line in the main direction, circularly from 0 to 3. That is, the counter 1502 counts the operation number of processing image data for 4 scanning lines in the main direction. The counter 1502 can be implemented by combining two flip-flop circuits. A counter 1503 for the main scanning direction is a counter of 2 bits, and counts up its value at the start of processing image data for one pixel, circularly from 0 to 3. The counter 1503 also can be implemented by combining two flip-flop circuits. A dither matrix for an edge region 1504 has 16 elements (4 elements in the main scanning direction ×4 elements in the subordinate scanning direction), and each element has one of the values 0 to 15. The dither matrix for an edge region 1504 can be implemented by using a register file of a logic circuit. The respective count values output from the counter 1502 for the subordinate scanning direction and the counter 1503 for the main scanning direction are input to the dither matrix for an edge region 1504 as an address (position) in the matrix. For example, as seen in FIG. 20A, the value to be output from the dither matrix for an edge region 1504 is shown to be an address (position) indicated by the respective count values output from the counter 1502 for the subordinate scanning direction and the counter 1503 for the main scanning direction. If the count value of the counter 1503 for the main scanning direction is "2" and the count value of the counter 1502 for the subordinate scanning direction is "3", the dither matrix for an edge region 1504 outputs "13".

A comparator 1505 compares the value output from the dither matrix for an edge region 1504 with the value of the lower 4 bit data in pixel data of 7 bits, which is obtained by performing gamma correction on the input original pixel data, that is, pixel data output from the gamma correction part A 1501. Furthermore, the comparator 1501 outputs "1" if the value of the lower 4 bit data output from the gamma correction part A 1501 is larger than the value output from the dither matrix for an edge region 1504, otherwise, it outputs "0". The comparator 1501 can be implemented by using a standard comparator.

The multivalued dither processing part 4109 for an edge region operates as follows. The multivalued dither processing part 4109 rounds up color data of 7 bits for each pixel, which received the gamma correction, to color data of 4 bits. If the lower 3 bit information in a color data of 7 bits is simply cut off, the color density expressed with the 128-level gradation is expressed with only a 16-level gradation, with a result that it becomes impossible to express a fine shade of color. So, for each pixel, the value of the lower 4 bits in color data of 7 bits is compared with the value output from the multivalued dither matrix for an edge 1504 by the comparator 1505, and 4 bit color data is synthesized by jointing the output signal of the comparator 1505 to the lowest bit data of the upper 3 bit data in the color data of 7 bits. For example, it is assumed that all color data of 7 bits for 16 pixels have the same value of "76H" (hereafter, H is referred to as HEX: hexadecimal notation). By comparing the value "6H" of the lower 4 bits in color data of 7 bits with the value output from the multivalued dither matrix for an edge 1504, if the value of an element corresponding to the position of a pixel is 5 or less, the value 1 is output from the comparator 1505 since the value "6H" of the lower 4 bits is larger than the value output from the dither matrix 1504. Therefore, if the dither matrix shown in FIG. 20A is used, in 16 pixels, "0" is outputs for 10 pixels, and "1" is output for 6 pixels. Consequently, since the value of the upper 3 bits in each synthesized 4 bit color data is "7H", in 16 pixels, the color data of 10 pixels has the value "7H", and the color data of 6 pixels has the value "8H". If the 16 pixels are seen as one pixel in a lump, the one pixel has the same color density as that expressed by color data of the value "76H".

Figure 21A:
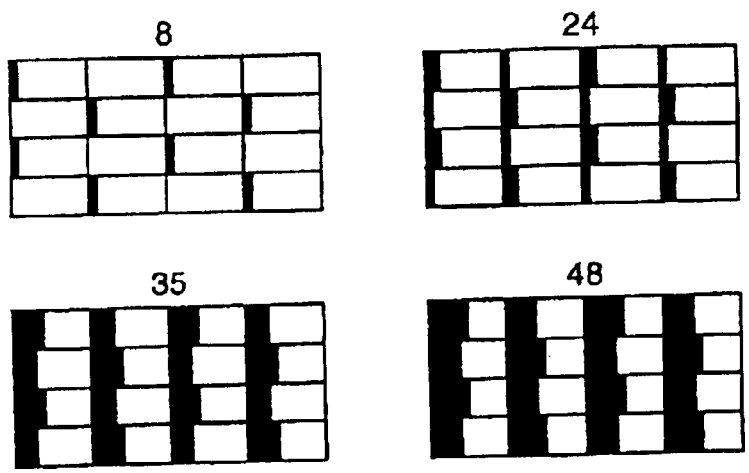
FIGS. 21A–21C are diagrams for explaining printing results of image data processed using the three kinds of dither matrixes.

An example of the results in the above-mentioned multivalued dither processing for an edge region is conceptually shown in FIG. 21A. In this figure, one rectangular area represents one pixel, and the number shown over each pixel block shows the value of color data (7 bit data) output from the gamma correction part A 1501 shown in FIG. 17 by a decimal number. Moreover, it is assumed that all color data have the same value of the number shown over each pixel block. A white rectangular area indicates that the value of 4 bit color data for a corresponding pixel is "0". Furthermore, a rectangular area partially colored with black indicates that the value of 4 bit color data for a corresponding pixel exists between "1"–"15". The larger the value of 4 bit color is, the larger will be an area colored with black in a rectangular area corresponding to the color data. For example, as shown in FIG. 21A, if color data output from the gamma correction part A 1501 for 16 pixels has the same value 7 as the results in the multivalued dither processing for an edge, color data for 10 pixels will have the value "7H" and color data for 6 pixels will have the value "8H". Thus, if the multivalued dither processing for an edge is performed by using the dither matrix for an edge pixel shown in FIG. 20A, it is possible to execute dot size modulation processing for each pixel.

Hereupon, it is also possible to compose the above-mentioned multivalued dither processing part 4109 for an edge region by using the 16-level dither processing part 104, the 3-bit conversion part 105, the 2-bit conversion part 106' the 1-bit conversion part 107, the color data corresponding to pixel position selection part 108, the image memory 109 and the 4-bit conversion part 110, shown in FIG. 1. In such an arrangement, color data output from the gamma correction part A 1501 is input to the 16-level dither processing part 104, color data output from the 4-bit conversion part 110 is used as the 4 bit color data 1420 output to the multivalued dither processing part 4109 for an edge region.

In FIG. 18, a schematic block diagram of the multivalued dither processing part 4110 for a region neighboring an edge region is shown. A gamma correction part B 1601 corrects the difference between the color tone of a pixel expressed by color data for each component of colors C, M, Y and K and the color tone of color material used in printing the pixel, corresponding to the component colors. The gamma correction part B 1601 is implemented by using a correction table composed of a semiconductor memory in which, at an address expressed by the value of each color data to be input, corrected color data is stored. In accordance with the correction table, by inputting the value of color data for each color into the correction table, corrected color data, which is obtained by performing gamma correction on the input color data, is provided. Initial values from each of the color setting parts 1602a and 1602b represent different values corresponding to color data of each component for the colors C, M, Y and K, respectively, and each of them can be formed by using a latch circuit. A counter 1603 for the subordinate scanning direction (referred to as a subordinate direction counter) is a counter of 3 bits, and counts up its value at the start of processing image data by the data amount for one scanning line in the main scanning direction, circularly from 0 to 9. That is, the counter 1603 counts the operation number of processing image data for 10 scanning lines in the main direction. The counter 1603 can be implemented by using a standard counter. A counter 1604 for the main scanning direction (referred to as a main direction counter) is a counter of 8 bits, and counts up its value at the stars of processing image data for one pixel, circularly from 0 to 4. The counter 1604 also can be implemented by using a standard counter. A dither matrix for an edge region 1605 has 50 elements (5 elements in the main scanning direction× 10 elements in the subordinate scanning direction). For example, in the dither matrix 1605 shown in FIG. 20B, the value of each element corresponding to an address (position) indicated by each value of the counter 1603 and each value of the counter 1604 is shown. Five elements enclosed by heavy lines compose each block for five pixels, and the dither matrix 1605 is obtained by combining these blocks. Furthermore, for blocks, in each Of Which the number of elements is less than 10, a block is formed by jointing the elements in each of such blocks to elements of a block in which the number of elements is less than 10, neighboring the block in a dither matrix neighboring the above dither matrix so that the total number of jointed elements is 10. For example, one block is composed by jointing two elements at the positions indicated by the value 2 in the main direction counter 1604 and the values 0 and 1 in the subordinate direction counter 1603, in the dither matrix shown in FIG. 20B, to eight elements at the positions indicated by the values 1 and 2 in the main direction counter 1604 and the values 6, 7, 8 and 9 in the subordinate direction counter 1603, in the dither matrix shown in FIG. 20B, neighboring the top line elements in the former dither matrix. The dither matrix for a region neighboring an edge region 1605 can be implemented by using a register file. A signal output from the main direction counter 1604 and a signal output from the subordinate direction counter 1603 are input to the dither matrix shown in FIG. 20b as an address designating the position of a pixel to be processed. By setting different values to the respective initial value for each color setting parts 1602a and 1602b, depending on each color component of the 4 colors C, M, Y and K, it is possible to prevent the printing positions of four colors from being superimposed on each other, and further prevent the deterioration of the color reproducibility and the image quality, which is caused by shifts of printing positions for each color. The subtracter 1606 shown in FIG. 18 subtracts the output value of the dither matrix for a region neighboring to edge region 1605 from the output value of the gamma correction part B 1601. The subtracter 1606 can be implemented by using a standard subtracter. An overflow/underflow control part 1607 outputs the fixed value 13 if the output value of the subtracter 1606 is larger than the decimal number 13, and outputs the fixed value 0 if the output value of the subtracter 1606 is less than "0", otherwise, it outputs the value of the subtracter 1606 as it is.

The multivalued dither processing part for a region neighboring an edge region operates as follows. In FIG. 18, the gamma correction part B 1601 converts image data of 8 bits/pixel of a pixel to be processed, which is input to the part B 1601, to image data of 7 bits/pixel, and the subtracter 1606 subtracts the value of an element in the dither matrix 1605, corresponding to the position of the pixel, from the value of the image data. Hereupon, it is possible to arrange the position of an element corresponding to that of a pixel at a different place in the dither matrix 1605 for each color by setting the different initial values to the initial value for each of the color parts 1602a and 1602b, for each color. By changing the element position corresponding to a pixel in the dither matrix 1605 for each color as mentioned above, the printing positions of dots for four colors to the same pixel can be shifted from each other. The overflow/ underflow control part 1607 outputs "13" if the output value of the subtracter 1606 is larger than 13, and it outputs "0" if the output value of the subtracter 1606 is less than "0". The output value ranging from 0 to 13, of the subtracter 1606, is output as it is, as image data of 4 bits.

Figure 21B:
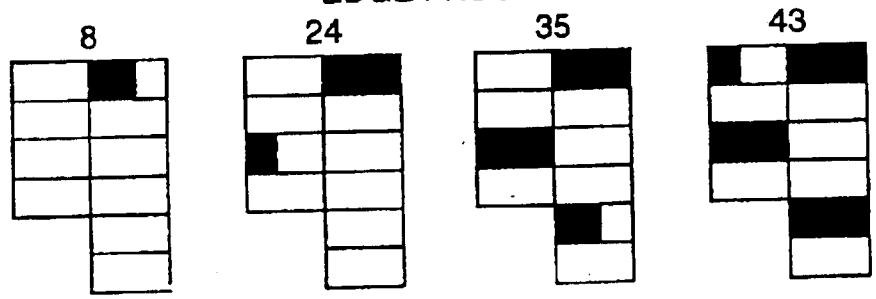

An example of results in the above-mentioned multivalued dither processing for a region neighboring an edge region is conceptually shown in FIG. 21B. This figure shows results of the processing for 10 pixels hatched in the dither matrix shown in FIG. 20B. One rectangular area indicates one pixel. The number shown over each block in FIG. 21B indicates the value of 7 bit data output from the gamma correction part B 1601 shown in FIG. 18 in decimal number. In this example, it is assumed that all data for pixels in each block have the same value as the number shown over the block. A white rectangular area indicates that the value of the data for a pixel corresponding to the rectangular area is "0", and a black rectangular area indicates that the value of the data for a pixel corresponding to the rectangular area is "13". A rectangular area partially colored with black indicates that the value of data for a pixel corresponding to the rectangular area ranges from 1 to 12, and the larger the value of data for a pixel corresponding to the rectangular area is, the larger the area colored with black becomes. For example, it is assumed that values output from the gamma correction part B 1601 indicate the same value 8 for all 10 pixels in the block shown in FIG. 21B. In this example, the multivalued dither processing for a region neighboring an edge region using the multivalued dither matrix for a pixel neighboring an edge shown in FIG. 20B results in an indication that the value of color data for only a pixel at the position designated by the value "1" of the main direction counter and the value "0" of the subordinate direction counter is "8", and all values for the other pixels indicate "0". As shown in FIG. 21B, if the multivalued dither processing for a region neighboring an edge region is performed by using the multivalued dither matrix for a pixel neighboring an edge shown in FIG. 20B, it is seen that areas colored with black are not concentrated in one place, but the number of the areas and their positions increase distributively, as the value of color data for the pixels increases. Furthermore, although only a 14-level (0–13) color shade or color gradation is expressed for one pixel by using color data of 4 bits, a 128-level (0–127) color shade or color gradation can be equivalently implemented by regarding a group of 10 pixels neighboring each other as one virtual pixel.

Hereupon, it is also possible to implement the above-mentioned multivalued dither processing part 4110 for a region neighboring an edge region by using the 16-level dither processing part 104, the 3-bit conversion part 105, the 2-bit conversion part 106, the 1-bit conversion part 107, the color data corresponding to pixel position selection part 108, the image memory 109 and the 4-bit conversion part 110, shown in FIG. 1. With such an arrangement, color data output from the gamma correction part B 1601 is input to the 16-level dither processing part 104, and color data output from the 4-bit conversion part 110 is used as the 4 bit color data 1420 output the multivalued dither processing part for a region neighboring an edge region 4110.

In FIG. 19, a schematic block diagram of the multivalued dither processing part 4111 for a non-edge region is shown. The composition and operations of this dither processing pert is almost the same as those of the multivalued dither processing part 4110 for a region neighboring an edge region as shown in FIG. 18. One difference is that a dither value arrangement in the dither matrix 1705 used in this processing part, which is different from that in the dither matrix 1605 used in the multivalued dither processing part for a region neighboring an edge region. The dither matrix 1705 used in this processing part has a dither matrix of a dither value arrangement pattern (generally so-called a dot concentration type dither pattern) by which colored areas are concentrated into one place as values of color data increase. FIG. 20C shows two output values of the two counters 1703 and 1704, and an example of dither values of elements in the dither matrix 1705 at addresses designated by the two output values. Each block is composed of elements enclosed by heavy lines, corresponding to 10 pixels, and the dither matrix is formed by combining these blocks.

The multivalued dither processing part 4111 for a non-edge region operates as follows. The gamma correction part C 1701 converts image data of 8 bits/pixel, for a pixel input to this part C 1701, to image data of 7 bits/pixel. A subtracter 1706 subtracts the value of an element corresponding to the position of the pixel, in the dither matrix 1705, from the value of the image data of 7 bits/pixel. If the value of the result the subfraction is larger than 13, an overflow/underflow control part 1707 outputs the fixed value 13, and if the value of the result of the subtraction is less than 0, the control part 1707 outputs the fixed value 0. Furthermore, if the value of the result of the subtraction ranges from 0 to 13, the control part 1707 outputs the value as it is.

Figure 21C:
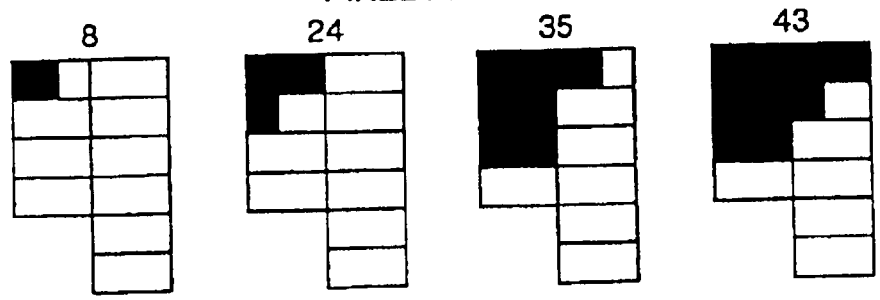

An example of results produced in the above-mentioned multivalued dither processing for a non-edge region is conceptually shown in FIG. 21C. This figure shows results of the processing for 10 pixels hatched in the dither matrix shown in FIG. 20C. One rectangular area indicates one pixel. The number shown over each block in FIG. 21C indicates the value of 7 bit data output from the gamma correction part C 1701 shown in FIG. 19 as a decimal number. In this example, it is assumed that all data for pixels in each block have the same value of the number shown over the block. A white rectangular area indicates that the value of data for a pixel corresponding to the rectangular area is "0", and a black rectangular area indicates that the value of data for a pixel corresponding to the rectangular area is "13". A rectangular area partially colored with black indicates that the value of data for a pixel corresponding to the rectangular area ranges from 1 to 12, and the larger the value of data for a pixel corresponding to the rectangular area is, the larger the area colored with black becomes. For example, it is assumed that values output from the gamma correction part C 1701 indicate the same value of 8 for all 10 pixels in the block shown in FIG. 21C. In this example, the multivalued dither processing for a non-edge region using the multivalued dither matrix 1705 shown in FIG. 20C results in an indication that the value of color data for only a pixel at the position designated by the value "0" of the main direction counter and the value "0" of the subordinate direction counter is "8", and all values for the other pixels are "0". As shown in FIG. 21C, if the multivalued dither processing for a non-edge region is performed by using the multivalued dither matrix 1705 shown in FIG. 20C, it is seen that the number of areas colored with black and their positions increase and concentrate in one place, as the value of color data for the pixels increases. Furthermore, although only a 14-level (0–13) color shade or color gradation is expressed for one pixel by using color data of 4 bits, a 128-level (0–127) color shade or color gradation can be equivalently implemented by regarding a group of 10 pixels neighboring each other as one virtual pixel.

Hereupon, it is also possible to compose the above-mentioned multivalued dither processing part 4111 by using the 16-level dither processing part 104, the 3-bit conversion part 105, the 2-bit conversion part 106, the 1-bit conversion part 107, the color data corresponding to pixel position selection part 108, the image memory 109 and the 4-bit conversion part 110, shown in FIG. 1. With such an arrangement, color data output from the gamma correction part C 1701 is input to the 16-level dither processing part 104, and color data output from the 4-bit conversion part 110 is used as the 4 bit color data 1420 output to the multivalued dither processing part 4111.

Figure 22A:
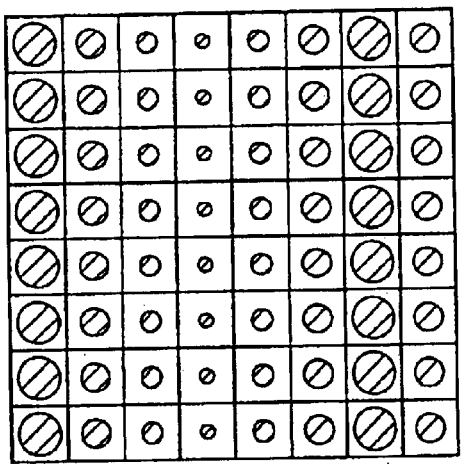
FIGS. 22A–22D are diagrams for explaining printing results for image data in the respective three regions and a mixture region of the three regions.
Figure 22B:
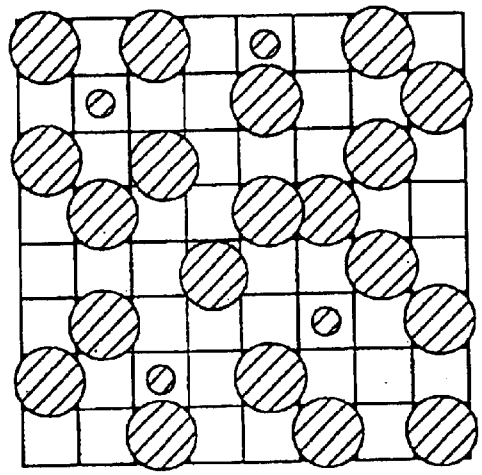
Figure 22C:
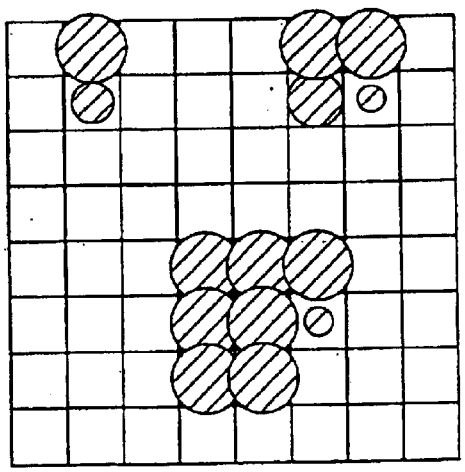
Figure 22D:
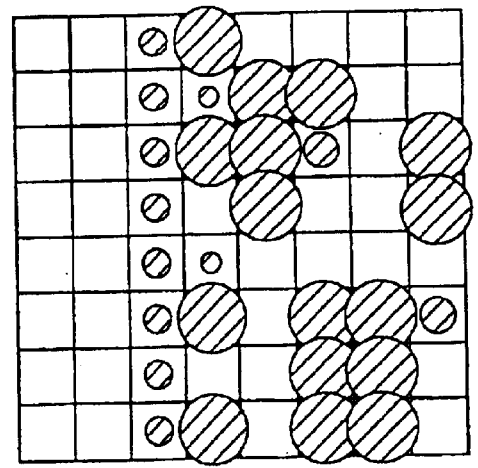
Figure 23A:
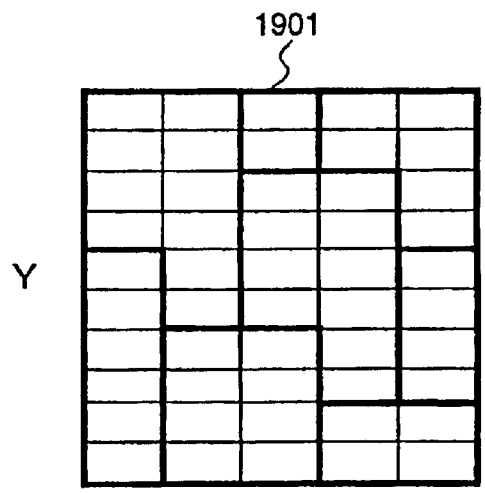
FIGS. 23(a) to 23(d) are diagrams of a block composition of a dither matrix for each color.
Figure 23B:
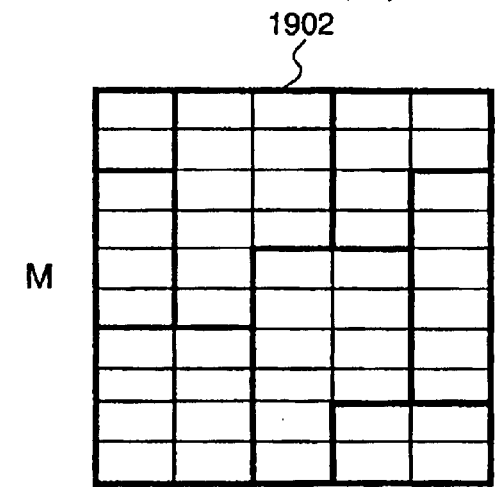
Figure 23C:
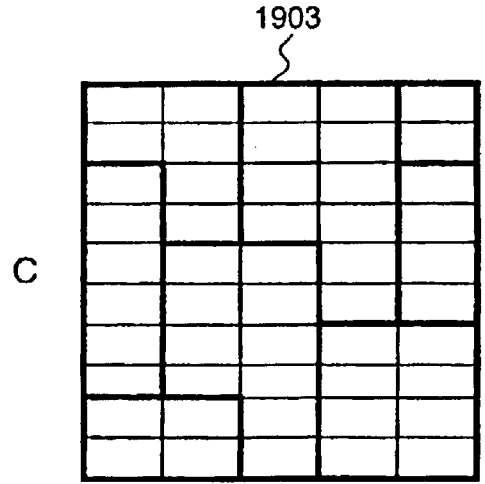
Figure 23D:
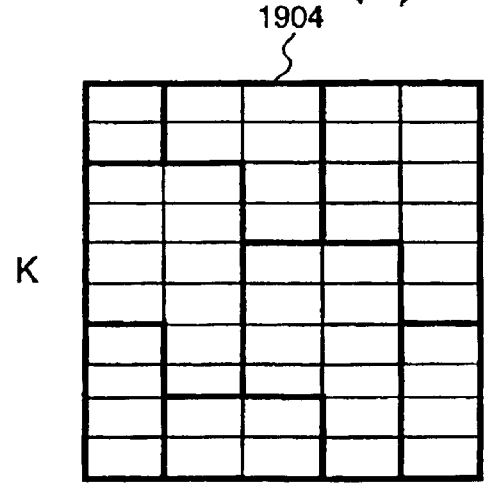

In FIGS. 22A–22D, examples of print images for pixels, which are obtained after the multivalued dither processing for each pixel region and the pulse width modulation, are enlarged and shown. FIG. 22A shows an example of an enlarged print image for pixels including pixels of edge regions, in which image data is processed by the multivalued dither processing part 4109 for an edge region. Furthermore, the multivalued dither processing part 4109 for an edge region performs the dot size modulation for each pixel, and this processing part is suitable to process images, such as characters, thin lines, etc., for which a high image resolution processing is required. FIG. 22B shows an example of an enlarged print image for pixels of regions neighboring an edge region, in which image data is processed by the multivalued dither processing part 4110 for a region neighboring an edge region. Furthermore, the multivalued dither processing part 4110 expresses the color shade of an image by using a combination of the mixture of dot distribution and dot concentration type multivalued dither processing and dot size modulation. FIG. 22C shows an example of an enlarged print image for pixels of a non-edge region, in which image data is processed by the multivalued dither processing part 4111 for a non-edge region. Furthermore, the multivalued dither processing part 4111 expresses the color shade of an image by using a combination of dot concentration type multivalued dither processing and dot size modulation. Although the image resolution of a printed image obtained by the image processing method used in the processing part 4111 is not high, the image processing method can prevent non-uniformity in the coloring, due to the variation in positioning of a printing area for each pixel, which is caused by an inaccuracy in the operation of the printer engine, in which a plurality of printed dots overlap each other. Moreover, FIG. 22D shows an example of an enlarged print image for pixels of an edge region, a region neighboring an edge region, and a non-edge region, in which image data is processed by the multivalued dither processing parts for an edge region, a region neighboring an edge region, and a non-edge region, 4109, 4110 and 4111. A edge region in the print image is smoothly expressed with a high image resolution since a dot distribution type multivalued dither matrix is used. An non-edge region in the print image is expressed with the high color reproducibility since the dot concentration type multivalued dither matrix is used, and printing areas for colors can be shifted from each other. Moreover, since a plurality of printed dots overlap each other, the non-uniformity in coloring, due to the variation in positioning of a printing area for each pixel, which is caused by an inaccuracy in the operation of the printer engine, can be prevented. Furthermore, a group of printed dots for pixels in a region neighboring an edge region, in which image data is processed by the multivalued dither processing part 4110 for a region neighboring an edge region, are inserted between two groups of printed dots for pixels in an edge region and a non-edge region, image data of the two groups being processed by the above mentioned two multivalued dither processing method which has two extreme dot printing characteristics. Consequently, the difference between the color tone of an edge region and that of a non-edge region can be made inconspicuous.

Meanwhile, if an image is printed by using the printer system of the above-mentioned embodiment, since the image is printed in a printing state such as shown in FIG. 22D, it is possible to confirm whether or not a printer system of the embodiment according to the present invention is used by enlarging a printed image and examining the printing state of the region in the vicinity of an edge. That is, since different ways of processing image data are used for the three respective pixel regions, it is possible to confirm that the method of processing image data for pixels, used in the embodiment, has been employed by examining the sizes of the printed dots in each of the three regions.

As mentioned above, in accordance with the embodiment, a different image processing can be used for the respective edge region, region neighboring an edge region and non-edge region, and it is possible to process pixels in a region of characters or thin lines with a high-definition, and pixels in a region of pictures with a highly fine gradation. By newly providing the processing method for pixels of a region neighboring an edge, it is also possible to prevent deterioration of the image qualify for pixels of a boundary region between an edge region and a region outside the edge region, and to print a smooth image in which the difference between the color tone of an edge region and that of a non-edge region is made inconspicuous. In the embodiment, the following image processing is also possible. That is, three kinds of image processing are provided for an edge region, a region neighboring an edge region and a non-edge region, and the first image processing method with the highest image resolution is applied to an edge region, the second image processing method with the lowest image resolution is applied to a region neighboring an edge region, and the third image processing method with a image resolution between the resolution in the first method and the resolution in the second method is applied to a non-edge region. Although the hardware composition, such that is shown in FIG. 1, is used in the above-mentioned embodiment, it is also possible to store a program realizing the above-mentioned image processing by using a computer, into a storage medium, such as a CD-ROM. To realize this method, for example, an image processing apparatus is configured by using a computer including a memory, such as a VRAM, a storage memory for storing the above program, and a CPU.

In the multivalued dither processing part 4110 for a region neighboring an edge region and the multivalued dither processing part 4111 for a non-edge region in the above mentioned embodiment, to make the relation between each pixel and an element correspond to the pixel, in a dither matrix, different for each color, one dither matrix is used for 4 colors, and the initial values to be set to the respective main direction courter and subordinate direction counter are changed for each color. However, as shown in FIGS. 23(*a*) to 23(*d*), it is also possible to provide four kinds of multivalued dither matrixes for the respective colors. Examples of the four kinds of multivalued dither matrixes are shown in FIGS. 23(*a*) to 23(*d*). In the multivalued dither matrixes 1901–1904 for the respective colors C, M, Y and K, the arrangement of blocks, each of which is composed of 10 elements, and the arrangement for positions of 10 elements composing each block, are different for each dither matrix. As the arrangement of dither values for all elements in each of the dither matrixes used in the multivalued dither processing parts for a region neighboring an edge region 4110 and the dither matrixes used in the multivalued dither processing parts for a non-edge region 1111, the arrangement of dither values for elements in each one of the dither matrixes shown in FIG. 20B and FIG. 20C can he used. Thus, the initial value for each of the color setting parts 1702*a* and 1702*b* become unnecessary, and instead one of the dither matrixes 1901–1904 is selected for each color. In the embodiment, a printing dot for image data in a region neighboring an edge region and a non-edge region is printed at a different position for a different color. When dots for colors are deposited on the same position, the chrome is deteriorated and an image of a sordid color is printed. On the other hand, in accordance with the embodiment, a printed image of high chrome can be obtained. Furthermore, if dots for colors are deposited on the same position, when the operational characteristics of the printer engine changes, the printing position of a dot for each color changes a little, and the difference between the color tone in an area of dots at which the printing position is changed and the color tone in an area of dots at which the printing position is not changed increases, which causes a non-uniformity in the color of the printed image. On the other hand, in the embodiment, since the positions of the printing dots for the colors are shifted from each other in advance, the above-mentioned problem can be solved.

In the following, the CPU 2010 for processing image data for each pixel, the address conversion part 2016, the data compression/expansion processing part 2018 and the memory 2020 in a printer controller 3000 as shown in FIG. 43, will be explained in detail.

Figure 24:
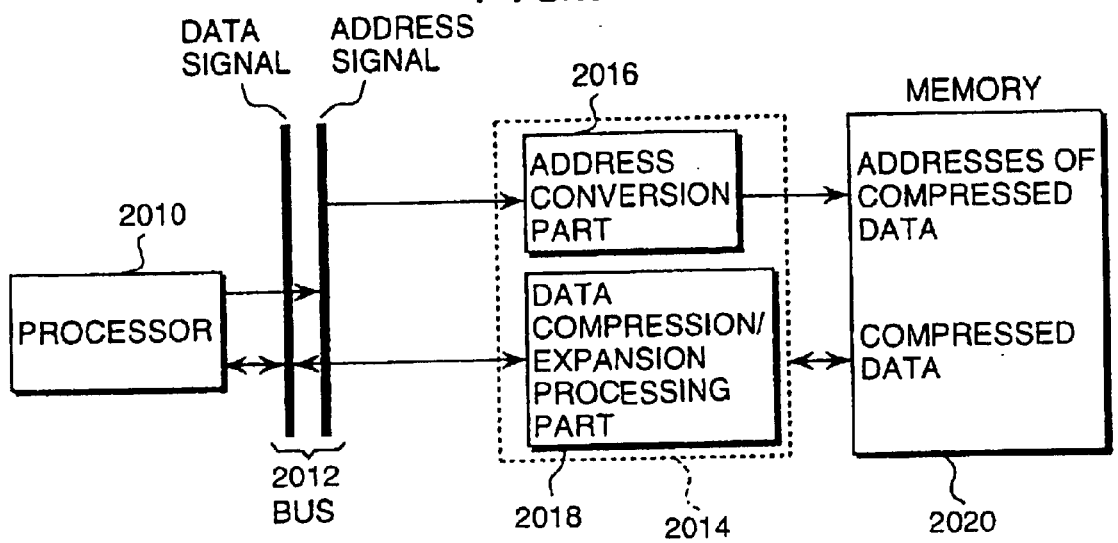
FIG. 24 is a fundamental schematic block diagram of a data processing apparatus representing another embodiment according to the present invention.

FIG. 24 shows a schematic block diagram of a data processing apparatus composed of the CPU 2010, the address conversion part 2016, the data compression/expansion processing part 2018 and the memory 2020.

Figure 25A:
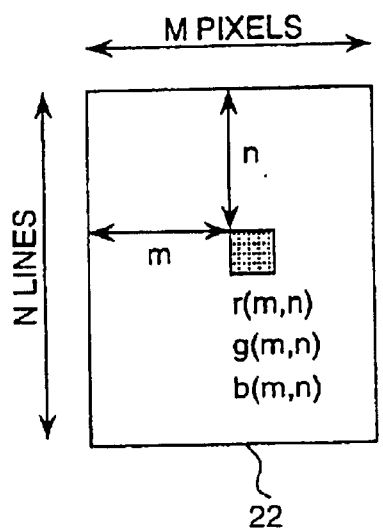
FIGS. 25(a) to 25(c) are diagrams for explaining the relation between positions of pixels and addresses in a memory.
Figure 25B:
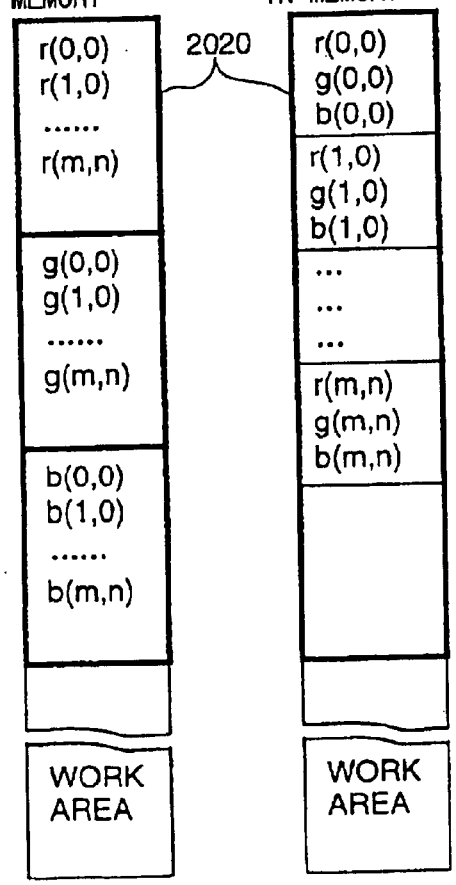
Figure 25C:
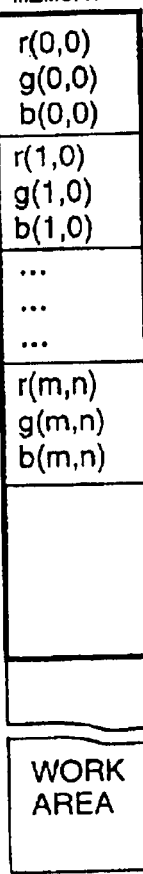

In FIG. 24, the processor (CPU) 2010 operates as a data processing means and is connected to the data compression/expansion device 2014 via a bus 2012. Furthermore, the processor 2010 reads and writes a data signal for each pixel output to the bus 2012, which is to be used in the processor, and it outputs an address of the data to be read or written to the bus 2012 as an address signal. The data compression/expansion device 2014 includes the address conversion part 2016 and the data compression/expansion part 2018, and each of the parts 2016 and 2018 is connected to the memory 2020. The address conversion part 2016 converts an address output from the processor 2010 to an address used for access to the memory 2020. That is, it is necessary to convert addresses (positions) of image data which are two-dimensionally arranged to addresses of compressed data which are one-dimensionally arranged in the memory 2020 when the processor 2010 executes access to the memory 2020 in which compressed image data is stored. For example, as shown in FIG. 25(*a*), when the position (m, n) of a pixel in an image frame in which M pixels in N lines are two-dimensionally arranged, is related to an address in the memory in one by one relationship, color data for each color of all pixels is arranged as shown in FIG. 25(*b*), or color data for three colors of a pixel is arranged shown FIG. 25(*c*).

As mentioned above, in a color image, since signals for each image data of a pixel are composed of signals for a plurality of color components, as a color data arrangement method, a method of arranging color data for each color component of all pixels in the order for all color components in a memory, or a method of arranging color data for all color components of each pixel in the order of all pixels in a memory, is possible. By either of the methods, the position of a pixel in an image frame can be related to an address in a memory in one by one relationship. However, if the image data of the pixels is compressed and stored in the memory

2020 using a variable compression factor method, the position of a pixel in an image frame can not be related to an address in the memory 2020 in one by one relationship. On the other hand, if the image data of the pixels is compressed and stored in the memory 2020 using a fixed data compression factor method, the position of each of the pixels which are two-dimensionally in an image frame can be related to an address in the memory in one by one relationship. Moreover, the conversion part 2016 can be implemented by using a calculation circuit or a conversion table, or a combination of a calculation circuit and a conversion table. Furthermore, if various conversion rules exist, various kinds of conversion means corresponding to the rules are to be provided.

The data compression/expansion part 2018 reads a plurality of compressed data (compressed data for pixels belonging to one of a plurality of blocks composing one image frame), including color data corresponding to an address obtained by the address conversion part 2016, out of the memory 2020, and expands the compressed data. Furthermore, the part 2018 outputs the expanded data, corresponding to the address obtained by the conversion part 2016 from among the plurality of expanded data, to the processor 2010, and compresses the plurality of expanded data with a designated fixed data compression factor, based on a control signal output from the processor 2010. Moreover, it stores the compressed data to the original addressee of the compressed detain the memory 2020 in accordance with the addressee obtained by the address conversion part 2016. In order to prevent the data compression or expansion processing from causing a delay in the processing of the processor 2010, it is effective to provide a temporal data storage device, such as a buffer memory, a FIFO (First IN First Out) register, etc., in the data compression/expansion device 2014. Furthermore, it is possible to execute data read-out processing, data compression/expansion processing and data write-in processing using a pipe-line method.

The memory 2020 stores the data compressed using the fixed data compression factor as non-preservation type (irreversible type) data, and it stores data, such as program data, calculation result data, etc., (if such data is not preserved, data processing becomes impossible), as preservation type (reversible type) data. As for image data, since only a small quantity of changes in image data is permitted if the quality of an image formed with the image data is not to be deteriorated, image data is stored as non-preservation data.

When the processor 2010 writes image data for each pixel into the memory 2020, it outputs the image data for the pixel and an address (position) of the pixel to the bus 2012. The image data and the address on the bus 2012 are input to the data compression/expansion device 2014, and the input address is converted to an address for access to the memory 2020. According to the converted address, the memory 2020 is searched, and a plurality of compressed data including compressed data corresponding to the converted address are read out of the memory 2020. The read-out data is expanded. A data rewriting process is performed for the expanded data, and the expanded data is again compressed with the fixed data compression factor, based on a control signal from the processor 2010. Moreover, the again compressed data is stored in the memory 2020 based on the address obtained by the address conversion part 2016.

On the other hand, when the processor 2010 reads image data for each pixel out of the memory 2020, it outputs an address (position) of the pixel to the bus 2012, and the address is conversed to an address for access to the memory 2020 by the address conversion part 2016. Using the converted address, the memory 2020 is searched, and a plurality of compressed data (compressed data belonging to a block in the image frame) including compressed data corresponding to the converted address is read out of the memory 2020. The read-out data is expanded. The data compression/expansion device 2014 outputs expanded data, corresponding to the address obtained by the conversion part 2016 from among the plurality of expanded data, to the processor 2010.

In this embodiment, when image data for each pixel is processed, a plurality of compressed data is read out of the memory 2020, based on an address (position) of the pixel of which the image data is to be processed. Therefore, image data can be compressed with a fixed data compression factor, and deterioration of the image quality is prevented. Moreover, since the compression factor can be fixed independently of the kind of image, the position of each pixel in an image frame can be related to an address in the memory 2020 in which compressed data has accumulated.

Figure 26A:
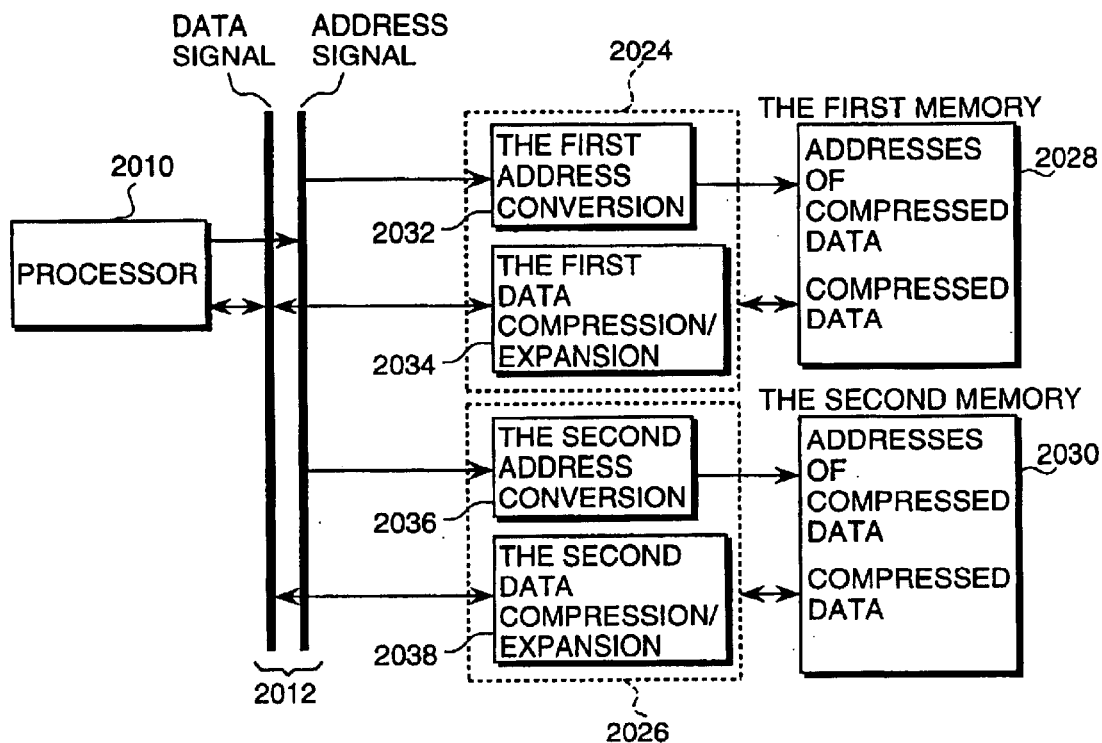
FIGS. 26A–26B are block diagrams showing a fundamental composition using two memories and a fundamental composition using one memory, in the data processing apparatus, respectively.

In processing two kinds of image data, as shown in FIG. 26A, it is possible to provide two data compression/expansion devices 2024 and 2026 and two memories 2028 and 2030. The data compression/expansion devices 2024 are composed of the first address conversion part 2032 and the first data compression/expansion part 2034, and the data compression/expansion devices 2026 are composed of the second address conversion part 2036 and the second data compression/expansion part 2038. As to the memories 2028 and 2030, for example, image data is stored in the memory 2028, and program data is stored in the memory 2030. Moreover, the data compression/expansion device 2026 can be formed as a device of the data-through type, and by using such a device of the data-through type, a preservation type data accumulation means can be easily implemented.

Figure 26B:
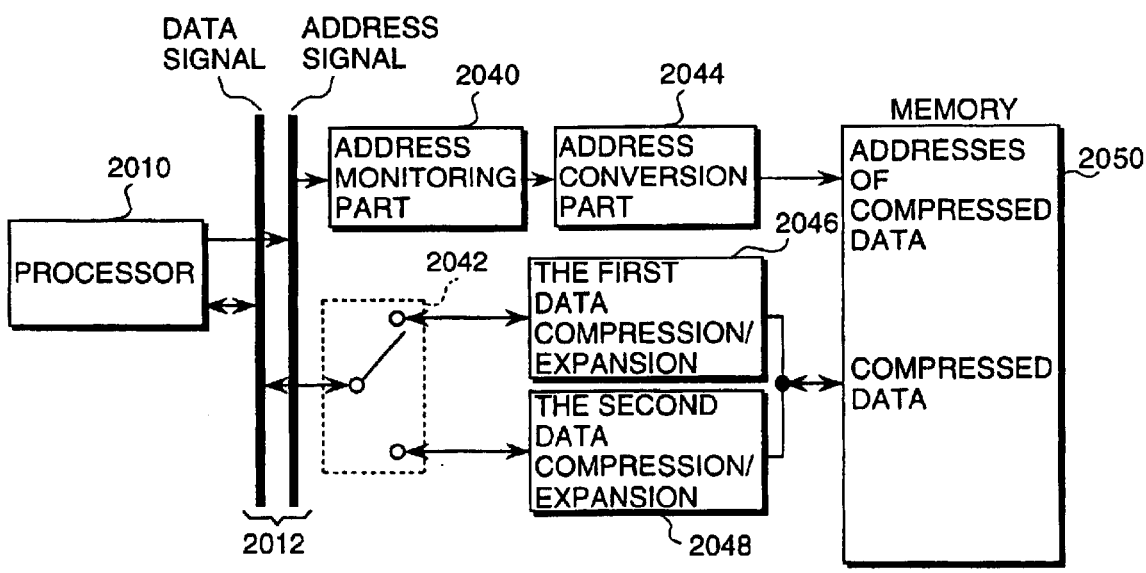

On the other hand, if an integration type memory is used, in which image data of the non-preservation type is stored together with program data of the preservation type, the data processing apparatus can be composed as shown in FIG. 26B.

That is, an address output from the processor 2010 is monitored by an address monitoring part 2040, and a switch 2042 is switched based on the result of the address monitoring so as to input data output from the processor 2010 to the first data compression/expansion device 2046 or the second data compression/expansion device 2048. The address monitoring part 2040 stores boundary addresses among areas for various kinds of data, and it can easily discriminate the kind of data to be processed, by comparing an address output from the processor 2010 with each of the boundary addresses. Furthermore, if the address of each input data is that for image data, the input image data is sent to the first compression/expansion part 2046, and if an address of each input data to be processed is that for program data, the input program data is sent to the second compression/expansion part 2048. That is, the address monitoring part 2040 is a data selection means. An address conversion part 2044 converts an address output from the address monitoring part 2040 to an address for access to the memory 2050. Furthermore, the first and second data compression/expansion parts 2046 and 2048 have the same function as that of the data compression part 2018, and operate to read compressed data out of the memory 2050 and expand it, and the parts 2046 and 2048 again compress the expanded data. In accordance with the above-mentioned composition, since the processor 2010 can execute memory access for various kinds of data without regard to the presence of a plurality of data compression/expansion means, according to an executed program, an already existing program can be used without changing the program.

The upper limit in the amount of image data to be processed by the processor 2010 can be sometimes determined in advance. The memory 2050 is composed of one memory, or as a memory module by combining a plurality of memories, and the capacity of the memory 2050 is generally already established. If the capacity of the memory 2050 is already set, the efficiency of use of the memory 2050 is improved by using a plurality of kinds of compressed data together for the memory 2050. A data processing system adopting the above-mentioned plurality of kinds of compressed data together can be easily implemented by using a data coding method adopting a fixed data compression factor, in which the amount of compressed data to be processed can be fixed in advance.

Figure 27:
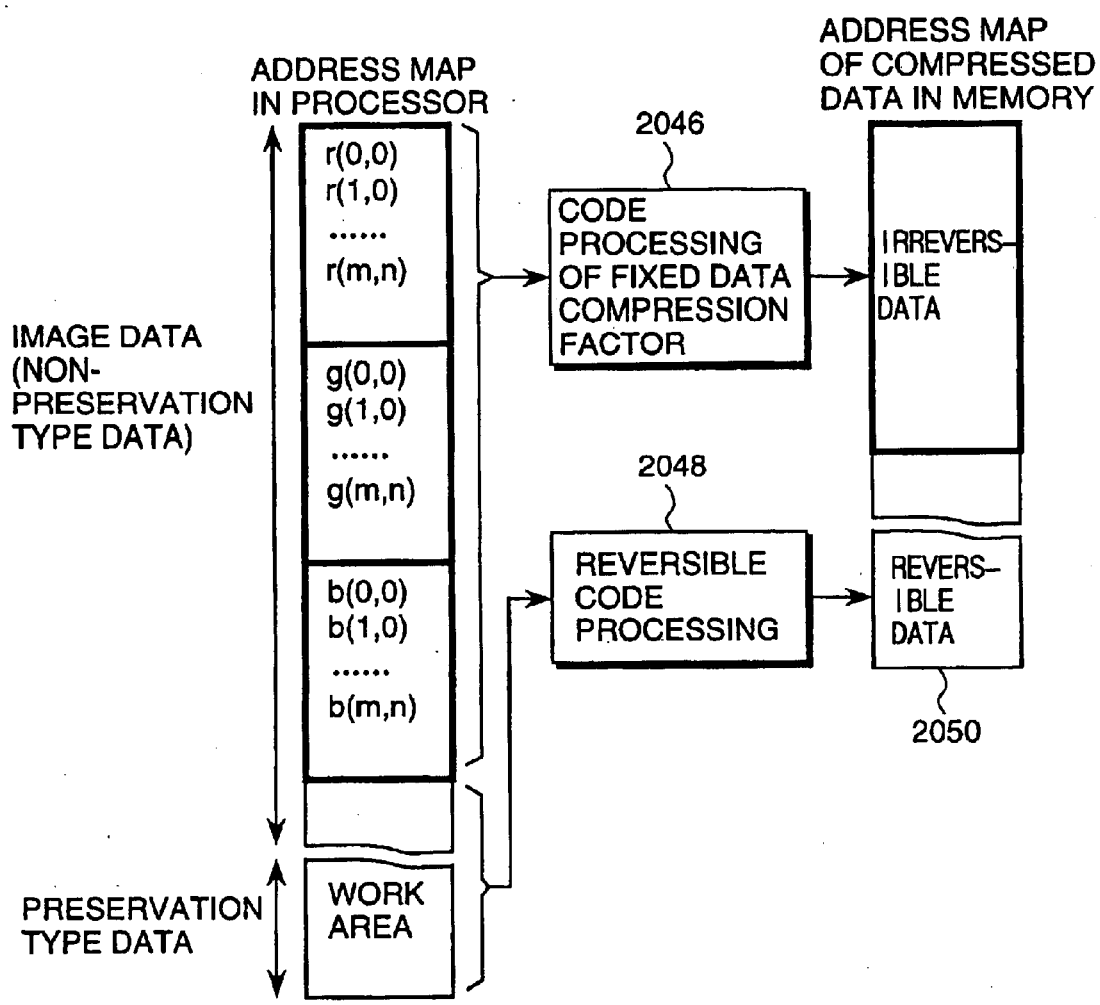
FIG. 27 is a functional block diagram showing the process of converting an memory address map in a processor to an address map in a memory for compressed data.

For example, as shown in FIG. 27, for image data selected by the switch 2042, code processing with a fixed data compression factor is performed in the first data compression/expansion part 2046, and reversible code processing with a fixed data compression factor is performed in the second data compression/expansion part 2048. Data processed by each code processing is stored in respective areas in the memory 2050. The first data compression/expansion part 2046 has the first data compression means, and the second data compression/expansion part 2048 has the second data compression means. It is possible to implement the second data compression/expansion part 2048 such that it does not perform data compression/expansion processing, but stores data to be output from or input to the processor 2010 as it is into the memory 2050. Furthermore, it is also possible that reversible code processing can be realized in the data compression/expansion part 2048 by using a Zip-Lempel method.

Now, priority setting in the data processing executed in the processor will be explained.

In the data compression/expansion processing executed in accordance with a memory access required by the processor 2010, the data compression or the data expansion sometimes does not finish in synchronization with the period of the memory access executed by the processor 2010. The time necessary to execute the data compression is not always equal to that necessary to execute the data expansion. The difference between the data compression and the data expansion exists as follows. That is, operations of memory access in a memory read process and a memory write process of the processor 2010 will be explained in the following. In the memory write process, the process is fundamentally finished during the period from the processor 2010's outputting each data to be written in the memory 2050 to the memory 2050's receiving the data to be written. Even if a buffer, such as a FIFO register provided in the data compression/expansion device 2014, receives the data to be written in the memory 2050, the memory write process is fundamentally finished during the above-mentioned period. On the other hand, since the memory read process is fundamentally finished during the period from the processor 2010's outputting an address of each data to be read out of the memory 2050 to each data corresponding to the address being transmitted to the processor 2010, a longer time during which the processor can receive the transmitted data is necessary.

The memory write process is also fundamentally finished at the time of receipt of the data to be written in the memory 2050, which is performed by a buffer, such as a FIFO register. Furthermore, the data compression processing can be performed after the processor 2010 has finished the memory write process. On the other hand, in the memory read process, the processor 2010 has to wait until the data expansion processing is finished. Therefore, it is desirable to execute data processing for the memory read process quickly.

When the memory read process is performed successively after the memory write process, if the data expansion processing in the next memory read process can not be performed until the data compression processing in the memory read process is completed, the waiting time of the processor 2010 becomes longer. As an example of interference between the data compression processing and the data expansion processing, data inputting and outputting between the data compression/expansion device 2020 and the memory 2050 can be shown. The data transmission lines between the data compression/expansion device 2020 and the memory 2050 are commonly used for inputting and outputting compressed data, in order to reduce the number of data transmission lines. Therefore, inputting and outputting compressed data can not be performed at the same time.

Figure 28:
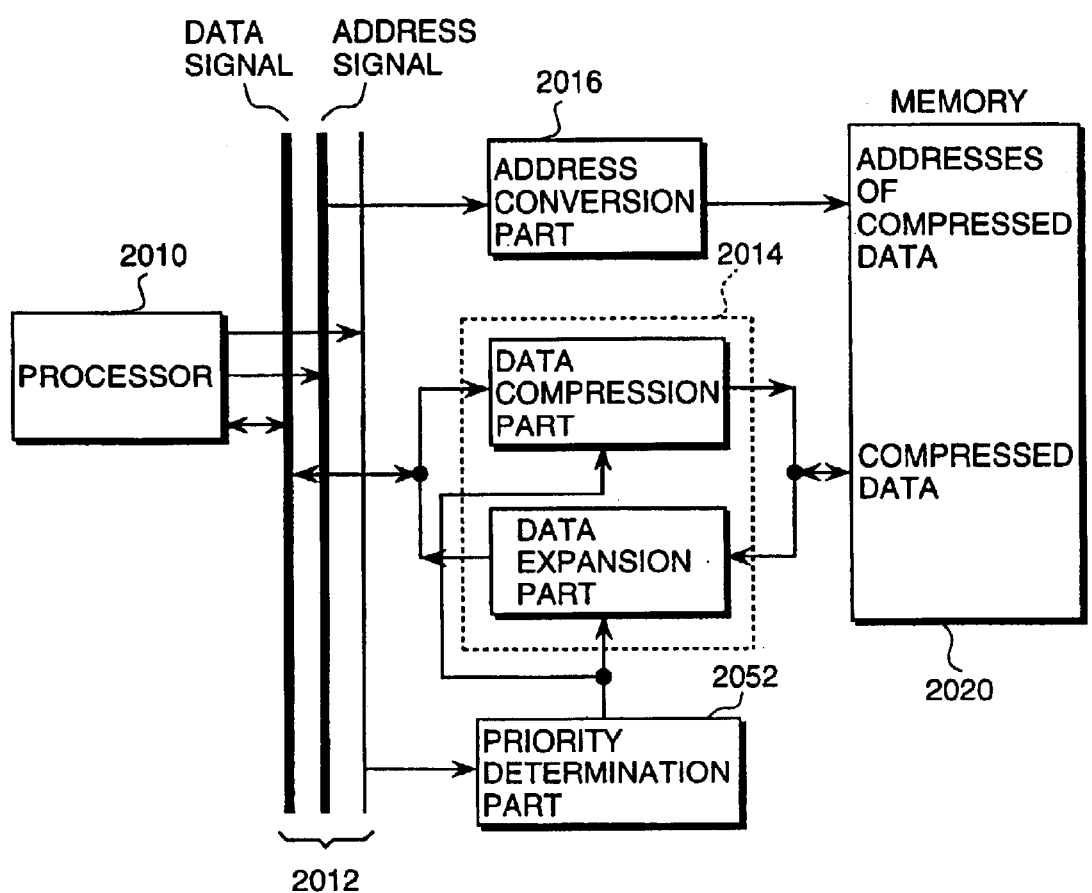
FIG. 28 is a block diagram showing a fundamental composition of the data processing apparatus using a method of setting the priority for data write-in processing and data readout processing.
Figure 29:
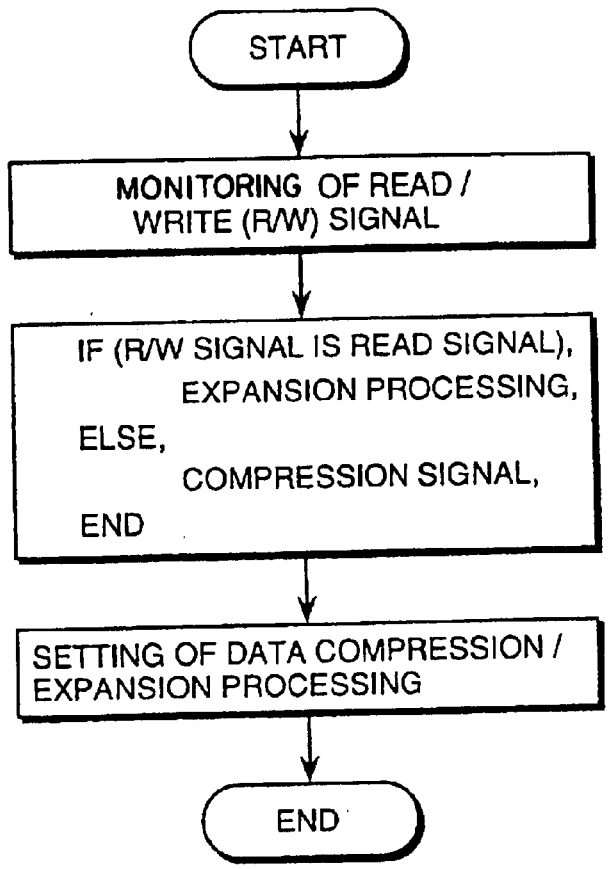
FIG. 29 is a flow chart of priority determination processing executed in the data processing apparatus shown in FIG. 28.

As a method of setting the priority for each kind of data process, for example, a priority determination part 2052 for monitoring a R/W (Read/Write) signal of control signals output from the processor 2010 is provided as shown in FIG. 28. In accordance with the result output from the priority determination part 2052, either the data compression process or the data expansion process can be selected. In the embodiment, the data expansion processing in the memory read process is performed prior to the data compression processing in the memory write process. When the memory write process is required by the processor 2010, as shown in FIG. 29, even if the data compression/expansion device 2014 is executing data compression processing in a memory write process, a part or the whole of the data compression processing is interrupted, and the data expansion processing in the memory read process is started. After the data processing of the higher priority is finished, the interrupted data processing is restarted. If the processor 2010 has a waiting time in spite of the above-mentioned priority control for the data processing, the interference problem can be solved by sending a waiting command signal to the processor 2010.

Furthermore, if it takes a long time to compress data, or data is temporally stored into a buffer, such as a FIFO register, it sometimes occurs that data already processed by the processor 2010 has not been stored in the memory 2020 yet, and the next data processing is started. This problem is one such in which a control sequence stored in a cache memory is to be inferred. A technique for solving the problem is different from the technique of the present invention in the below-mentioned point. That is, in the present invention, since data stored in a buffer, such as a FIFO register included in the data compression/expansion device 2014, is non-compressed data, and the memory 2020 stores compressed data, the sequence for the data compression process and the data expansion process should be considered.

In order to solve this problem, if image data already written in the memory 2020 exists in the buffer, such as a FIFO register, the image data is read out of the memory 2020 in the memory read process. That is, if image data corresponding to an address of a pixel to be processed by the processor 2010 exists in the buffer, outputting the data stored in the buffer is executed prior to data reading by using the data compression/expansion device 2014 and the memory 2050. On the other hand, if image data corresponding to an address of a pixel to be processed by the processor 2010 does not exist in the buffer, data reading by using the data compression/expansion device 2014 and the memory 2050 is executed, and the expanded image data is output to the processor 2010.

A color conversion process for converting expanded color data to color data of a type more adequate to print will be explained in the following.

Generally, although color image data for each pixel is expressed by three color component data of the C, M and Y, color image data is sometimes expressed by four color component data for the colors C, M, Y and K in order to improve the color reproducibility of black. If an image frame including a large area expressed by only black, such as a letter image, is processed, since the amount of generated data in data processing using only black is ⅓ of that in data processing using the combination of the three color component data, it is possible by data processing using only black to considerably reduce the time necessary to generate image data and write it in the memory.

Each color data for image data expressed by three or four color components are stored in an address area prepared for each color component. For the data compression/expansion processing, the method of expressing color image data by using the combination of three color components is often used. This is because the number of color components expressing color image data to be processed had better to be reduced to the minimum number of 3, which improves the efficiency of the data compression, since three color component data for expressing black is calculated by using an equation based on a principle expressing color reproduction. Moreover, it causes a complication in the data processing apparatus to provide the data compression part for two kinds of color expression using three and four color components.

Figure 30:
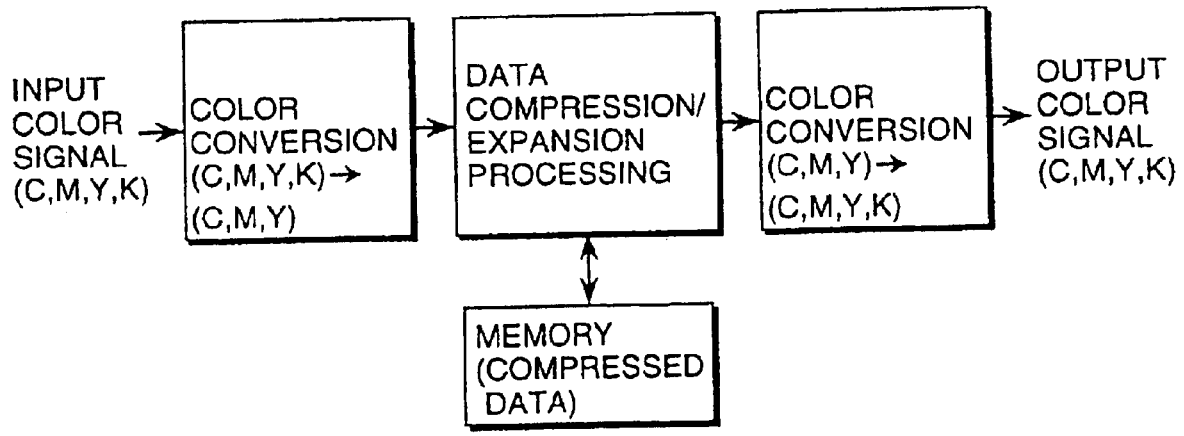
FIG. 30 is a functional block diagram for explaining a color signal conversion processing method.
Figure 31:
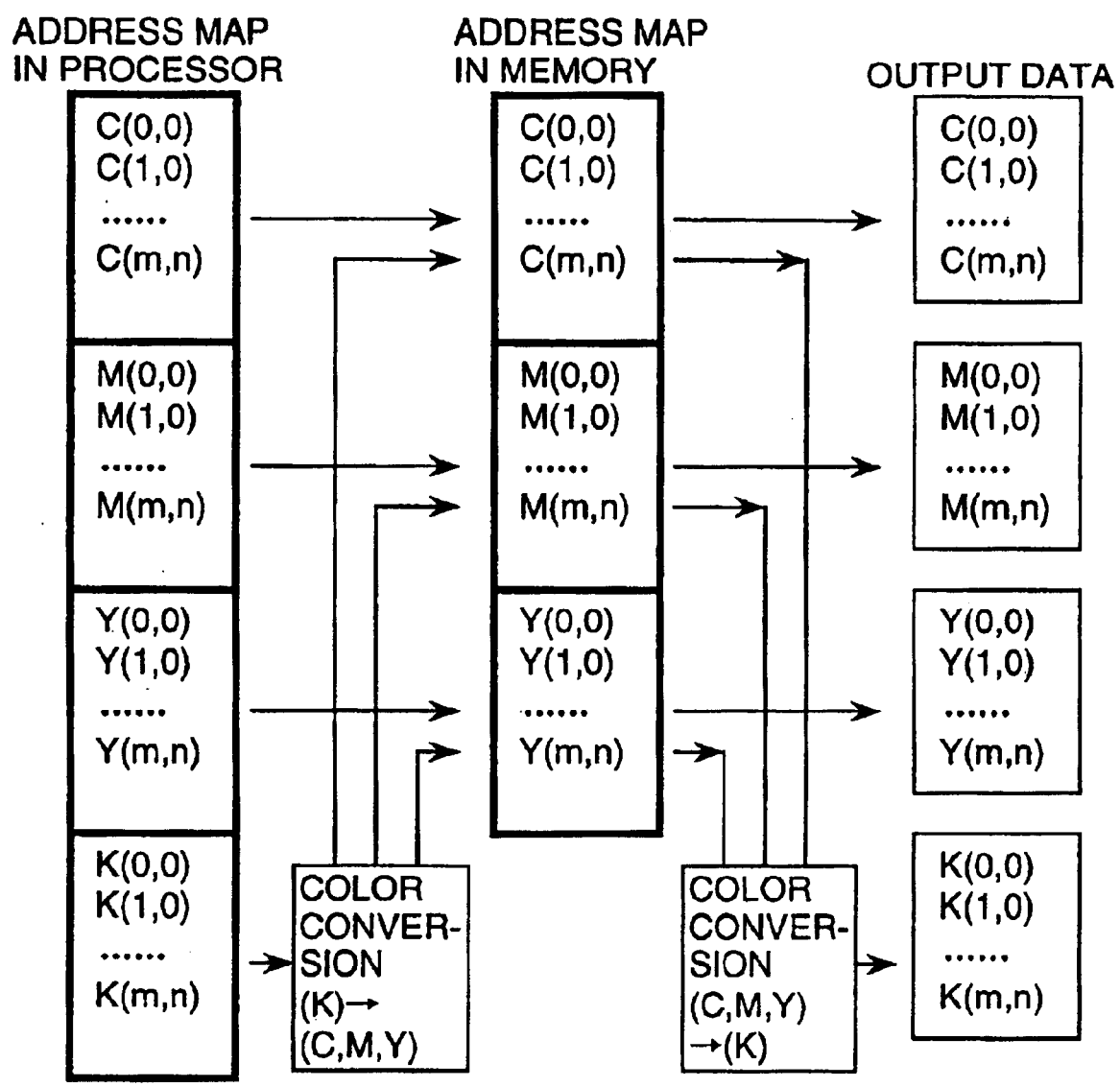
FIG. 31 is a functional block diagram showing the relation between an address map in a processor and an address map of a memory, in the color signal conversion processing.

In the embodiment, as shown in FIG. 30 and FIG. 31, a means for determining the kind of color component of color data output from the processor 2010, based on an address at which the color data is to be written, is provided. If color data for black is output, a black color is decomposed into three color components C, M and Y, and the color data for three color components are compressed and stored in the memory 2020. Moreover, when a pixel image in black is printed, black is synthesized by obtaining the amount of each color component based on a black color synthesizing equation. By using the above-mentioned color data processing, the data processing time of the processor 2010 is reduced, and an efficient data compression is realized.

Furthermore, when color data stored in the memory 2020 is output to an external apparatus, such as a printer, each of the color data can be output in synchronism with the output timing of the external apparatus, without data processing by the processor 2010. Data processing, such as color conversion, is also executed in synchronism with the output timing. If the time necessary for data expansion processing is short, and data expansion processing can be effected also in synchronism with the output timing, a buffer memory for temporarily storing expanded data is not necessary, and data processing from the data output process of the processor 2010 to the data printing process of the printer can be executed in real time. The color conversion means can be implemented by using a circuit for calculating the color decomposing/synthesizing equation and a conversion table, or a combination of those two elements.

In the following, a method of expressing a color for a pixel block by using approximate colors of which the number is less than the number of pixels in the block, and a distribution of the approximate colors in the block, will be explained. Moreover, the composition of a data processing apparatus for implementing the method also will be explained.

Figure 32:
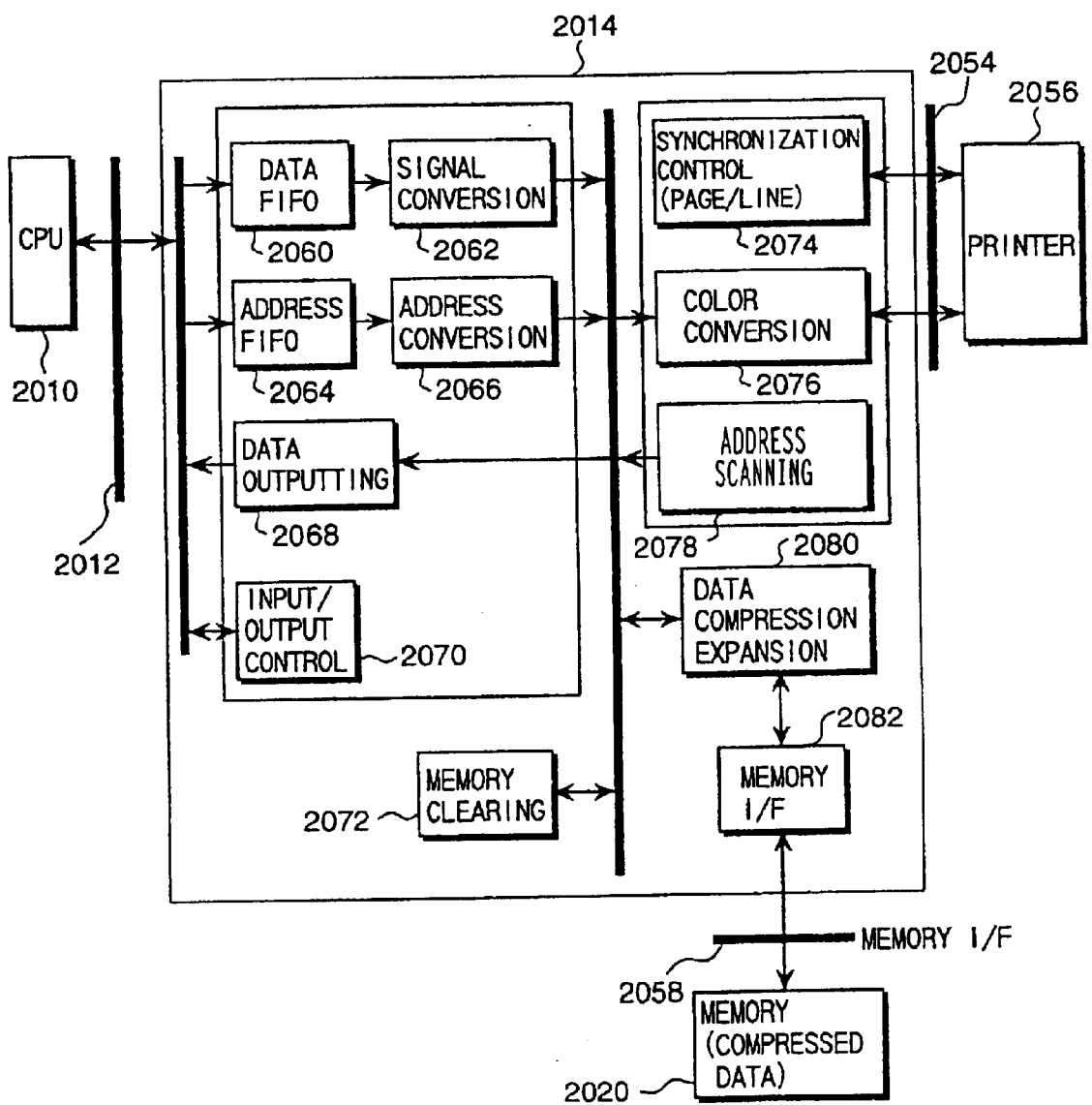
FIG. 32 is a block diagram showing a detailed composition of the data processing apparatus shown in FIG. 24.

FIG. 32 shows a fundamental schematic block diagram of the data processing apparatus. In this figure, the data processing apparatus is composed of the processor 2010, the data compression/expansion device 2014 and the memory 2020. The data compression/expansion device 2014 is connected to a printer engine 2056 via a printer interface 2054, and to the memory 2020 via a memory interface 2058. Moreover, the data compression/expansion device 2014 is composed of a FIFO register 2060 for data, a signal conversion part 2062, a FIFO register 2065 for addresses, an address conversion part 2066, a data outputting part 2068, an input/output control part 2070, a memory clearing part 2072, a synchronization control part 2074 (for page/line), a color conversion part 2076, an address scanning part 2078 (for sequential image frame scanning), a data compression/ expansion part 2080 and the memory interface 2082. The FIFO register 2060 temporally stores data to be written, which data is received from the processor 2010, and outputs the stored data to the signal conversion part 2062, and a FIFO register for addresses 2064 temporarily stores addresses which are output from the processor 2010 and outputs the stored addresses to the address conversion part 2066. The length of each of the FIFO registers 2060 and 2064 is based on the frequency of memory access operations and the processing speed of the data compression/expansion part 2080. Image data of pixels in a pixel block defined as a unit of data compression processing are continuously sent to the data compression/expansion part 2080. The signal conversion part 2062 performs color or density conversion, and decomposes a color signal of black into three color component signals. The function to decompose a color signal of black is used to write color data of only black for a letter image frame at a high speed. The address conversion part 2066 converts addresses for a data write-in process, which addresses are output from the processor 2010, to an address in a image frame, of a block, and addresses in the block, of pixels included in the block. The data outputting part 2068 expands compressed data corresponding to a data read-out requirement signal output from the processor 2010, and outputs the expanded data. The input/output control part 2070 includes an interface used as a memory device by the processor 2010, which is composed of an address signal line, a data signal line, a data transmission control signal line, etc. Data used in data processing by the processor 2010 is transmitted via the interface. As forms of data transmission performed via the interface, transmission of one color data, transmission of all color data for a pixel, and burst transmission of all color data of a plurality of pixels, etc., are provided.

The synchronization control part 2074 outputs timing signals in synchronism with operation timing of an external apparatus. For example, if an external apparatus is a printer, the synchronization control part 2074 inputs a page/line synchronization signal to output image data in synchronism with the printing operation of the printer and generates timing signals for outputting image data. The color conversion part 2076 converts color signals input thereto to color signals fitting the coloring characteristics of an external apparatus. For example, if an external apparatus is a printer, the color conversion part 2076 executes a calculation for generating a color signal for black by using three color component signals C, M and Y. The address generation part 2080 generates an address in an image frame, of each block, and addresses in the block, of pixels included in the block, according to the predetermined order of data outputting, in order to expand compressed data in accordance with signals output from the synchronization control part 2074. The data compression/expansion part 2080 performs conversion processing between data compression and data expansion. The memory interface control part 2082 exchanges data with the data compression/expansion part 2080 and with the memory 2020 via the memory interface composed of a data signal line, an address signal line, a data transmission control signal line (for example, R/W signal), etc. The memory clearing part 2072 performs the initialization of the memory 2020, based on a reset signal input from the outside or in response to detection of turn-on of a power source switch.

The data compression factor used in the data compression/expansion device 2014 is determined and set on the basis of the number of pixels included in a pixel block, the number of approximate colors used in a block, etc., and the degree of deterioration of the data quality changes depending on the set data compression factor. In the embodiment, a user can set the data compression factor, based on the image quality which the user requires. Moreover, the data processing apparatus can also set the data compression factor according to a program stored in the apparatus, based on the size of an image frame and the capacity of the memory, which are detected by the data processor itself.

It is also possible to adopt another type of block, different from that of the blocks shown in the above-mentioned embodiment, in order to make the deterioration of the image quality inconspicuous. For example, blocks of a diamond shape having oblique boundaries are effective to make the deterioration of the image quality inconspicuous, since changes of signals in the virtual and horizontal directions are conspicuous to the visual sensation characteristics of a human. Furthermore, it is possible to correct the expanded image data to make the deterioration of the image quality inconspicuous. For example, it is effective to moderate the discontinuity of the color tones between blocks neighboring each other by averaging the value of color data for each of the boundary pixels in a block, and the value of that for each pixel which neighbors the above pixel, of boundary pixels in another block.

In the following, data write-in processing and data read-out processing performed in the data processing apparatus will be explained.

Image data generated by the processor 2010 is formed as bit-map data, for example based on image data input by using page description language. For a color image, three color component data {R, G, B} or {C, M, Y} are generated for each pixel. To write the generated image data in the memory 2020, the processor 2010 outputs an address of a pixel, which corresponds to the position of the pixel in the image page (frame) and the generated image data of the pixel. The memory 2020 stores unspecified kinds of data, such as program data, data used for data processing, etc., besides image data. Those kinds of data are mainly identified based on addresses of the data. Otherwise, the kinds of data also can be identified by adding the kind of data to the data as header information.

The data compression/expansion device 2014 monitors an address of a data signal on the bus 2012, which is output from the processor 2010, and identifies the kind of data signal, based on the address, by setting an area corresponding to each kind of data in the memory 2020 in advance. As mentioned above, the kinds of data also can be identified by adding the kind of data to the data as header information. If the deterioration of the quality of data, such as image data, is permitted, a data signal and its address on the bus 2012 are taken into the data compression/expansion device 2014 by using a timing control signal for data transmission on the bus 2012. If the time necessary for the operations for data take-in is not constant, data transmission between the processor 2010 and the data compression/expansion device 2014 can be certainly executed by employing a process for dispatching the completion of each data transmission. The data compression/expansion device 2014 performs data compression processing and data write-in processing by using a data signal and its address taken into the device 2014. If some image data stored in the memory 2020 is to be replaced, the image data to be replaced is rewritten, while the other background image data is preserved. Therefore, the data substitution processing is composed of the steps of conversing an address, corresponding to the position of a pixel in a two-dimensional image frame, to an address in the memory 2020 in which compressed data is stored, reading a plurality of compressed data out of the memory 2020 based on the converted address, expanding the read out compressed data, rewriting expanded data to be substituted, compressing the rewritten data, and writing the compressed data into the memory.

As mentioned previously, the data transmitted between the processor 2010 and the external memory 2020 is not restricted to image data. The deterioration of the quality of image data is sometimes permitted. On the other hand, it is not permitted to change the contents of character data or numeral data. As mentioned above, the kinds of data can be identified by setting a range of addresses for each kind of data. By preparing address subspaces (ranges) arranged in an address space for data as a so-called address map, it can be determined which data signal is to be compressed and which data signal is not to be compressed, for a data signal output from the processor 2010, based on the address of the output data signal. Furthermore, the data signal is processed according to the result of the determination, and it is stored in the address subspace corresponding the address. Therefore, it is possible to store reversible data together with irreversible data in the same memory.

The data storage means used in the above-mentioned data processing apparatus is not restricted to the memory 2020, since an optical data storage means, a magnetic data storage means, and so forth, are applicable for use as the data storage means. Moreover, the data compression/expansion device 2014 is not always fixedly connected to the data storage means, since a detachable data storage means, such as a memory card, an IC card, etc., is also applicable.

In the following, operations of the data processing apparatus will be explained.

Figure 33:
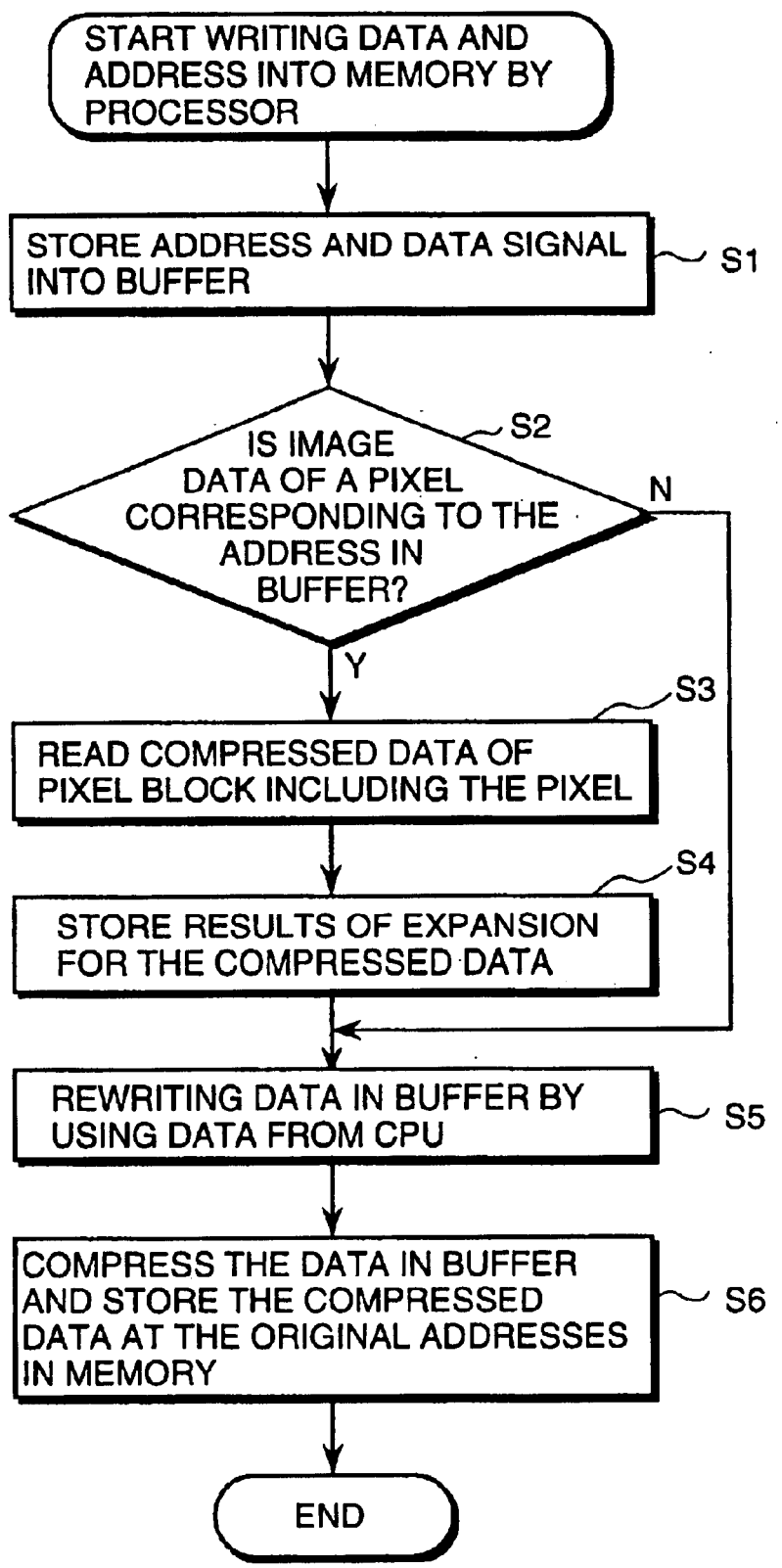
FIG. 33 is a flow chart of data write-in processing.

Procedures for writing data from the processor 2010 into the memory 2020 are shown in the flow chart shown in FIG. 33. At step S1, the processor (CPU) 2010 outputs a data signal and its address (CPU address), and stores them in buffers of the data FIFO 2060 and the address FIFO 2064, respectively. At step S2, it is determined whether or not image data corresponding to the CPU address exists in the buffer of the data FIFO 2060, and if the image data exists in the buffer, a plurality of compressed data for a pixel block including a pixel corresponding to the CPU address are read out of the memory 2020, at step S3. At step S4, the read out compressed data is expanded, and the expanded data is stored in the buffer. At step S5, the data in the buffer is rewritten by using the CPU data, and at step S6, the data in the buffer is compressed and stored at the original addresses in the memory 2020. Thus, the procedure for writing data from the processor 2010 into the memory 2020 ends.

Figure 34:
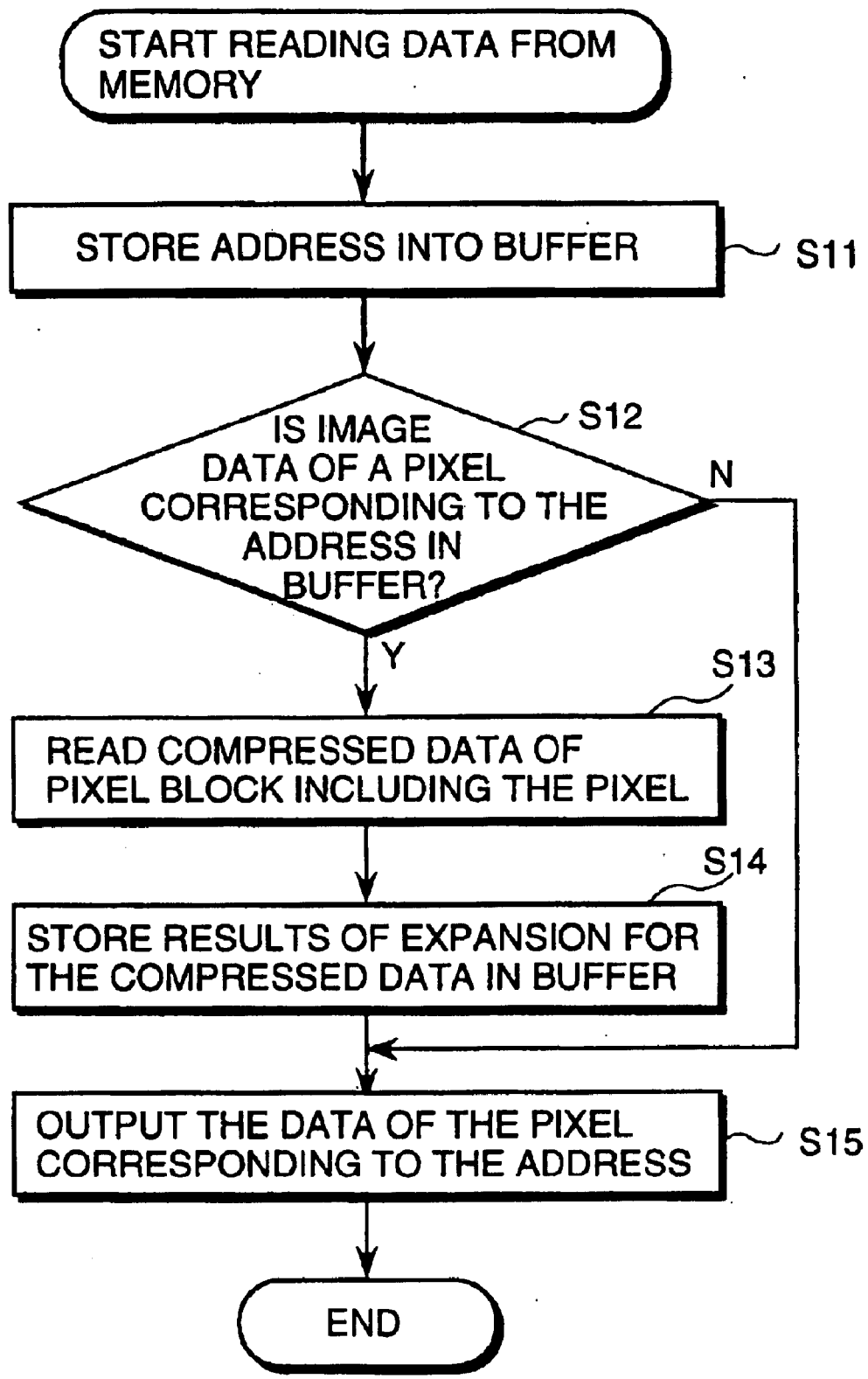
FIG. 34 is a flow chart of data read-out processing.

Procedures for reading data out of the memory 2020 are shown in the flow chart in FIG. 34. At step S11, the processor (CPU) 2010 outputs an address and stores it in the buffer of the address FIFO 2064. At step S12, it is determined whether or not image data corresponding to the CPU address exists in the buffer of the data FIFO 2060, and if the image data exists in the buffer of the data FIFO 2060, a plurality of compressed data for a pixel block including a pixel corresponding to the CPU address are read out of the memory 2020, at step S13. At step S14, the read out compressed data is expanded, and the expanded data is stored in the buffer of the data FIFO 2060. At step S15, the image data corresponding to the CPU address is output to the processor 2020. Thus, the procedure for reading data out of the memory 2020 ends.

Figure 35A:
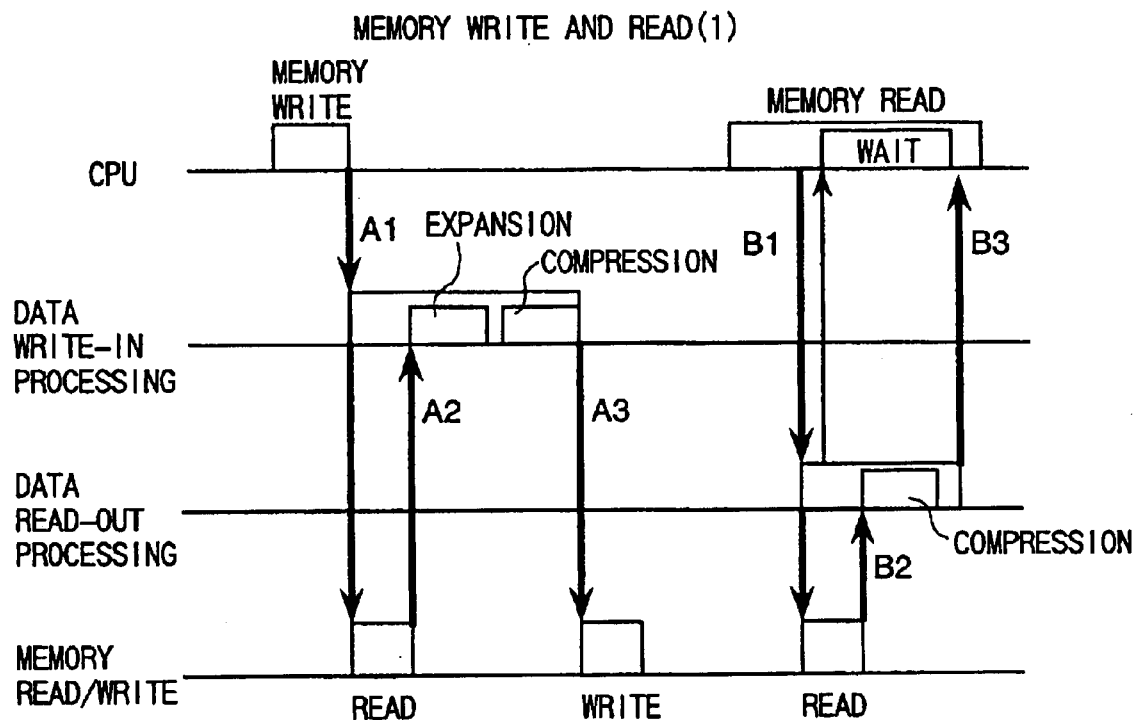
FIGS. 35A and 35B are timing charts for explaining operations in two different processing cases of the data processing apparatus.
Figure 35B:
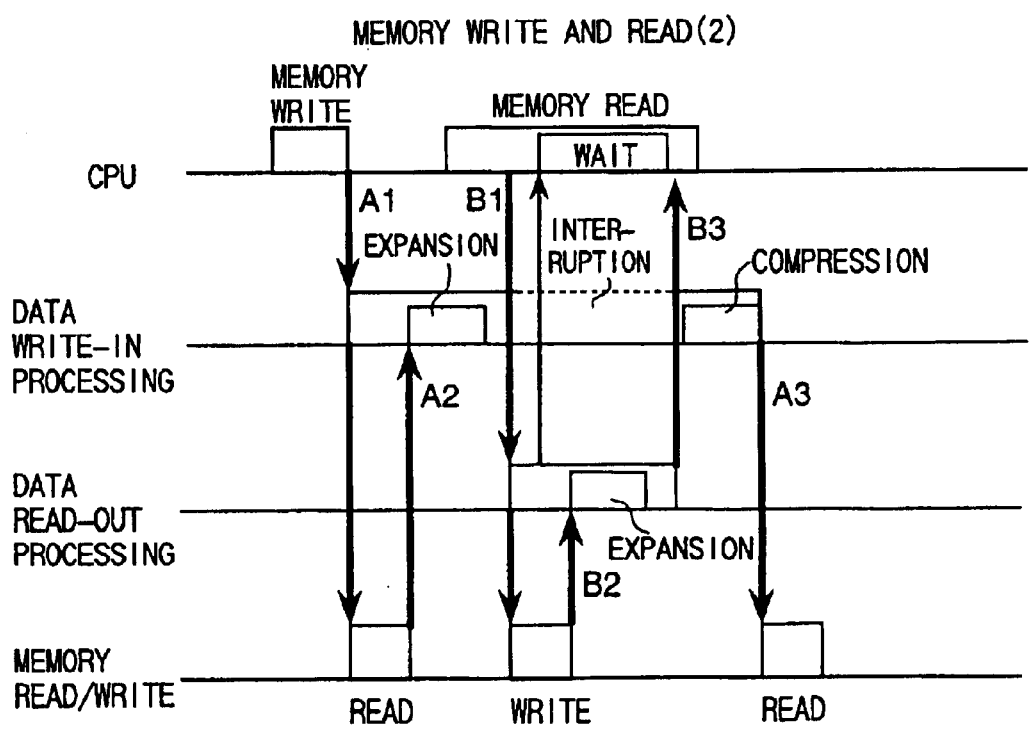

Furthermore, when the processor 2010 reads data out of the memory 2010 or writes data into the memory 2010, data processing is executed according to timing charts which are shown in FIGS. 35A and 35B. FIG. 35A shows an example of a timing chart in which a data write-in process and a data read-out process which are required by the processor 2010 are executed by leaving a time space between the two processes, and a data expansion process and a data compression process corresponding to the above two processes are executed in the data compression/expansion device 2014 without overlapping of the data expansion and compression processes. FIG. 35B shows an example of a timing chart in which a data write-in process and a data read-out process which are required by the processor 2010 are sequentially and continuously executed, and the data read-out process is executed prior to the data write-in process so that the two processes do not overlap each other in the data compression/expansion device 2014.

If data compression/expansion processing can not be executed in synchronism with the data write-in processing of the processor 2010, it is possible to adjust the timing between both processings by temporarily storing result data for both processings in the FIFO 2060 and FIFO 2064. Furthermore, if the FIFO 2060 and FIFO 2064 are filled with data signals, a waiting command is sent to the processor 2010.

In the code processing of the data compression/expansion device 2014, data processing is executed by a unit of a pixel block composed of a plurality of pixels, in some cases. For example, the above-mentioned processing is executed in a method of approximating colors which are presented in a pixel block, using a well known JPEG method, a vector coding method, etc. If the above-mentioned data processing is adopted, in order to rewrite a part of image data for a pixel block, all compressed data corresponding to the pixel block is read out of the memory 2020 and expanded. Furthermore, a pertinent part of the expanded data is rewritten and stored in the memory 2020. Therefore, more data than data to be written should be processed. In consideration of the above-mentioned data processing, it is desirable for the time of data processing to be further reduced.

In the embodiment, to reduce the time of data processing, the buffers of the FIFO 2060 and the FIFO 2064 are provided, and data written into the memory is temporarily stored in the buffers. Data to be substituted is taken out from among the data stored in the FIFO 2060 and rewritten. Furthermore, the expanded data, including the rewritten data, is compressed. This data processing method is effective for an application program in which data stored at continuously positioned addresses is sequentially arranged in the order, for example, of a program for processing image data. Furthermore, this data processing method is also effective for the data write-in processing of the processor 2010, to which a burst data transmission method, suitable for continuously writing a plurality of data into a memory, is applied. Since, in the burst data transmission, to reduce the time for memory access, data at continuously positioned addresses can be transmitted at a high speed, the burst data transmission is applied to the transmission of image data in a pixel block, which is often continuously transmitted. For example, if a unit of data processed in the code processing is a group of 8-bit image data for a pixel block composed of 4 pixels (2 pixels in the horizontal direction×2 pixels in the vertical direction), and 4 words (for example, one word is composed of 8 bits) are continuously sent in the burst data transmission of the processor 2010, image data for one pixel block can be sent by a one time burst data transmission. The data compression/expansion device 2014 can efficiently process data since data sent by a one time burst data transmission can be compressed or expanded for one processing period. In order to realize the above-mentioned efficient data processing by using the burst data transmission, it is necessary to implement a data processing program of the processor 2010, which can correspond to the bust data transmission.

To add image data which is newly generated to image data which already has been stored in the memory 2020 for compressed data, pertinent compressed data is read out of the memory 2020 and expanded. The expanded data and the newly generated image data are synthesized, and the synthesized data is compressed and stored in the memory 2020. Therefore, if image data for one pixel block is stored at one area of continuously positioned addresses, data read-out processing or data write-in processing for data for each pixel block can be performed by a one time data transmission process.

In the data read-out processing of the processor 2010 also, similar to the data write-in processing, data processing can be performed by using the FIFO 2060 and the FIFO 2064. However, since it is desirable to reduce the waiting time of the processor 2010 in the data read-out processing, the data read-out processing is preferentially executed even if data is stored in the FIFO 2060 and the FIFO 2064 in the data write-in processing.

If a semiconductor memory is used as the memory 2020, the contents of the semiconductor memory are unspecified right after the start of power feeding. In writing image data into the memory 2020, since the unspecified data is dealt with as noise data, it is desirable to clear the contents of the memory 2020 at the start of power feeding or at the time of resetting the memory 2020. This memory clearing process can be performed by writing data into a region of the memory 2020 for storing image data. However, the time for clearing contents of the memory 2020 sometimes becomes long, although it depends on the data processing speed of the processor 2010. In order to solve this problem, the following means are provided, that is, a means for sequentially generating addresses in the region for image data in the memory 2020, a means for generating data used for clearing the contents in the region and a means for writing the generated data into the region. By using those means, the contents of the region in the memory 2020 can be cleared at a higher speed in comparison with the memory clearing processing performed by a memory clearing program provided in the processor.

In the following, in the case wherein compressed data for a plurality of image frames is stored in the memory 2020, procedures for quickly displaying reduced image data for image data of each original image frame, which is used for viewing the approximate contents of each original image frame, will be explained. An image frame reduction method in the embodiment generates reduced image data composed of approximate color signals for a pixel block and color selection signals for each pixel block. If an image of each pixel block is reduced so that the image of the pixel block is expressed by one pixel, the area reduction factor is a reciprocal of the number of pixels in one pixel block. This image data reduction method takes out and displays only a part of compressed data for each original image frame, and it can be very easily performed.

Figure 36:
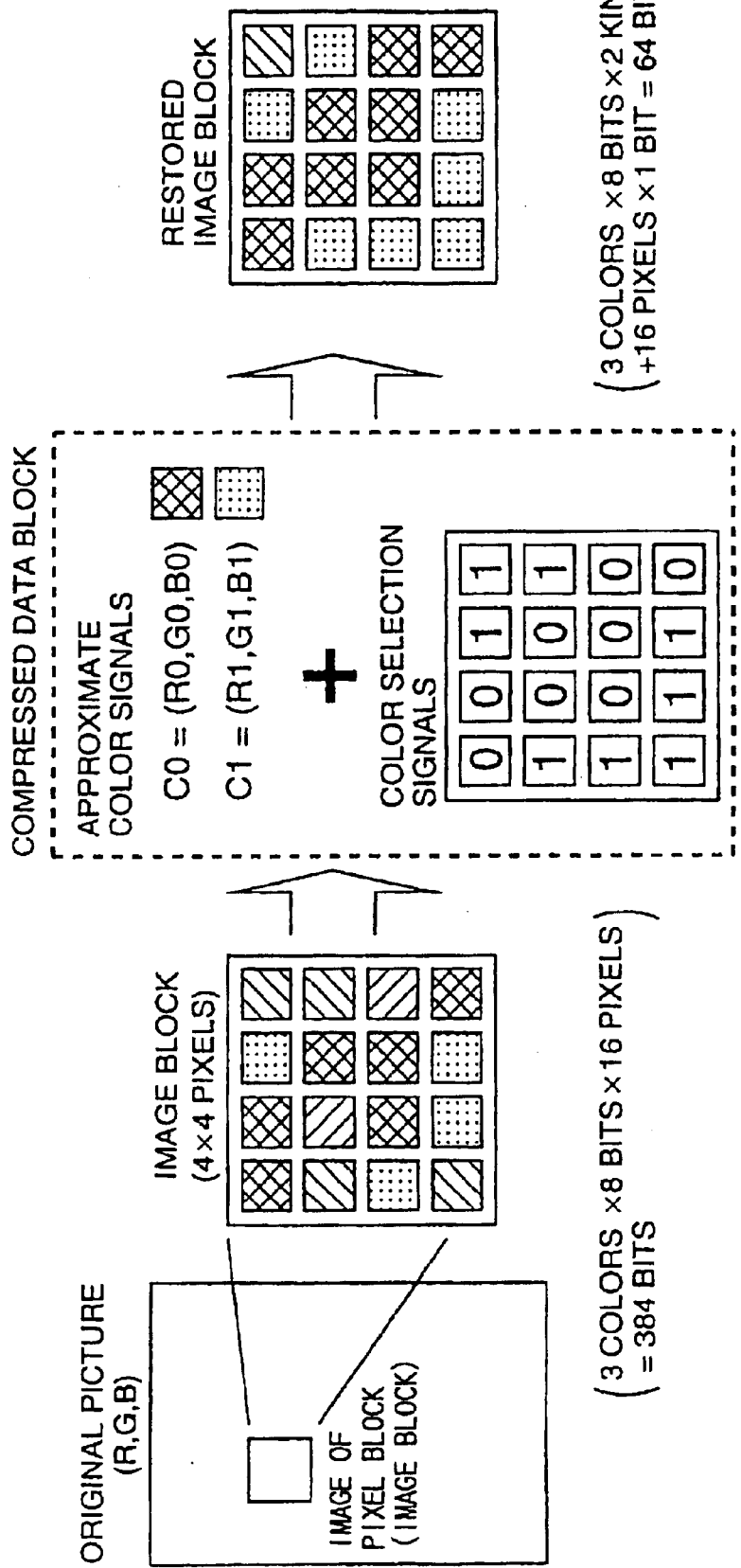
FIG. 36 is a diagram for explaining an image data compression method.

In the image data reduction method according to the present invention, image data for a pixel block is reduced using a data amount reduction ratio so as to be less than the preset value. An outline of the image data reduction method is illustrated in FIG. 36. This image data reduction method fundamentally expresses colors presented in a pixel block with a few approximate colors. That is, the image data reduction method generates reduced image data consisting of approximate color signals representing colors of pixels in a pixel block and color selection signals (arrangement signals) for selecting one of the approximate colors for each pixel in the pixel block. In FIG. 36, an image frame is divided into pixel blocks of 16 pixels (4 pixels in the horizontal direction ×4 pixels in the vertical direction), and an image of each block is displayed with two approximate colors. In each original image frame, since an image of each pixel block is expressed by three color components, a data amount of 384 bits is necessary for expressing an image of each pixel block. On the other hand, in an image expressed by the reduced image data, since an image of each pixel block is expressed by using two approximate color signals and 16 color selection signals of 1 bit, the data amount for expressing an image of each pixel block is 64 bits, and the image data reduction factor is 1/6. An approximate color signal C0 is expressed by a data signal of the value 0, and an approximate color signal C1 is expressed by a data signal of the value of 1.

The image data reduction factor can be fixedly set independently of the kinds of images expressed in an image frame by setting the size of a pixel block and the number of approximate colors in advance. The image data reduction factor is set based on the kinds of images expressed in an image frame, the capacity of the memory 2020 for storing compressed data and so forth.

On the other hand, image data can be classified from the point of view of the signal correlation between pixels neighboring each other, that is, image data is classified as image data for a photograph image, a mesh type print image, a letter image, etc. In the embodiment, the image data reduction method can be switched corresponding to the kind of image not only by a unit of one frame, but also for each area in a frame. Reduced image data includes information of a reduction method switching signal and the kind of the selected reduction method.

To store preservation type data (for example, program data), a data compression/expansion method such as a Zip-Lemp method can be applied. However, since the data compression factor generally changes during storage of preservation type data, it is necessary to control the data storing process so that the amount of data stored in a memory does not exceed the capacity of the memory by using the adopted data compression/expansion method together with a memory capacity monitoring method. It is also possible to store data as it is, by bypassing the data compression/expansion means.

In the following, a high-speed image generation method will be explained.

For example, in a video game device, image data of a plurality of image frames to be displayed in time-series is generated according to a scenario momentarily changed by operations of a user. To display the motion of images in the image frames smoothly, it is required to display many image frames at a short time interval similar to image displaying in a usual television broadcast. To realize the above-mentioned requirement, the processor 2010 should generate image data at a high speed, the generated image data should be quickly stored in the memory 2020, and the stored data for each image frame should be output in synchronism with the timing of displaying an image frame. However, if the definition of images, the natural color expression and the smoothness in the motion of images are to be further improved, the amount of image data to be processed and the speed of the data processing need to be increased.

The respective reduced image data, generated by the data reduction method using a fixed data reduction factor, has a data composition consisting of approximate colors expressing colors presented in a pixel block and color selection signals for assigning one of the approximate colors to each pixel in the pixel block. To say nothing of the fact that the above-mentioned reduced image data can be obtained by using a prepared bit map table, reduction of image data also can be realized by means of the following procedures. That is, as shown in FIG. 37, after the color distribution of colors presented in pixels in each pixel block and approximate colors approximately representing the color distribution are obtained, image data of each pixel block is converted to reduced image data of the above-mentioned data composition using the above-obtained color information of the pixel block, and the reduced image data is stored in the memory.

For example, almost any character image can be expressed with one color, such as black, red, etc. Therefore, image data of a character image can be composed of information on a color to be used and the arrangement of the color in pixels. The above-mentioned information can be used to generate reduced image data by using the above-mentioned image data composition. Furthermore, it is possible to generate reduced images, in which smooth changes of the color gradation, similar to an image seen in natural vision, are realized, by using the above-mentioned data composition. Moreover, since in most of video game devices dynamic images are expressed by using combinations of primitive shape data and color data used for each primitive shape, which are prepared for each of the scenarios, those dynamic images can be generated by using reduced image data formed by the above-mentioned data composition.

Figure 38A:
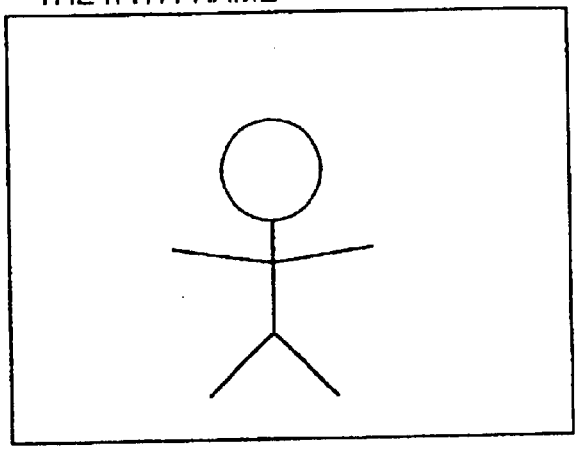
FIGS. 38(a) and 38(b) are diagrams for explaining a method of generating dynamic images.
Figure 38B:
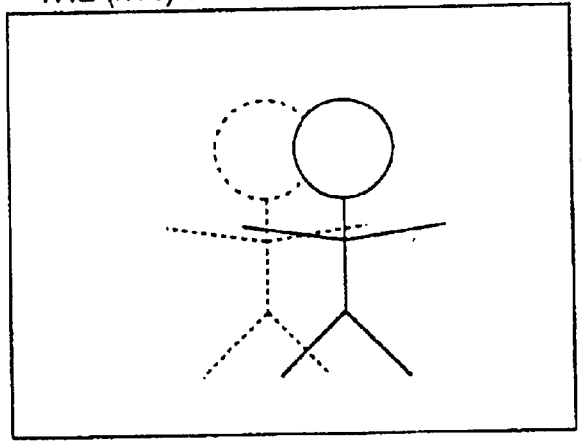
Figure 39:
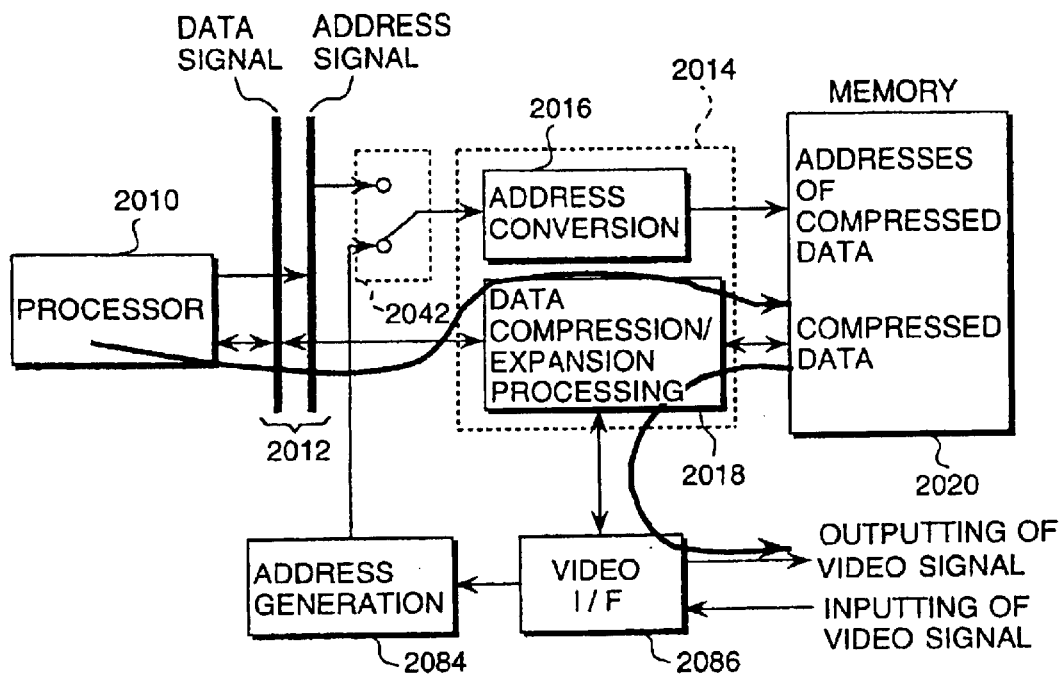
FIG. 39 is a fundamental schematic block diagram of a data processing apparatus which displays dynamic images.
Figure 40:
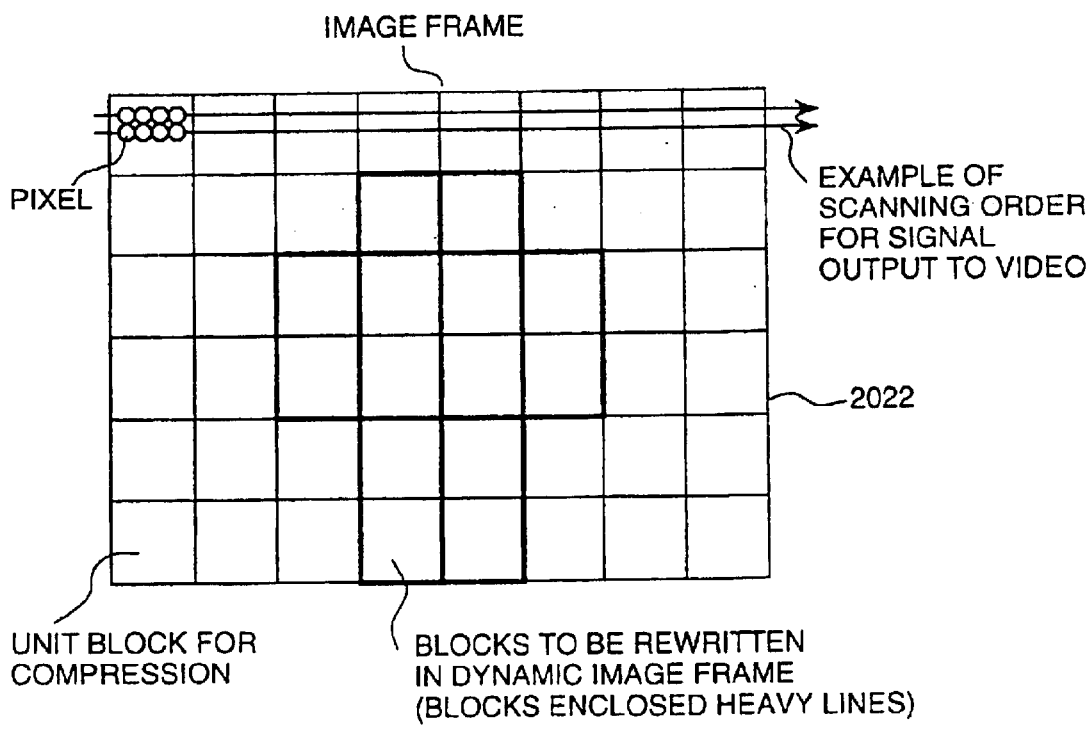
FIG. 40 is a diagram for explaining a method of composing a dynamic image.

In many of image frames continuously displayed at a short time interval, only image data of pixels in restricted regions change as shown in FIGS. 38(a) and 38(b). Therefore, by rewriting only changing image data, dynamic images can be generated. A schematic block diagram of a data processing apparatus applied to a video display device is shown in FIG. 39. The data processing apparatus in which image data of dynamic images are generated can be composed, for example, by further providing a video interface 2086 for outputting video signals by taking in a synchronization signal, and an address generation part 2084 for generating addresses of image data to be output in response to a control signal from the video interface 2086. The data processing apparatus outputs the addresses generated by the address generation part 2084 to the address conversion part 2016 via the switching part 2042. Since dynamic images are realized by image frames whose contents continuously change in time series, it is necessary to output a group of image data of each image frame at a constant output rate. On the other hand, since all of the image data in a group of image data of each image frame does not change, only a part of the image data needs to be changed. Therefore, in this embodiment, as shown in FIG. 40, only image data of pixel blocks (image data of one block are processed at one time) enclosed by heavy lines are rewritten.

Therefore, the method of generating image data for dynamic images includes the steps of determining regions in which image data change, generating reduced image data of the regions of changing image data, according to the above-mentioned data composition, and storing the reduced image data which has been generated, into the memory 2020. Furthermore, the reduced image data stored in the memory 2020 is expanded and output to a display device (not shown in a figure) in synchronism with the display timing of the display device.

As mentioned above, the generation of image data for dynamic images by using an image data reduction method has the following advantageous features.

(1) If the processor 2010 generates image data by using an image data reduction method, the image data can be generated at a higher speed in comparison with the image data generation in which a method of generating a bit map table is used, the contents of the generated image data being almost the same as those generated by the image data reduction method. For example, since the image data generation method using the above-mentioned data composition generates only approximate color data and color selection (arrangement) data for image data of each pixel block, image data of images to be displayed can be easily generated at a high speed. On the other hand, a JPEG method hardly generates image data of a reduced data format.

(2) Since it is possible to reduce the amount of image data generated by the processor 2010 for output to the outside of the processor 2010, for example, the time for writing image data into the memory 2020 can be reduced. Moreover, it is possible to reduce the time during which the data bus is occupied. Furthermore, it is possible to afford some margin to the data transmission speed by using the data bus.

(3) Since the reduced image data can be expanded at a high speed, reduced image data stored in the memory 2020 can be output in synchronism with the display timing of a display device while reduced data to be output is expanded. Therefore, since image data to be displayed can be stored in the memory 2020 in a data amount for only one image frame in the reduced image data composition, without using a bit map table, the necessary capacity of the memory 2020 can be reduced.

In the following, a composition of the printer engine 2056 will be explained The printer engine 2056, which receives image data from the data processing apparatus, generates image data to be printed, by using page description language, and prints the generated image data. Thus, a memory for storing image data for at least one image frame is necessary. To reduce the capacity of the memory, a so-called bounding memory method can be adopted. In this method, a bounding memory which can store a part of image data for one image frame is provided, and the whole image data for an image frame is generated by repeating image data generation for each of the subframes set by dividing the image frame, the bounding memory being used for each image generation. However, since it is necessary to provide a process for replacing image data in the bounding memory and a process for generating image data, in determining the boundary of each subframe, simply applying the bounding memory method involves a long time for processing image data.

On the other hand, in the embodiment of the invention, the amount of image data necessary for one image frame is reduced by making use of the above-mentioned data composition, which image data is stored in the memory 2020. In the above image data reduction, the capacity of the memory 2020 can be decreased without dividing the image frame into subframes and considering the procedures of data processing executed in the data compression/expansion device 2014. If the data processing in the data compression/expansion device 2014 is executed at a higher speed than the image data generation processing in the printer engine, in which page description language is used, the processor 2010 is not influenced by data processing executed by the data compression/expansion device 2014. Even if the image data generation executed by using page description language at a non-constant time interval, by providing a buffer and using it based on the queuing theory, it is possible to adjust the difference between the speed of the data processing executed by the data compression/expansion device 2014 and that of data processing in the processor 2010.

Figure 41:
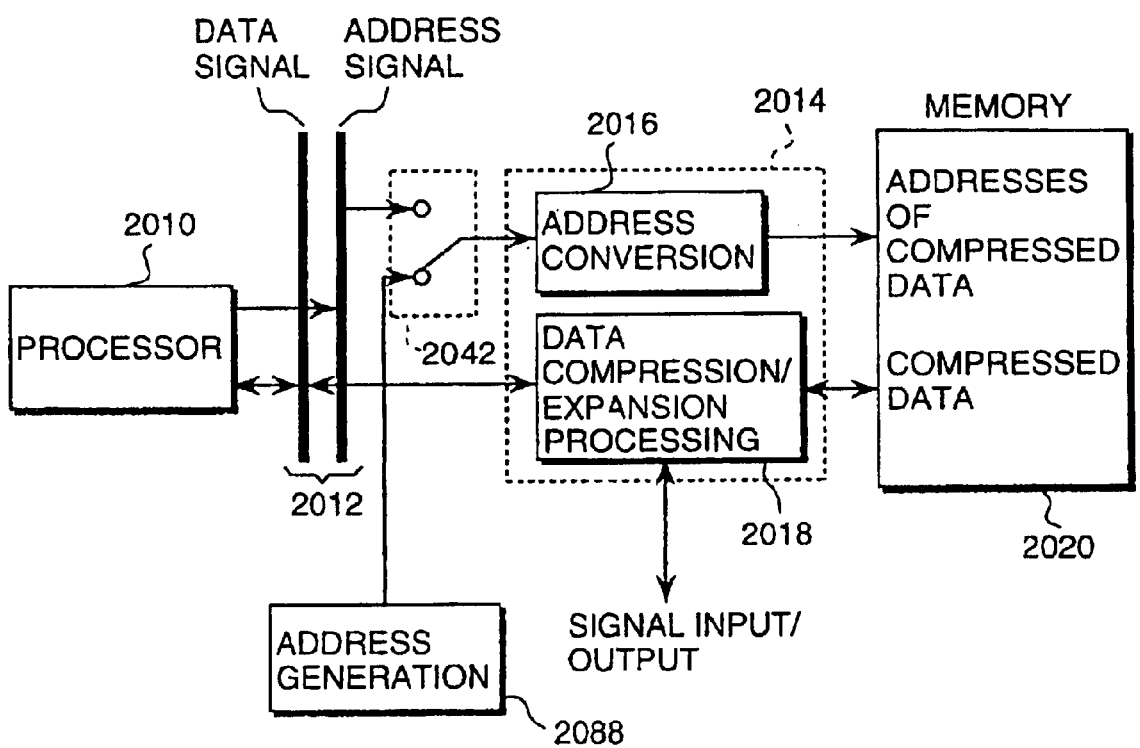
FIG. 41 is a fundamental schematic block diagram of a data processing apparatus in which a second address generation part is provided.

If image data is sequentially transmitted in order, for example, during data output operations for printing, the data processing apparatus can be composed as shown in FIG. 41. That is, an address generation part 2088 is provided to generate addresses in synchronism with the display timing. The address generation part 2088 generates addresses and outputs them to the address conversion part 2016 via the switching part 2042. Image data corresponding to the addresses is processed by the data compression/expansion part 2014, and the processed image data is output to the display device. By using the data processing apparatus of the above-mentioned composition, the data processing load of the processor 2010 can be reduced, and image data also can be output to the display device at a high-speed. Furthermore, if an image scanner is connected to the data processing apparatus, since image data output from the image scanner is sequentially input to the apparatus in order, by using the address generation part 2088, the load of the processor 2010 also can be reduced.

In the following, enlargement/contraction of an image will be explained.

In the data processing apparatus in which a number of images are stored, it is important to provide a means for searching and taking out necessary images from among the stored image data. If necessary images are letter images, the image searching can be performed by using key words. On the other hand, if necessary images are picture images, the contents of images which are searched need to be visually confirmed. Therefore, the visual confirmation of images is supported by contracting pertinent images and displaying them on the same screen.

In an embodiment according to the present invention, as shown in FIGS. 42a and 42b, a group of reduced image data for each pixel block is composed of approximate color signals and color selection signals, and an image expressing one pixel block is represented by using one of the pixels in the block and an approximate color of the one pixel. Thus, it is possible to easily obtain a contracted image frame whose area is 1/(the number of pixels included in one pixel block) of that of the original image frame. Furthermore, since the image data reduction factor is constant, it is possible to generate an image frame of an optional image contraction factor by reading an approximate color signal out of the memory 2020 in which reduced image data is stored, at a high speed, by using an address based on the image reduction factor. For example, if an image contraction factor is selected as 1/16, a contracted image frame of an image contraction factor of 1/16 is generated by designating one pixel in each pixel block composed of 16 pixels, and using and displaying an approximate color allocated to the pixel by the color selection signals.

Since, if an image frame generated for a display screen is simply printed, the printed image is too small, it is necessary to enlarge the image frame to be printed. The problem of a too small printed image frame is caused by the difference of the image resolution in a display screen and that in a printer, for example, although the resolution in a display screen is 72 dots and that in a printer is about 700 dots. One method of resolving the problem is by increasing the number of pixels for an image to be printed. However, this method increases the time for image printing. In an embodiment according to the present invention, making use of the data composition in which reduced image data for each pixel block consists of approximate color signals and color selection signals, an image frame is enlarged by enlarging a matrix of the color selection signals. For example, to enlarge an image frame in the width and the length by two times, the number of pixels in a matrix of the color selection signals is increased by two times in the width and length directions, respectively. Since the bit number allotted to each pixel in the color selection signals is small, and only one kind of a matrix of the color selection signals is to be enlarged, the time for enlarging an image frame can be reduced in the above-mentioned image enlargement processing of the embodiment. Furthermore, the generally occurring deterioration of the image quality due to image enlargement processing is caused by the large difference between the color tone of an edge region and that of an inner region in an image. As a method of resolving this problem, color tone difference smoothing processing is known. In the embodiment according to the present invention, this smoothing processing is executed by using the color selection signals.

In the following, a method of converting image data to cipher data will be explained.

Since the image data generated by the processor 2010 is digital data, such data can be easily copied and transmitted without allowance of using the data. To prevent the data copy and the non-allowed use, it is necessary to convert the image data to cipher data. However, strictly converting the image data to cipher data has the problem of difficulty in management of a cipher key, and it takes a long time to process cipher data. Therefore, as a plain encipherment method, a coding method can be adopted. In accordance with the present invention, since image data is compressed and stored in the memory 2020, if an algorithm for compressing data and control parameters used in the algorithm are not known, data expansion processing is impossible. Thus, by using the coding method adopted in the present invention, a plain encipherment for processed data can be realized.

In the following, application of the embodiment to a digital (still) camera will be explained.

Also, in an image data processing apparatus for taking in image signals by using photoelectric conversion elements, such as a CCD, and storing the image signals as image data into an optical data storage device, a magnetic data storage device, or a semiconductor memory device, if the image data can be compressed, the number of image frames stored in the data storage device can be increased. However, it is not desirable that the waiting time for operations of the apparatus and the production cost are increased by adopting a data compressing means. To solve this problem, the data processing apparatus of the embodiment according to the present invention can be used. That is, since the data compression factor can be set as a constant, the number of image frames which can be stored in a memory device can be estimated in advance. Therefore, it is possible that, by providing a means for selecting the image quality in accordance with an image quality selection signal input by a user, the image quality (data compression factor) can be set to the apparatus, based on the input image quality selection signal. Moreover, since data expansion processing is performed at a high speed, an image picked up by the apparatus can be quickly output.

In the following, the chip composition of the processor 2010 will be explained.

As the high integration density of a semiconductor element has been realized, various kinds of semiconductor elements having a plurality of functions can be mounted in one chip. Thus, by mounting a means for generating image data and a means for storing image data in the same chip, data transmission between the two means can be executed without using an external bus. Furthermore, by integrating a data compression/expansion means also into the chip, the memory can be efficiently used. The data compression/expansion means is realized by providing a function block separately from the processor, incorporating a data compression/expansion function into the processor, or assigning to the processor a data compression function.

Character data, numeral data, program data, etc., not restricted to image data, also can be processed by using the above-mentioned chip composition. If various kinds of data which are mentioned above are to be processed together, a data compression/expansion method suitable for each kind of data is also selected and used. The selection of a data compression/expansion method is performed, based on the instruction output from the processor, or monitoring and determination of an address signal of image data to be processed.

A memory mounted in a chip and an external memory can be commonly used for image data processing. In this memory composition, if the processor (or program) can use the memory without identifying the kind of each memory and kinds of data, the flexibility in use of a program becomes high, and a flexible composition of hardware components is realized. To realize the above-mentioned data processing conditions of the processor,before executing a data processing program, the processor confirms the environment for the data processing, such as the hardware composition of the computer system, and determines the kinds of data to be processed. Furthermore, the processor fixes a data management method in advance, based on results of the confirmation. For example, the rule for properly using the memory mounted in the chip, by which high-speed data transmission can be executed, and the external memory, is prepared for each kind of data in advance.

In the above-mentioned embodiment, it is possible to compose a data processing apparatus such that even if the data compression/expansion device 2014 exists between the processor 2010 and the memory 2020, a data processing program in the processor 2010 can deal with the memory 2020 as a linear memory address map in which memory access can be executed in a unit of a pixel. Furthermore, since the data compression/expansion device 2014 selects and performs a data compression/expansion method corresponding to each of various kinds of data to be processed by the processor 2010, it is possible to store various kinds of compressed and non-compressed data in the same memory 2020. Furthermore, the data compression/expansion device 2014 can execute the data compression processing and the data expansion processing so that image data with little deterioration in the image quality can be generated at a high speed without causing a delay in the data processing of the processor 2010.

Therefore, a data processing program in the processor 2010 can execute data generation and data input/output processing by using a bit map data form without taking the data compression/expansion processing into account, and as mentioned above, processed data is stored in a compressed form into the memory 2020 to which memory access is executed by the processor 2010. Thus, the processor 2010 can execute an existing data processing program without changing the program, making it possible to reduce the capacity of the memory 2020.

What is claimed is:

1. An image formation apparatus for forming an image expressed with color gradation of each unit area in an image frame to be formed, which corresponds to a pixel of an original image frame, the color gradation being performed by changing a coloration amount applied to the unit area, based on image data expressing color gradation for the pixel of the original image frame, the image formation apparatus comprising:

image data conversion means for converting image data for each pixel in an original image to image formation signals which determine a coloration amount applied to a unit area corresponding to the position of the pixel so that the width of color gradation for a low color density region is narrower than the width of color gradation for a high color density region; and image coloring means for coloring each unit area in the image frame to be colored, based on the image formation signals.

2. An image formation apparatus for forming an image, expressed with color gradation of each unit area in the image frame to be formed, which corresponds to a pixel of an original image frame, the color gradation being performed by executing variable multilevel dither processing for image data of the pixel of the original image frame, the image formation apparatus comprising:

variable multilevel dither processing means for executing variable multilevel dither processing for image data for each pixel of the original image frame so that the gradation level number of image data expressing a pixel of low color density, for which the variable multilevel dither processing was executed, is larger than the gradation level number of image data expressing a pixel of higher color density than the former color density, for which the variable multilevel dither processing was executed;

a memory for storing image data for which the multivalued dither processing was executed; and image coloring means for coloring each unit area in the image frame to be colored, based on the image data for the pixel, for which the variable multilevel dither processing was executed.

3. An image formation apparatus according to claim 2, wherein the variable multilevel dither processing means includes:

multivalued dither processing means for executing multivalued dither processing procedures prepared in advance; and image data amount reducing means for reducing the data amount in each of image data, for which the variable multilevel dither processing is to be executed, so that the reduced data amount of one of the image data, corresponding to an element of a dither matrix used in the multivalued dither processing means, of which the value is larger than a first reference value, is larger than the reduced data amount of one of the image data, corresponding to an element of the dither matrix, of which the value is smaller than a second reference value smaller than the first reference value.

4. An image formation apparatus according to claim 3, wherein the multivalued dither processing means executes k-level dither processing in which k>2; and wherein the image data amount reducing means includes:
n-level dither performing means for performing n-level dither processing in which n≧1;
m-level dither performing means for performing m-level dither processing in which k>m>n; and
image data selection means for selecting image data to be stored in the memory so that for image data processed by the k-level dither processing means, as to one of the image data, corresponding to an element of a dither matrix used in the k-level dither processing, of which the value is larger than the first reference value, the result executed by the n-level dither processing is selected and stored in the memory, and as to one of the image data, corresponding to an element of a dither matrix used in the k-level dither processing, of which the value is smaller than the second reference value, the result executed by the m-level dither processing is selected and stored in the memory.

5. An image formation apparatus according to claim 3 or claim 4, further comprising a data processing apparatus to which one of a printer and a display apparatus is connected;

wherein the multivalued dither processing means is provided in the data processing apparatus; and wherein the image data amount reducing means, the memory, and the image coloring means are provided in the one of a printer and a display apparatus.

6. An image formation apparatus according to claim 3 or claim 4, further comprising a data processing apparatus to which one of a printer and a display apparatus is connected;

wherein the variable multilevel dither processing means is provided in the data processing apparatus; and wherein the memory and the image coloring means are provided in the one of a printer and a display apparatus.

7. A printer for printing an image, expressed with color gradation of each unit area in an image frame to be formed, which corresponds to a pixel of an original image frame, the color gradation being performed by executing variable multilevel dither processing for image data of the pixel of the original image, the printer comprising:

variable multilevel dither processing means for executing variable multilevel dither processing for image data to be printed for a pixel of an original image so that the gradation level number of image data expressing a pixel of low color density, for which the variable multilevel dither processing was executed, is larger than the gradation level number of image data expressing a pixel of higher color density than the former color density, for which the variable multilevel dither processing was executed;

a memory for storing image data for which the multivalued dither processing was executed; and image printing means for coloring each unit area in the image frame to be colored, based on the image data for the pixel, for which the variable multilevel dither processing was executed.

8. A printer for printing an image by using input image data for which multivalued dither processing has been executed, the printer comprising:

image data amount reducing means for reducing the data amount in each of image data, for which the multivalued dither processing is to be executed;

a memory for storing the image data having the reduced data amount; and image printing means for coloring each unit area in an image frame to be colored, based on the image data for the pixel;

wherein the image data reducing means performs a reducing of the image data amount so that the reduced data amount of one of the image data corresponding to an element of a dither matrix used in the multivalued dither processing means, of which the value is larger than a first reference value, is larger than the reduced data amount of one of the image data corresponding to an element of the dither matrix, of which the value is smaller than a second reference value smaller than the first reference value.

9. A color image processing apparatus comprising:

a region discrimination part for discriminating which region of a first region representing an edge region, a second region neighboring the first region, and a third region other than the first and second regions, a pixel of image data to be processed belongs to, in an original image; and a processing part for processing image data of the original image by executing multilevel dither processing for image data of a pixel in the first region with a dot distribution type multivalued dither matrix, for image data of a pixel in the third region with a dot concentration type multivalued dither matrix, and for image data of a pixel in the second region with a dot distribution and concentration mixing type multivalued dither matrix, the dither matrixes being prepared in the image processing system in advance.

10. A color image processing apparatus according to claim 9, wherein the region discrimination part includes:

edge discrimination means for discriminating whether or not each of pixels in the image belongs to the edge region;

region neighboring edge region discrimination means for discriminating whether or not each of pixels in the image neighbors the edge region, based on discrimination results of the edge discrimination means; and determination means for determining to which one of the first, second, and third regions each pixel belongs, based on discrimination results of the edge discrimination means and the region neighboring edge region discrimination means.

11. A color image processing apparatus according to claim 9, wherein the processing part includes:

first processing means for executing multivalued dither processing for image data of each pixel in the first region with the dot distribution type multivalued dither matrix;

second processing means for executing multivalued dither processing for image data of each pixel in the second region with the mixing type multivalued dither matrix; and third processing means for executing multivalued dither processing for image data of each pixel in the third region with the dot concentration type multivalued dither matrix; and wherein for image data expressed by a plurality of color components, at least one of the second and third processing means uses different dither matrixes for different color components.

12. A color image processing apparatus comprising:

a region discrimination part for discriminating to which region of a first region representing an edge part, a second region neighboring the first region, and a third region other than the first and second regions, a pixel of image data to be processed belongs in an original image; and a processing part for performing one of first, second, and third image processing to process image data with different image resolutions, respectively;

wherein the processing part performs image processing for image data of pixels belonging to the first region determined by the region discrimination part with the highest image resolution, for image data of pixels belonging to the third region determined by the region discrimination part with the lowest image resolution, and for image data of pixels belonging to the second region determined by the region discrimination part with an intermediate resolution between the highest and lowest image resolutions.

13. An image output apparatus for outputting an image by using dots for a plurality of kinds of color components, the image output apparatus comprising:

a region discrimination part for discriminating which region of a first region representing an edge part and a second region other than the first region, a pixel of image data to be output belongs to, in an original image; and an image output part for outputting dots for the plurality of kinds of color components on the same position if dots for a pixel in the first region are output, and dots for the plurality of kinds of color components on different positions, respectively, if dots for a pixel in the second region are output.

14. An image output apparatus for outputting an image by using dots for a plurality of kinds of color components, the image output apparatus comprising:

a region discrimination part for discriminating which region of a first region representing an edge part, a second region neighboring the first region, and a third region other than the first and second regions, a pixel of image data to be output belongs to, in an original image; and an image output part for outputting a dot of a different size depending on which region of the first, second, and third regions, a pixel of which a dot is to be output belongs to.

15. A method of processing a color image comprising the steps of:

discriminating to which region of a first region representing an edge part, a second region neighboring the first region, and a third region other than the first and second regions, a pixel of image data to be processed belongs to, in an original image; and executing multilevel dither image data processing for a pixel in the first region with a dot distribution type multivalued dither matrix prepared in advance;

executing multilevel dither image data processing for a pixel in the third region with a dot concentration type multivalued dither matrix prepared in advance; and executing multilevel dither image data processing for a pixel in the second region with a dot distribution and concentration mixing type multivalued dither matrix prepared in advance.

16. An information storage medium for storing a program for performing the method according to claim 15 in a form such that the program can be executed by a data processing device.

17. An image formation apparatus for forming an image expressed with color gradation of each unit area in an image frame to be formed, which corresponds to a pixel of an original image frame, said color gradation being performed by changing a coloration amount applied to said unit area, based on image data expressing color gradation for said pixel of said original image frame, said image formation apparatus comprising:

image data conversion means for converting image data for each pixel in an original image to image formation signals which determine a coloration amount applied to a unit area corresponding to the position of said pixel so that the width of color gradation for a low color density region is narrower than that for a high color density region;

image coloring means for coloring each unit area in said image frame to be colored, based on said image formation signals;

a memory for storing data compressed with a fixed data compression factor;

data processing means, when at least one of image data for each pixel selected to be processed is read out of said memory, for outputting an address corresponding to said at least one of said image data for said pixel;

address conversion means for converting said address output from said data processing means to an address used for access to said memory; and data expansion means for reading out a plurality of compressed image data including compressed image data corresponding to said converted address of said one of said image data, based on said address converted by said address conversion means, from the memory, further expanding said plurality of said read-out compressed image data, and outputting expanded image data corresponding to said address of said one of said image data, from among said plurality of said expanded image data, to said data processing means.

* * * * *